US011876287B2

(12) United States Patent
Lee et al.

(10) Patent No.: US 11,876,287 B2
(45) Date of Patent: Jan. 16, 2024

(54) ANTENNA MODULE DISPOSED IN VEHICLE

(71) Applicant: LG ELECTRONICS INC., Seoul (KR)

(72) Inventors: Soyeon Lee, Seoul (KR); Kangjae Jung, Seoul (KR); Dongjin Kim, Seoul (KR); Youngtaek Hong, Seoul (KR); Byeongyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 17/658,086

(22) Filed: Apr. 5, 2022

(65) Prior Publication Data

US 2023/0163450 A1 May 25, 2023

(30) Foreign Application Priority Data

Nov. 22, 2021 (WO) ................ PCT/KR2021/017189

(51) Int. Cl.
*H01Q 1/32* (2006.01)
*H01Q 1/38* (2006.01)
*H01Q 21/28* (2006.01)

(52) U.S. Cl.
CPC ................ *H01Q 1/32* (2013.01); *H01Q 1/38* (2013.01); *H01Q 21/28* (2013.01)

(58) Field of Classification Search
CPC ........ H01Q 1/3275; H01Q 1/241; H01Q 1/42; H01Q 1/38; H01Q 1/521; H01Q 21/065;
(Continued)

(56) References Cited

U.S. PATENT DOCUMENTS

2007/0001922 A1* 1/2007 Song .................... H01Q 21/062
343/700 MS
2008/0158068 A1* 7/2008 Huang ................. H01Q 9/0421
343/700 MS
(Continued)

FOREIGN PATENT DOCUMENTS

JP 2012182536 9/2012
KR 20060111239 10/2006
(Continued)

OTHER PUBLICATIONS

PCT International Application No. PCT/KR2021/017189, International Search Report and Written Opinion dated Aug. 19, 2022, 10 pages.
(Continued)

*Primary Examiner* — David E Lotter
(74) *Attorney, Agent, or Firm* — LEE, HONG, DEGERMAN, KANG & WAIMEY

(57) ABSTRACT

An antenna assembly may include an antenna region having conductive patterns on one side surface of a dielectric substrate to radiate radio signals. The antenna region may include a first antenna structure and a second antenna structure. The antenna assembly may further include a ground region formed on a same plane as the antenna region. The ground region may include a first slot region and a second slot region. A first feeding line may be disposed at the first slot region, and a second feeding may be disposed at the second slot region. The antenna region may comprise a first conductive pattern, a second conductive pattern, a third conductive pattern, a fourth conductive pattern and a fifth conductive pattern.

20 Claims, 36 Drawing Sheets

(58) Field of Classification Search
CPC ........ H01Q 21/28; H01Q 1/3208; H01Q 9/42; H01Q 21/061; B60R 11/02; B60R 2011/0028; B60R 2011/0288; H04B 7/0413; H04B 7/0456; H04B 7/0617
See application file for complete search history.

(56) References Cited

U.S. PATENT DOCUMENTS

2013/0050057 A1 2/2013 Hayashi et al.
2021/0175628 A1 6/2021 Dai

FOREIGN PATENT DOCUMENTS

KR 20160025582 3/2016
KR 1020170061295 6/2017

OTHER PUBLICATIONS

European Patent Office Application Serial No. 22165275.3, Extended European Search Report dated Sep. 29, 2022, 13 pages.
Wang Wensong et al., “Compact Quad-Element Vertically-Polaraized High-Isolation Wideband MIMO Antenna for Vehicular Base Station”, IEEE Transactions on Vehicular Technology vol. 69, No. 9, Jun. 2020, 9 pages.
Banerjee Jeet et al., “A Multi-functional Diversity Antenna with High Wideband Isolation”, 2020 IEEE Calcutta Conference (Calcon), Feb. 2020, 4 pages.
Bahmanzadeh Faezeh et al., “Simulation and fabrication of a high-isolation very compact MIMO antenna for ultra-wide band applications with dual band-notched characteristics”, International Journal of Electronics and Communications, vol. 128, Oct. 2020, 8 pages.

* cited by examiner (a)

(b)

(c)

(a)

(b)

ANTENNA MODULE DISPOSED IN VEHICLE

CROSS-REFERENCE TO RELATED APPLICATION

Pursuant to 35 U.S.C. § 119, this application claims the benefit of an earlier filing date and right of priority to International Application No. PCT/KR2021/017189, filed on Nov. 22, 2021, the contents of which are hereby incorporated by reference herein in its entirety.

TECHNICAL FIELD

This specification relates to a wideband antenna disposed in a vehicle. One particular implementation relates to an antenna system having a wideband antenna that is made of a transparent material to operate in various communication systems, and to a vehicle having the same.

BACKGROUND ART

A vehicle may perform wireless communication services with other vehicles or nearby objects, infrastructures, or a base station. In this regard, various communication services can be provided through a wireless communication system to which an LTE communication technology or a 5G communication technology is applied. some of LTE frequency bands may be allocated to provide 5G communication services.

On the other hand, there is a problem in that a vehicle body and a vehicle roof are formed of a metallic material to block radio waves. Accordingly, a separate antenna structure may be disposed on a top of the vehicle body or the vehicle roof. Or, when the antenna structure is disposed on a bottom of the vehicle body or roof, a portion of the vehicle body or roof corresponding to a region where the antenna structure is disposed may be formed of a non-metallic material.

However, in terms of design, the vehicle body or roof needs to be integrally formed. In this case, the exterior of the vehicle body or roof may be formed of a metallic material. This may cause antenna efficiency to be drastically lowered due to the vehicle body or roof.

In order to increase a communication capacity without a change in the exterior design of the vehicle, a transparent antenna may be disposed on glass corresponding to a window of the vehicle. However, antenna radiation efficiency and impedance bandwidth characteristics may be deteriorated due to an electrical loss of the transparent antenna.

Meanwhile, a structure in which an antenna layer with an antenna pattern and a ground layer with a ground pattern are disposed on different planes is generally used. In particular, when operating as a wideband antenna, it is necessary to increase a thickness between the antenna layer and the ground layer. However, for a transparent antenna for a vehicle, an antenna region and a ground region need to be disposed on the same layer. Such an antenna in which the antenna pattern and the ground pattern are disposed on the same layer is difficult to operate as a wideband antenna.

In addition, even when the wideband antenna is implemented as a transparent antenna for a vehicle, it is necessary to provide Multiple-input/Multi-output (MIMO) through a plurality of antenna elements. However, any guideline on how to optimally arrange the plurality of antenna elements in a given space of the vehicle glass has not been introduced. In this regard, it is necessary to minimize the size of the antenna module so that the antenna module can be placed within a limited region of a window of the vehicle.

Meanwhile, the antenna module disposed in such a vehicle is needed to maintain high antenna performance even in a low band (LB) of 1 GHz or less in all 4G/5G communication bands. However, in the low band (LB) of 1 GHz or less, when an operating bandwidth is considered based on a center frequency, the antenna module should operate in a wider band range than other bands. In addition, a high-performance antenna is required in consideration of the loss of a transparent material and a glass material, so as to be disposed in the window of the vehicle.

DISCLOSURE OF INVENTION

Technical Problem

The present disclosure is directed to solving the aforementioned problems and other drawbacks. The prevent disclosure also describes an antenna made of a transparent material that operates in a wideband range in which LTE and 5G communication services can be provided.

The present disclosure further describes a wideband antenna structure made of a transparent material that can be implemented in various shapes on a single plane.

The present disclosure further describes a wideband antenna structure made of a transparent material that can reduce a feeding loss and improving antenna efficiency while operating in a wide band.

The present disclosure further describes a structure in which a transparent antenna having improved antenna efficiency while operating in a wideband range can be disposed at various positions on a window of a vehicle.

The present disclosure further describes improvement of communication performance by arranging a plurality of transparent antennas on glass of a vehicle or a display of an electronic device, and securing of high antenna performance even in a low band LB.

The present disclosure further describes performing of Multi-input/Multi-output (MIMO) by arranging a plurality of transparent antennas in a limited space of glass of a vehicle.

The present disclosure further describes minimization of interference between antennas while providing Multi-input/Multi-output (MIMO) by arranging a plurality of transparent antennas in a limited space of glass of a vehicle.

The present disclosure further describes an antenna structure capable of minimizing a size of an antenna module that can be disposed in a limited region of a window of a vehicle.

The present disclosure further describes prevention of interference between antenna elements while minimizing a size of an antenna module that can be disposed in a limited region of a window of a vehicle.

Solution to Problem

According to those and other advantages of the subject matter described in this application, an antenna assembly may include an antenna region having conductive patterns on one side surface of a dielectric substrate to radiate radio signals. The antenna region may include a first antenna structure and a second antenna structure. The antenna assembly may further include a ground region formed on a same plane as the antenna region. The ground region may include a first slot region and a second slot region. A first feeding line may be disposed at the first slot region, and a second feeding may be disposed at the second slot region.

The antenna region may comprise a first conductive pattern, a second conductive pattern, a third conductive pattern, a fourth conductive pattern and a fifth conductive pattern.

In some implementations, the first antenna structure may include the first conductive pattern electrically connected with the first feeding line, the second conductive pattern electrically connected with the ground region by a first connection line, and a first portion of the third conductive pattern electrically connected with the ground region by a second connection line. The first conductive pattern may be disposed between the second conductive pattern (1160*a*) and the third conductive pattern. A size of the second conductive pattern may be smaller than a size of the third conductive pattern.

In some implementations, the second antenna structure may include the fourth conductive pattern electrically connected with the second feeding line, a second portion of the third conductive pattern electrically connected with the ground region by a third connection line, and the fifth conductive pattern electrically connected with the ground region by a fourth connection line. The third conductive pattern may be disposed between the third conductive pattern and the fifth conductive pattern. A size of the fifth conductive pattern may be smaller than the size of the third conductive pattern. The third conductive pattern may be disposed between the first conductive pattern and the fourth conductive pattern. The third conductive pattern may include an open region disposed between the first portion of the third conductive pattern and the second portion of the third conductive pattern.

In some implementations, the third conductive pattern may be shared as a part of radiator of the first antenna structure and the second antenna structure. The first radiation structure and the second radiation structure may be configured in a symmetrical structure with respect to a center line of the third conductive pattern. The third conductive pattern may be configured in a symmetrical structure with respect to the center line of the third conductive pattern.

In some implementations, the third conductive pattern may comprise a first sub region connected with the ground region by the second connection line, a second sub region connected with the ground region by the third connection line. The conductive pattern may further comprise a third sub region disposed between the first sub region and the second sub region. In this regard, the third sub region may be connected with the first sub region and the second sub region and a first end portion of the third sub region may be separated with the ground region by the open region. The conductive pattern may further comprise a fourth sub region disposed between the first sub region and the second sub region. The first end of the third sub region may be disposed opposite the second end of the third sub region. A width of the open region is disposed between the first sub region and the second sub region. A height of the open region may be disposed between the first end portion of the third sub region and the ground region.

In some implementations, the fourth sub region may comprise a first sub-pattern, a second sub-pattern and a third sub-pattern. The first sub-pattern may be connected with the second end portion of the third sub region. The second sub-pattern may be connected with the upper portion of the first sub-pattern of the third sub region. The third sub-pattern may be connected with the upper portion of the second sub-pattern of the third sub region. The width of the second end portion of the third sub region may be shorter than a width of the first sub-pattern.

In some implementations, the fourth sub region may comprise a first sub-pattern, a second sub-pattern and a third sub-pattern. The first sub-pattern may be connected with the second end portion of the third sub region, and configured to increase in width from a lower portion of the first sub-pattern to an upper portion of the first sub-pattern. The second sub-pattern may be connected with the upper portion of the first sub-pattern of the third sub region, and configured to increase in width from a lower portion of the second sub-pattern to an upper portion of the second sub-pattern. The third sub-pattern may be connected with the upper portion of the second sub-pattern of the third sub region, and configured to decrease in width from a lower portion of the third sub-pattern to an upper portion of the third sub-pattern SP3.

In some implementations, the width of the lower portion of the first sub-pattern may be shorter than the width of the upper portion of the first sub-pattern. The width of the upper portion of the first sub-pattern may be shorter than the width of the lower portion of the second sub-pattern. The width of the lower portion of the second sub-pattern may be shorter than the width of the upper portion of the second sub-pattern. The width of the upper portion of the second sub-pattern may be equal with the width of the lower portion of the third sub-pattern. The width of the upper portion of the third sub-pattern may be shorter than the width of the lower portion of the third sub-pattern. The width of the lower portion of the first sub-pattern may be longer than the width of the upper portion of the third sub-pattern.

In some implementations, the antenna assembly may further include a first coupling pattern and a second coupling pattern. The first coupling pattern may be disposed between the first conductive pattern and a first side of the third sub region of the third conductive pattern. The second coupling pattern may be disposed between the fourth conductive pattern and a second side of the third sub region of the third conductive pattern.

In some implementations, a first gap may be disposed between the first conductive pattern and the first coupling pattern. A second gap may be disposed between the first coupling pattern and the first side of the third sub region of the third conductive pattern. A width of the first gap may be shorter than a width of the second gap. A third gap may be disposed between the fourth conductive pattern and the second coupling pattern. A fourth gap may be disposed between the second coupling pattern and the second side of the third sub region of the third conductive pattern. A width of the third gap may be shorter than a width of the fourth gap.

In some implementations, the first conductive pattern to the fifth conductive pattern, the first coupling pattern and the second coupling pattern may be formed as a metal mesh shape having a plurality of opening area on the dielectric substrate. The first radiation structure and the second radiation structure may be a Coplanar Wavelength (CPW) structure.

In some implementations, the antenna assembly may further comprise a plurality of dummy mesh grid pattern at outside portion of the first radiation structure and the second radiation structure on the one surface of the dielectric substrate. The plurality of dummy mesh grid pattern may be not connected with feeding lines and the ground region. The plurality of dummy mesh grid pattern may be separated with each other.

In some implementations, the first radiation structure operates as a first antenna. The second radiation structure may operate as a second antenna. Each of the first radiation structure and the second radiation structure may operate in a 600 to 6000 MHz frequencies In some implementations, the first radiation structure and the second radiation structure may operate as a 2×2 MIMO (Multi-in Multi-output) system in the 600 to 6000 MHz frequencies.

In some implementations, the first radiation structure and the second radiation structure may be disposed in a rectangle size of width 100 mm×height 83 mm.

According to those and other advantages of the subject matter described in this application, a vehicle having antenna modules may include a dielectric substrate disposed at glass constituting a window of the vehicle or attached to the glass, and having conductive patterns disposed in a mesh grid form, an antenna region including conductive patterns on one side surface of the dielectric substrate to radiate radio signals. The antenna region may include a first antenna structure and a second antenna structure. The antenna assembly may further include a ground region formed on a same plane as the antenna region. The ground region may include a first slot region and a second slot region. A first feeding line may be disposed at the first slot region, and a second feeding may be disposed at the second slot region. The antenna region may comprise a first conductive pattern, a second conductive pattern, a third conductive pattern, a fourth conductive pattern and a fifth conductive pattern.

In some implementations, the first antenna structure may include the first conductive pattern electrically connected with the first feeding line, the second conductive pattern electrically connected with the ground region by a first connection line, and a first portion of the third conductive pattern electrically connected with the ground region by a second connection line. The first conductive pattern may be disposed between the second conductive pattern (1160*a*) and the third conductive pattern. A size of the second conductive pattern may be smaller than a size of the third conductive pattern.

In some implementations, the second antenna structure may include the fourth conductive pattern electrically connected with the second feeding line, a second portion of the third conductive pattern electrically connected with the ground region by a third connection line, and the fifth conductive pattern electrically connected with the ground region by a fourth connection line. The third conductive pattern may be disposed between the third conductive pattern and the fifth conductive pattern. A size of the fifth conductive pattern may be smaller than the size of the third conductive pattern. The third conductive pattern may be disposed between the first conductive pattern and the fourth conductive pattern. The third conductive pattern may include an open region disposed between the first portion of the third conductive pattern and the second portion of the third conductive pattern.

In some implementations, the glass constituting the window of the vehicle may include front glass disposed at a front region of the vehicle, and door glass disposed at door regions of the vehicle. The glass may include rear glass disposed at a rear region of the vehicle, top glass spaced apart from the rear glass and disposed at an upper region of the vehicle, and quarter glass disposed at partial regions of the door regions of the vehicle. The antenna modules may be disposed at different regions of the vehicle.

In some implementations, the antenna modules may include a first antenna module and a second antenna module disposed on a left quarter glass and a right quarter glass that are the partial regions of a left door region and a right door region defining the door regions of the vehicle.

In some implementations, the first antenna structure and the second antenna structure may be connected to a first feeding line and a second feeding line to operate as a first antenna and a second antenna. The vehicle may further include a transceiver circuit operably coupled to a first radiator corresponding to the first conductive pattern and a second radiator corresponding to the fourth conductive pattern through the first feeding line and the second feeding line, and configured to control a radio signal of at least one of the first band to the third band to be radiated through the antenna assembly. The vehicle may further include a processor operably coupled to the transceiver circuit to control the transceiver circuit.

In some implementations, the processor may receive a signal through at least one of the first antenna module and the second antenna module and perform a diversity operation to transmit the signal to an inside of the vehicle through the quarter glass.

In some implementations, the antenna modules may further include a third antenna module and a fourth antenna module disposed at different points of the upper region of the front glass and configured to simultaneously receive signals from the front of the vehicle to perform Multi-input/Multi-output (MIMO), a third antenna module and a fourth antenna module disposed at different points of the top glass and configured to simultaneously receive signals from the top of the vehicle to perform MIMO, and a seventh antenna module and an eighth antenna module disposed at different points of the lower region of the rear glass and configured to simultaneously receive signals from the rear of the vehicle to perform MIMO.

In some implementations, the processor may select an antenna module to perform communication with an entity that communicates with the vehicle, based on a driving path of the vehicle and a communication path with the entity. The processor may perform a diversity operation through the first antenna module and the second antenna module when the vehicle changes the driving.

In some implementations, the processor may perform MIMO through the third antenna module and the fourth antenna module when the vehicle travels. The processor may perform MIMO in the first band through the first antenna and the second antenna within the third and fourth antenna modules. In some implementations, the processor may perform MIMO in at least one of the second band and the third band through the first antenna and the second antenna within the third and fourth antenna modules. The processor may control the transceiver circuit to perform Carrier Aggregation (CA) or Dual Connectivity (DC) through at least one of the first antenna and the second antenna within the third and fourth antenna modules.

Advantageous Effects of Invention

Technical effects of a wideband antenna disposed at a vehicle will be described as follows.

In some implementations, an antenna made of a transparent material that operates in a wideband range capable of providing LTE and 5G communication services can be provided by allowing grounds asymmetrically disposed at both sides of a radiator region to operate in different bands.

In some implementations, a transparent antenna made of a transparent material, which has a radiator region including conductive patterns of a stepped structure with different widths so as to form multiple resonance points and can operate in a wideband range, can be provided.

In some implementations, an entire size of a transparent antenna and a feeding loss can be minimized by minimizing a length of feeding lines.

In some implementations, an antenna structure made of a transparent material that can be minimized in antenna size while operating in a wideband range by employing a CPW feeding structure and a radiator structure, in which ground regions are formed in an asymmetric structure, can be provided.

In some implementations, an antenna structure of a transparent material, which can obtain improved antenna efficiency and transparency while operating in a wideband range by implementing conductive patterns in a metal mesh structure and defining a dummy pattern even at a dielectric region, can be provided.

In some implementations, a structure, in which an antenna structure made of a transparent material with improved antenna efficiency while operating in a wideband range can be disposed at various positions, such as an upper, lower, or side region of a front window of a vehicle, can be provided.

In some implementations, communication performance can be improved by arranging a plurality of transparent antennas on glass of a vehicle or a display of an electronic device, and antenna performance in a low band (LB) can be enhanced through a shared ground structure of antenna elements.

In some implementations, antenna performance can be optimized for each band and communication capacity can be increased by arranging a plurality of transparent antennas in a symmetrical structure within a limited space of glass of a vehicle and optimizing a shared ground structure and an independent ground structure.

In some implementations, antenna interference between antenna elements can be reduced when the antenna elements operate simultaneously, by way of arranging a plurality of transparent antennas in a symmetrical structure within a limited space of glass of a vehicle and allowing different radiators to share a ground.

In some implementations, an antenna module can be minimized in size to be disposed within a limited region of a window of a vehicle through a shared ground structure of antenna elements.

In some implementations, an antenna module can be minimized in size and interference between antenna elements can be prevented by a shared ground structure of the antenna elements and partial separation of a ground region adjacent to feeding lines.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An antenna system described herein may be mounted on a vehicle. Configurations and operations according to implementations may also be applied to a communication system, namely, antenna system mounted on a vehicle. In this regard, the antenna system mounted on the vehicle may include a plurality of antennas, and a transceiver circuit and a processor for controlling the plurality of antennas.

Figure 1A:
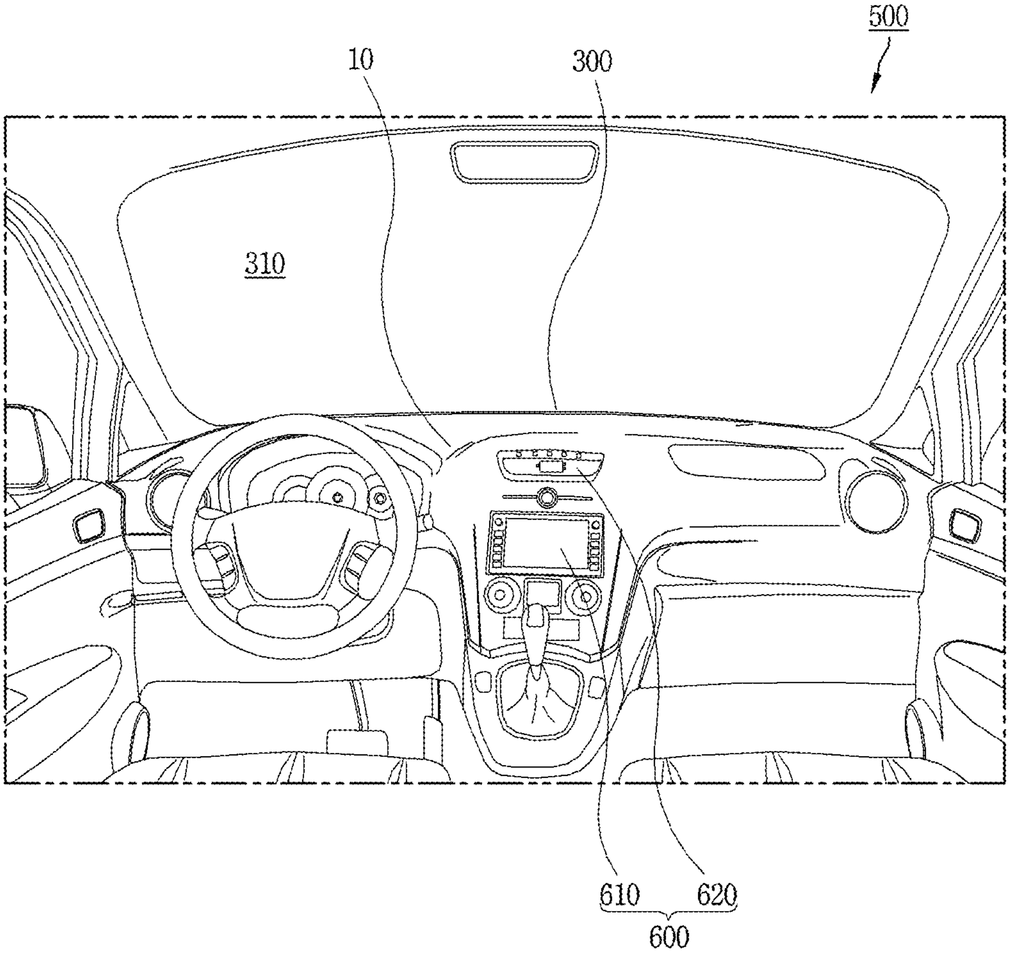
FIG. 1A is a diagram illustrating a vehicle interior in accordance with one example.
Figure 1B:
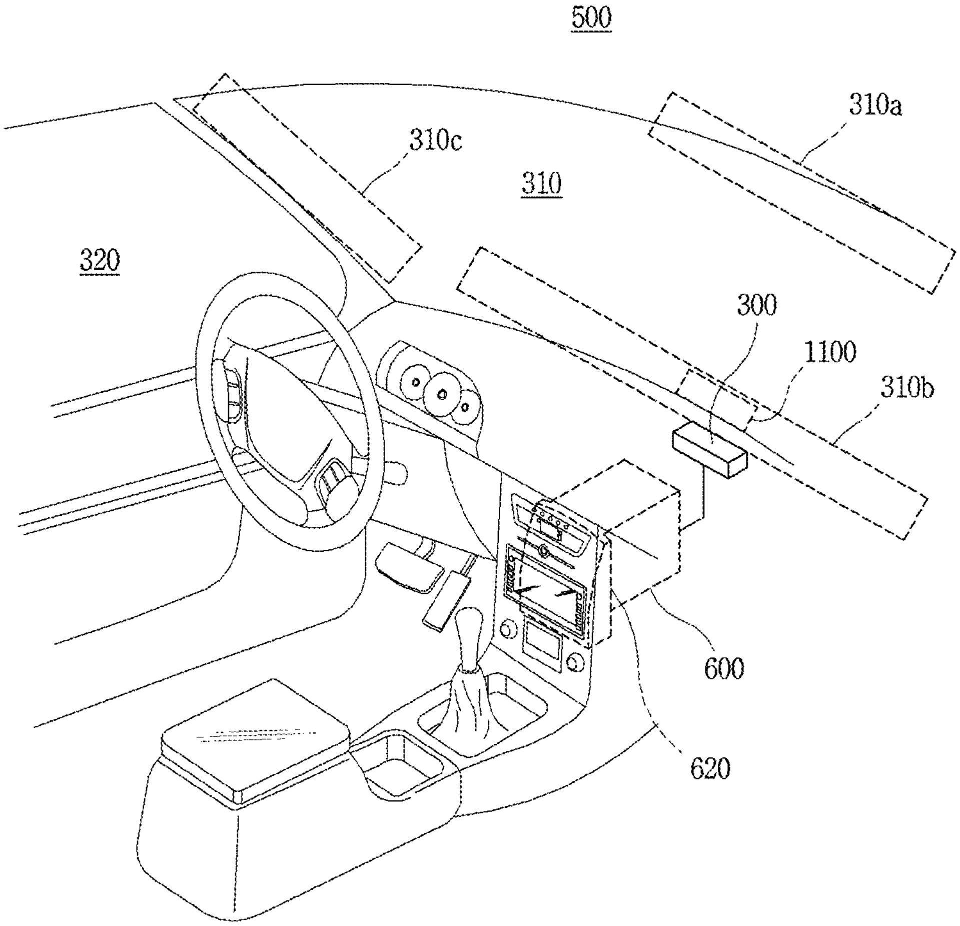
FIG. 1B is a lateral view illustrating the vehicle interior in accordance with the one example.

FIG. 1A is a diagram illustrating a vehicle interior in accordance with one example. FIG. 1B is a lateral view illustrating the vehicle interior in accordance with the one example.

As illustrated in FIGS. 1A and 1B, the present disclosure describes an antenna unit (i.e., an internal antenna system) 1000 capable of transmitting and receiving signals through GPS, 4G wireless communication, 5G wireless communication, Bluetooth, or wireless LAN. Therefore, the antenna unit (i.e., the antenna system) 1000 capable of supporting these various communication protocols may be referred to as an integrated antenna module 1000. The antenna system 1000 may include a telematics control unit (TCU) 300 and an antenna assembly 1100. For example, the antenna assembly 1100 may be disposed on a window of a vehicle.

The present disclosure also describes a vehicle 500 having the antenna system 1000. The vehicle 500 may include a dashboard and a housing 10 including the telematics control unit (TCU) 300, and the like. In addition, the vehicle 500 may include a mounting bracket for mounting the telematics control unit (TCU) 300.

The vehicle 500 may include the telematics control unit (TCU) 300 and an infotainment unit 600 configured to be connected to the telematics control unit 300. A portion of a front pattern of the infotainment unit 600 may be implemented in the form of a dashboard of the vehicle. A display 610 and an audio unit 620 may be included in the dashboard of the vehicle.

The antenna assembly 1100, namely, the antenna module 1100 in the form of a transparent antenna may be disposed at at least one of an upper region 310*a*, a lower region 310*b*, and a side region 310*c* of a front window 310. The antenna assembly 1100 may also be disposed at a side window 320, which is disposed at a side surface of the vehicle, in addition to the front window 310.

As illustrated in FIG. 1B, when the antenna assembly 1100 is disposed at the lower region 310*b* of the front window 310, it may be operably coupled to a TCU 300 disposed inside the vehicle. When the antenna assembly 1100 is disposed at the upper region 310*a* or the side region 310*c* of the front window 310, it may be operably coupled to a TCU disposed outside the vehicle. However, the present disclosure may not be limited to the TCU coupling configuration inside or outside the vehicle.

<V2X (Vehicle-to-Everything)>

V2X communication may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

V2X communication may indicate the same meaning as V2X sidelink or NR V2X or may indicate a broader meaning including V2X sidelink or NR V2X.

V2X communication can be applied to various services, for example, forward collision warning, automatic parking system, Cooperative Adaptive Cruise Control (CACC), control loss warning, traffic queue warning, traffic vulnerable safety warning, emergency vehicle warning, speed warning when driving on a curved road, traffic flow control, and the like.

V2X communication may be provided through a PC5 interface and/or a Uu interface. In this case, specific network entities for supporting communications between a vehicle and all entities may exist in a wireless communication system supporting V2X communication. For example, the network entity may include a base station (eNB), a Road Side Unit (RSU), a terminal, or an application server (e.g., a traffic safety server).

In addition, a terminal performing V2X communication may refer to not only a general handheld UE but also a vehicle (V-UE), a pedestrian UE, an RSU of an eNB type, an RSU of a UE type, a robot equipped with a communication module, and the like.

V2X communication may be performed directly between terminals or may be performed through the network entity (entities). V2X operation modes may be classified according to a method of performing such V2X communication.

Terms used in V2X communication may be defined as follows.

A Road Side Unit (RSU) is a V2X service enabled device that can transmit and receive data to and from a moving vehicle using V2I service. The RSU is also a stationary infrastructure entity supporting V2X application programs, and can exchange messages with other entities that support V2X application programs. The RSU is a term frequently used in existing ITS specifications, and the reason for introducing this term to the 3GPP specifications is to make the documents easier to read for the ITS industry. The RSU is a logical entity that combines a V2X application logic with the functionality of an eNB (referred to as an eNB-type RSU) or a UE (referred to as a UE-type RSU).

V2I Service is a type of V2X service, where one party is a vehicle whereas the other party is an entity belonging to infrastructure. V2P Service is also a type of V2X service, where one party is a vehicle and the other party is a device carried by an individual (e.g., a handheld terminal carried by a pedestrian, a cyclist, a driver, or a passenger). V2X Service is a type of 3GPP communication service that involves a transmitting or receiving device on a vehicle. Based on the other party involved in the communication, it may be further divided into V2V service, V2I service and V2P service.

V2X enabled UE is a UE that supports V2X service. V2V Service is a type of V2X service, where both parties of communication are vehicles. V2V communication range is a direct communication range between two vehicles engaged in V2V service.

Figure 2A:
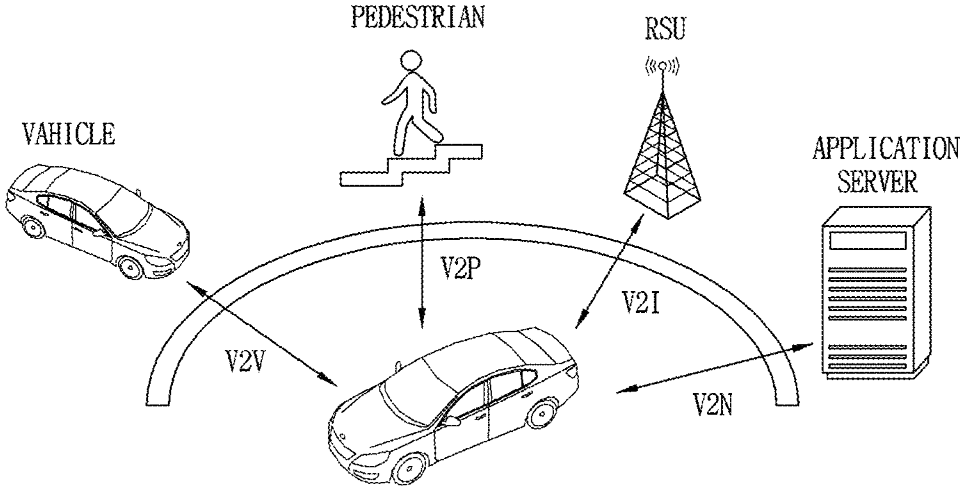
FIG. 2A illustrates a type of V2X application.

V2X applications, referred to as Vehicle-to-Everything (V2X), include the four different types, as described above, namely, (1) vehicle-to-vehicle (V2V), (2) vehicle-to-infrastructure (V2I), (3) vehicle-to-network (V2N), (4) vehicle-to-pedestrian (V2P). FIG. 2A illustrates a type of V2X application. Referring to FIG. 2A, the four types of V2X applications may use “cooperative awareness” to provide more intelligent services for end-users.

This means that entities, such as vehicles, roadside infrastructures, application servers and pedestrians, may collect knowledge of their local environments (e.g., information received from other vehicles or sensor equipment in proximity) to process and share that knowledge in order to provide more intelligent services, such as cooperative collision warning or autonomous driving.

<NR V2X>

Support for V2V and V2X services has been introduced in LTE during Releases 14 and 15, in order to expand the 3GPP platform to the automotive industry.

Requirements for support of enhanced V2X use cases are broadly arranged into four use case groups.

(1) Vehicles Platooning enables the vehicles to dynamically form a platoon traveling together. All the vehicles in the platoon obtain information from the leading vehicle to manage this platoon. These information allow the vehicles to drive closer than normal in a coordinated manner, going to the same direction and traveling together.

(2) Extended Sensors enable the exchange of raw or processed data gathered through local sensors or live video images among vehicles, road site units, devices of pedestrians and V2X application servers. The vehicles can increase the perception of their environment beyond of what their own sensors can detect and have a more broad and holistic view of the local situation. High data rate is one of the key characteristics.

(3) Advanced Driving enables semi-automated or full-automated driving. Each vehicle and/or RSU shares its own perception data obtained from its local sensors with vehicles in proximity and allows vehicles to synchronize and coordinate their trajectories or maneuvers. Each vehicle shares its driving intention with vehicles in proximity too.

(4) Remote Driving enables a remote driver or a V2X application to operate a remote vehicle for those passengers who cannot drive by themselves or remote vehicles located in dangerous environments. For a case where variation is limited and routes are predictable, such as in public transportation, driving based on cloud computing can be used. High reliability and low latency are the main requirements.

A description to be given below can be applied to all of NR SL (sidelink) and LTE SL, and when no radio access technology (RAT) is indicated, the NR SL is meant. Operation scenarios considered in NR V2X may be categorized into six as follows. In this regard, FIG. 2B illustrates a standalone scenario supporting V2X SL communication and an MR-DC scenario supporting V2X SL communication.

In particular, 1) in scenario 1, a gNB provides control/configuration for a UE’s V2X communication in both LTE SL and NR SL. 2) In scenario 2, an ng-eNB provides control/configuration for a UE’s V2X communication in both LTE SL and NR SL. 3) In scenario 3, an eNB provides control/configuration for a UE’s V2X communication in both LTE SL and NR SL. On the other hand, 4) in scenario 4, a UE’s V2X communication in LTE SL and NR SL is controlled/configured by Uu while the UE is configured with EN-DC. 5) In scenario 5, a UE’s V2X communication in LTE SL and NR SL is controlled/configured by Uu while the UE is configured in NE-DC. 6) In scenario 6, a UE’s V2X communication in LTE SL and NR SL is controlled/configured by Uu while the UE is configured in NGEN-DC.

Figure 2B:
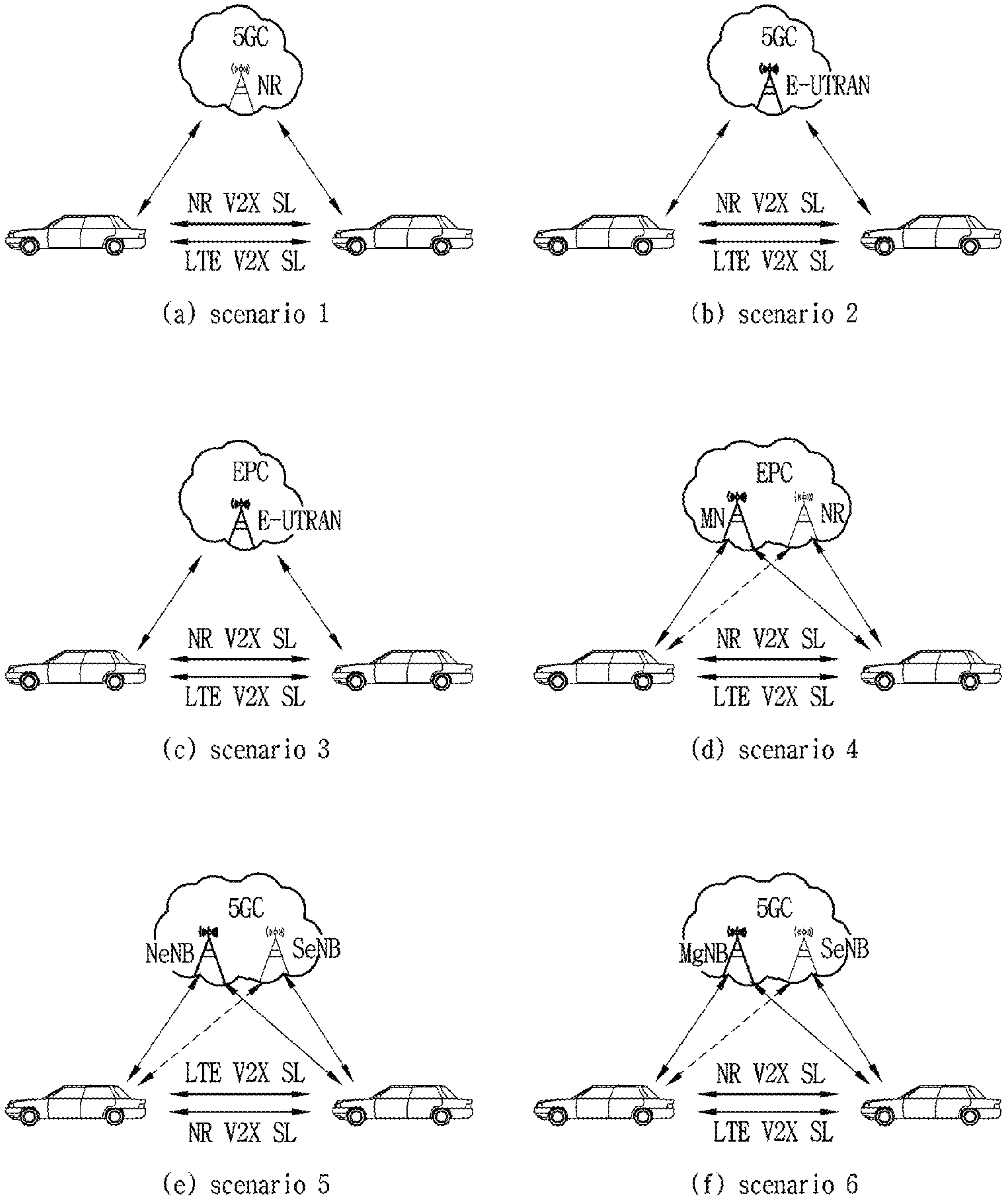
FIG. 2B illustrates a standalone scenario supporting V2X SL communication and an MR-DC scenario supporting V2X SL communication.

In order to support V2X communication, as illustrated in FIGS. 2A and 2B, a vehicle may perform wireless communication with an eNB and/or a gNB through an antenna system. The antenna system may be configured as an internal antenna system as illustrated in FIGS. 1A and 1B. The antenna system may alternatively be implemented as an external antenna system and/or an internal antenna system as illustrated in FIGS. 3A to 3C.

Figure 3A:
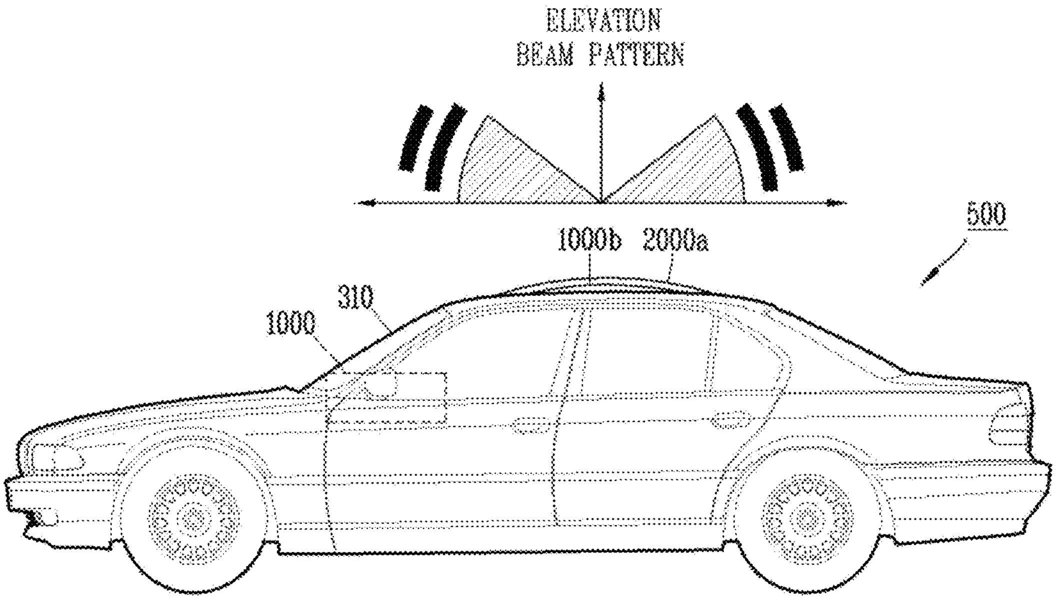
FIGS. 3A to 3C illustrate a configuration capable of performing wireless communication through a transparent antenna disposed on a window of a vehicle (vehicle window).
Figure 3B:
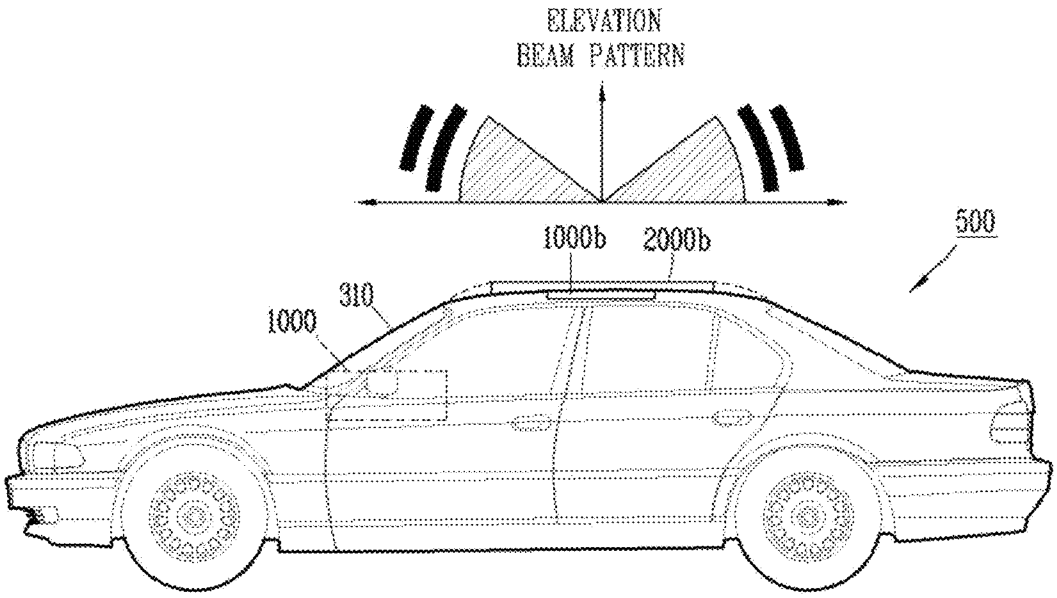
Figure 3C:
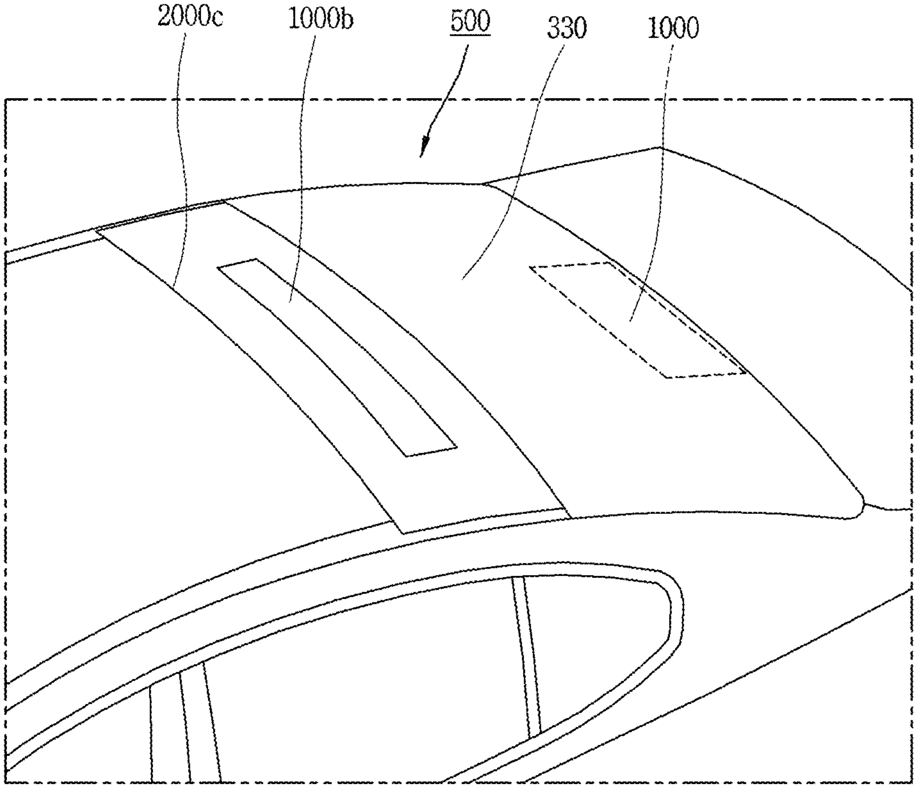

FIGS. 3A to 3C are views illustrating a structure for mounting an antenna system in a vehicle, to which the antenna system is mounted. In this regard, FIGS. 3A to 3C illustrate a configuration capable of performing wireless communication through a transparent antenna disposed on the front window 310 of the vehicle. An antenna system 1000 including a transparent antenna may be disposed on a front window of a vehicle and inside the vehicle. Wireless communication may also be performed through a transparent antenna disposed on a side glass of the vehicle, in addition to the front window.

The antenna system for the vehicle that includes the transparent antenna can be combined with other antennas. Referring to FIGS. 3A to 3C, in addition to the antenna system 1000 implemented as the transparent antenna, a separate antenna system 1000*b* may be further configured. FIGS. 3A and 3B illustrate a structure in which the antenna system 1000*b*, in addition to the antenna system 1000, is mounted on or in a roof of the vehicle. On the other hand, FIG. 3C illustrates a structure in which the separate antenna system 1000*b*, in addition to the antenna system 1000, is mounted in a roof frame of a roof and a rear mirror of the vehicle.

Referring to FIGS. 3A to 3C, in order to improve the appearance of the vehicle and to maintain a telematics performance at the time of collision, an existing shark fin antenna may be replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 3A, the antenna system 1000 implemented as the transparent antenna may be disposed on the front window 310 of the vehicle and inside the vehicle. The second antenna system 1000*b* corresponding to an external antenna may be disposed on the roof of the vehicle. In FIG. 3A, a radome 2000*a* may cover the second antenna system 1000*b* to protect the second antenna system 1000*b* from an external environment and external impacts while the vehicle travels. The radome 2000*a* may be made of a dielectric material through which radio signals are transmitted/received between the second antenna system 1000*b* and a base station.

Referring to FIG. 3B, the antenna system 1000 implemented as the transparent antenna may be disposed on the front window 310 of the vehicle and inside the vehicle. One the other hand, the second antenna system 1000*b* corresponding to the external antenna may be disposed within a roof structure of the vehicle and at least part of the roof structure 2000*b* may be made of a non-metallic material. At this time, the roof structure 2000*b* of the vehicle except for the at least part made of the non-metallic material may be made of a dielectric material through which radio signals are transmitted/received between the antenna system 1000*b* and the base station.

Referring to FIG. 3C, the antenna system 1000 implemented as the transparent antenna may be disposed on the rear window 330 of the vehicle and inside the vehicle. The second antenna system 1000*b* corresponding to the external antenna may be disposed within the roof frame 2000*c* of the vehicle, and at least part of the roof frame 2000*c* may be made of a non-metallic material. At this time, the roof frame 2000*c* of the vehicle 500 except for the at least part made of the non-metallic material may be made of a dielectric material through which radio signals are transmitted/received between the second antenna system 1000*b* and the base station.

Referring to FIGS. 3A to 3C, antennas provided in the antenna system 1000 mounted on the vehicle may form a beam pattern in a direction perpendicular to the front window 310 or the rear window 330. Antenna provided in the second antenna system 1000 mounted on the vehicle may further define a beam coverage by a predetermined angle in a horizontal region with respect to the vehicle body.

Meanwhile, the vehicle 500 may include only the antenna unit (i.e., the internal antenna system) 1000 corresponding to the internal antenna without the antenna system 1000*b* corresponding to the external antenna.

Figure 4:
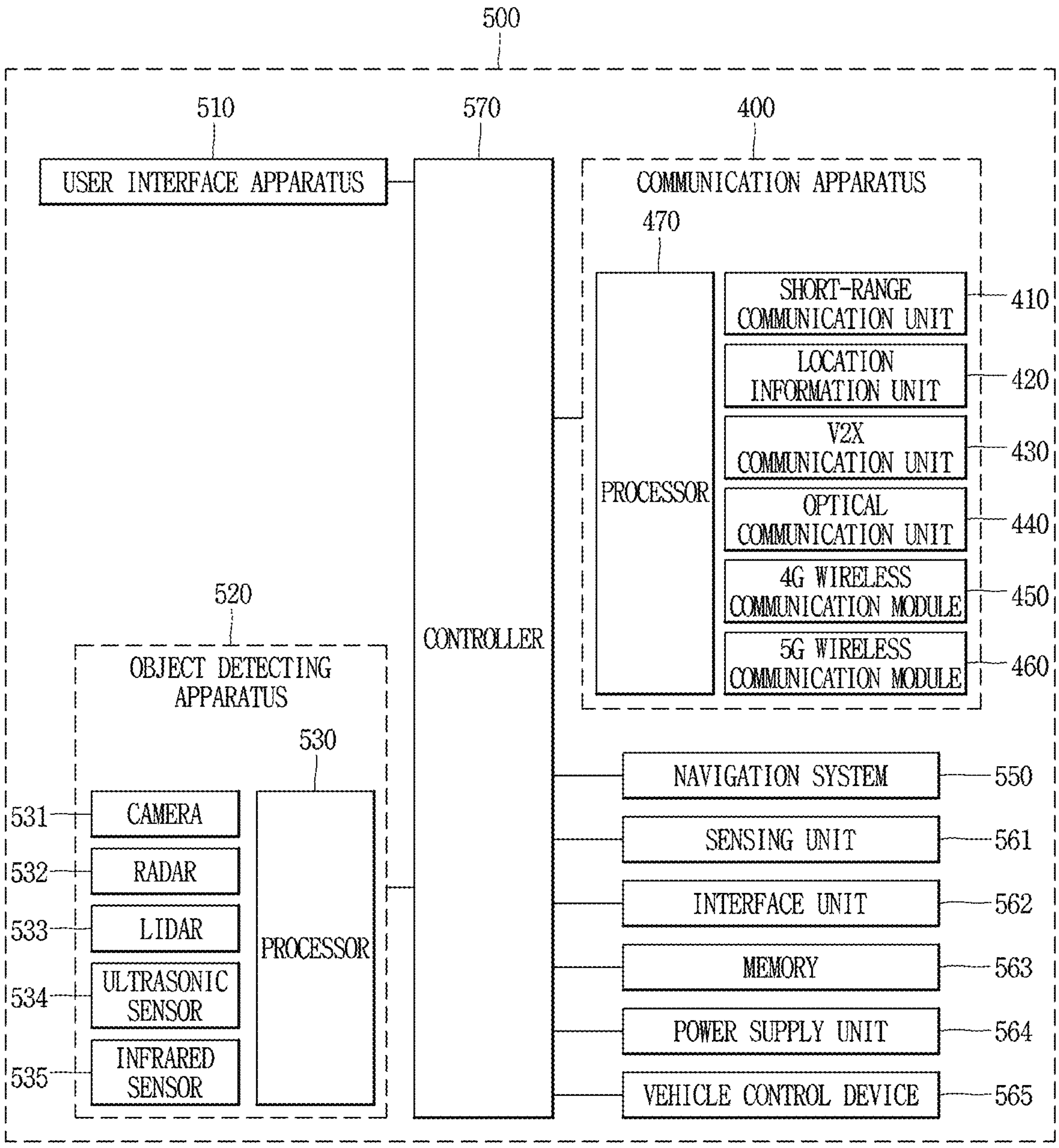
FIG. 4 is a block diagram illustrating a vehicle and an antenna system mounted to the vehicle in accordance with one example.

Meanwhile, FIG. 4 is a block diagram illustrating a vehicle and an antenna system mounted on the vehicle in accordance with an implementation.

The vehicle 500 may be an autonomous vehicle. The vehicle 500 may be switched into an autonomous driving mode or a manual mode (a pseudo driving mode) based on a user input. For example, the vehicle 500 may be switched from the manual mode into the autonomous driving mode or from the autonomous driving mode into the manual mode based on a user input received through a user interface apparatus 510.

In relation to the manual mode and the autonomous driving mode, operations such as object detection, wireless communication, navigation, and operations of vehicle sensors and interfaces may be performed by the telematics control unit mounted on the vehicle 500. Specifically, the telematics control unit mounted on the vehicle 500 may perform the operations in cooperation with the antenna module 300, the object detecting apparatus 520, and other interfaces. In some examples, the communication apparatus 400 may be disposed in the telematics control unit separately from the antenna system 300 or may be disposed in the antenna system 300.

The vehicle 500 may be switched into the autonomous driving mode or the manual mode based on driving environment information. The driving environment information may be generated based on object information provided from the object detecting apparatus 520. For example, the vehicle 500 may be switched from the manual mode into the autonomous driving mode or from the autonomous driving mode into the manual mode based on driving environment information generated in the object detecting apparatus 520.

For example, the vehicle 500 may be switched from the manual mode into the autonomous driving mode or from the autonomous driving mode into the manual mode based on driving environment information received through the communication apparatus 400. The vehicle 500 may be switched from the manual mode into the autonomous driving mode or from the autonomous driving mode into the manual mode based on information, data or signal provided from an external device.

When the vehicle 500 is driven in the autonomous driving mode, the autonomous vehicle 500 may be driven based on an operation system. For example, the autonomous vehicle 500 may be driven based on information, data or signal generated in a driving system, a parking exit system, and a parking system. When the vehicle 500 is driven in the manual mode, the autonomous vehicle 500 may receive a user input for driving through a driving control apparatus. The vehicle 500 may be driven based on the user input received through the driving control apparatus.

The vehicle 500 may include a user interface apparatus 510, an object detecting apparatus 520, a navigation system 550, and a communication apparatus 400. In addition, the vehicle may further include a sensing unit 561, an interface unit 562, a memory 563, a power supply unit 564, and a vehicle control device 565 in addition to the aforementioned apparatuses and devices. In some implementations, the vehicle 500 may include more components in addition to components to be explained in this specification or may not include some of those components to be explained in this specification.

The user interface apparatus 510 may be an apparatus for communication between the vehicle 500 and a user. The user interface apparatus 510 may receive a user input and provide information generated in the vehicle 500 to the user. The vehicle 510 may implement user interfaces (UIs) or user experiences (UXs) through the user interface apparatus 200.

The object detecting apparatus 520 may be an apparatus for detecting an object located at outside of the vehicle 500. The object may be a variety of objects associated with driving (operation) of the vehicle 500. In some examples, objects may be classified into moving objects and fixed (stationary) objects. For example, the moving objects may include other vehicles and pedestrians. The fixed objects may include traffic signals, roads, and structures, for example. The object detecting apparatus 520 may include a camera 521, a radar 522, a LiDAR 523, an ultrasonic sensor 524, an infrared sensor 525, and a processor 530. In some implementations, the object detecting apparatus 520 may further include other components in addition to the components described, or may not include some of the components described.

The processor 530 may control an overall operation of each unit of the object detecting apparatus 520. The processor 530 may detect an object based on an acquired image, and track the object. The processor 530 may execute operations, such as a calculation of a distance from the object, a calculation of a relative speed with the object and the like, through an image processing algorithm.

In some implementations, the object detecting apparatus 520 may include a plurality of processors 530 or may not include any processor 530. For example, each of the camera 521, the radar 522, the LiDAR 523, the ultrasonic sensor 524 and the infrared sensor 525 may include the processor in an individual manner.

When the processor 530 is not included in the object detecting apparatus 520, the object detecting apparatus 520 may operate according to the control of a processor of an apparatus within the vehicle 500 or the controller 570.

The navigation system 550 may provide location information related to the vehicle based on information obtained through the communication apparatus 400, in particular, a location information unit 420. Also, the navigation system 550 may provide a path (or route) guidance service to a destination based on current location information related to the vehicle. In addition, the navigation system 550 may provide guidance information related to surroundings of the vehicle based on information obtained through the object detecting apparatus 520 and/or a V2X communication unit 430. In some examples, guidance information, autonomous driving service, etc. may be provided based on V2V, V2I, and V2X information obtained through a wireless communication unit operating together with the antenna system 1000.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a 4G wireless communication module 450, and a processor 470. According to an embodiment, the communication apparatus 400 may further include other components in addition to the components described, or may not include some of the components described.

The short-range communication unit 410 is a unit for facilitating short-range communications. The short-range communication unit 410 may construct short-range wireless area networks to perform short-range communication between the vehicle 500 and at least one external device. The location information unit 420 may be a unit for acquiring location information related to the vehicle 500. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit implementing communication protocols such as V2I, V2V, and V2P. The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal. In some implementations, the light-emitting diode may be integrated with lamps provided on the vehicle 500.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

In some examples, the antenna module 300 disposed in the vehicle 500 may include a wireless communication unit. In this regard, the vehicle 500 may be an electric vehicle (EV) or a vehicle that can be connected to a communication system independently of an external electronic device. In this regard, the communication apparatus 400 may include at least one of the short-range communication unit 410, the location information unit 420, the V2X communication unit 430, the optical communication unit 440, a 4G wireless communication module 450, and a 5G wireless communication module 460.

The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) structure. The 4G base station and the 5G base station may be disposed in the Non-Stand-Alone (NSA) structure. Alternatively, the 5G base station may be disposed in a Stand-Alone (SA) structure at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, 5G and 4G networks may use the same frequency band, and this may be referred to as LTE re-farming. In some examples, a Sub 6 frequency band, which is a range of 6 GHz or less, may be used as the 5G frequency band. On the other hand, a millimeter-wave (mmWave) range may be used as the 5G frequency band to perform wideband high-speed communication. When the mmWave band is used, the electronic device may perform beamforming for communication coverage expansion with a base station.

On the other hand, regardless of the 5G frequency band, 5G communication systems can support a larger number of MIMOs to improve a transmission rate. In this instance, UL MIMO may be performed by a plurality of 5G transmission signals transmitted to a 5G base station. In addition, DL MIMO may be performed by a plurality of 5G reception signals received from the 5G base station.

In some examples, the wireless communication unit 110 may be in a Dual Connectivity (DC) state with the 4G base station and the 5G base station through the 4G wireless communication module 450 and the 5G wireless communication module 460. As such, the dual connectivity with the 4G base station and the 5G base station may be referred to as EUTRAN NR DC (EN-DC). On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460. Short-range communication between electronic devices (e.g., vehicles) may be performed using the 4G wireless communication module 450 and the 5G wireless communication module 460. In some implementations, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module. In this regard, 4G+WiFi CA may be performed using the 4G wireless communication module 450 and the Wi-Fi communication module. Or, 5G+WiFi CA may be performed using the 5G wireless communication module 460 and the Wi-Fi communication module.

In some examples, the communication apparatus 400 may implement a display apparatus for a vehicle together with the user interface apparatus 510. In this instance, the display apparatus for the vehicle may be referred to as a telematics apparatus or an Audio Video Navigation (AVN) apparatus.

Hereinafter, an antenna assembly (antenna module) that may be disposed on a window of a vehicle according to the present disclosure and an antenna system for a vehicle including the antenna assembly will be described. In this regard, the antenna assembly may refer to a structure in which conductive patterns are combined on a dielectric substrate, and may also be referred to as an antenna module.

Figure 5A:
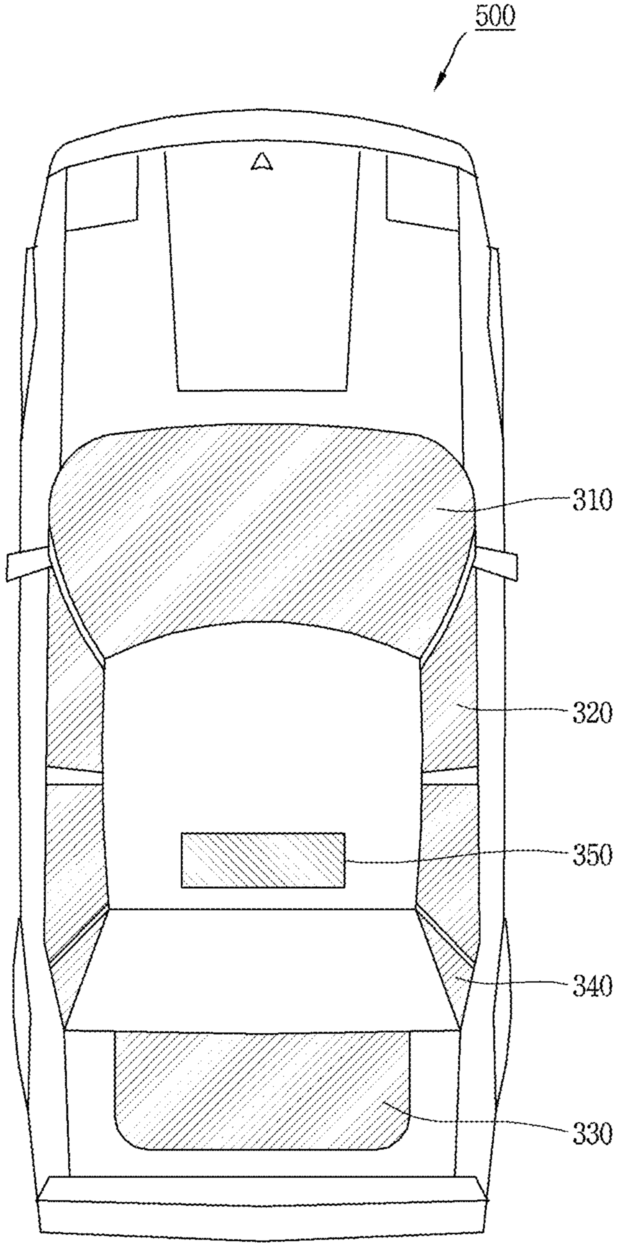
FIG. 5A illustrates glass of a vehicle in which an example of an antenna module can be disposed and FIG. 5B illustrates position and shape of quarter glass corresponding to a partial region of a door region in difference vehicles.
Figure 5B:
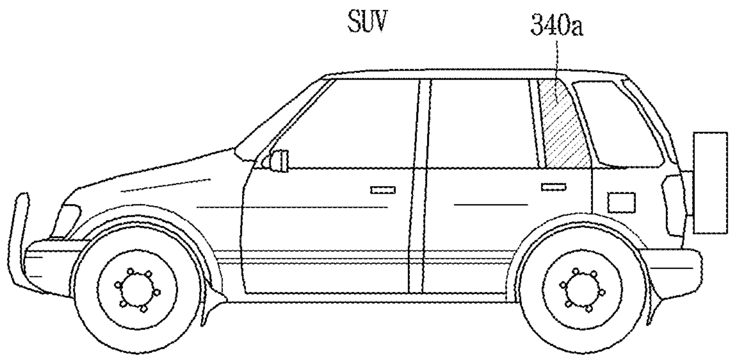
Figure 5B:
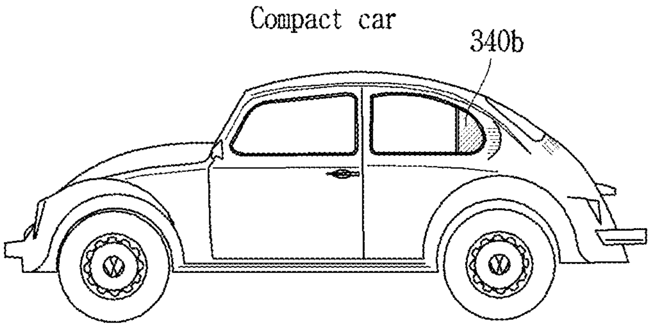
Figure 5B:
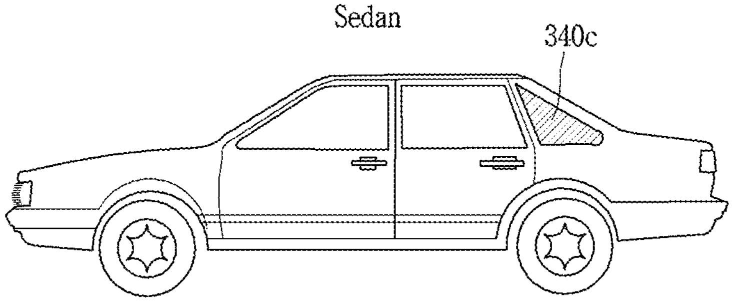

FIG. 5A illustrates glass of a vehicle in which an example of an antenna module can be disposed. FIG. 5B illustrates position and shape of quarter glass corresponding to a partial region of a door region in difference vehicles.

Referring to FIG. 5A, the vehicle 500 may include front glass 310, door glass 320, rear glass 330, and quarter glass 340. In some examples, the vehicle 500 may further include top glass 350 that is a window disposed on the roof frame 2000*c* illustrated in FIG. 3C.

Therefore, the glass constituting the window of the vehicle 500 may include the front glass 310 disposed at a front region of the vehicle, the door glass 320 disposed at a door region of the vehicle, and the rear glass 330 disposed at a rear region of the vehicle. In some examples, the glass constituting the window of the vehicle 500 may further include the quarter class 340 disposed at a partial region of the door region of the vehicle. In addition, the glass constituting the window of the vehicle 500 may further include the top glass 350 spaced apart from the rear glass 330 and disposed at an upper region of the vehicle.

The front glass 310 may be referred to as a front windshield because it prevents wind blown from a front side from entering the inside of the vehicle. The front glass 310 may have a two-layer bonding structure having a thickness of about 5.0 to 5.5 mm. The front glass 310 may have a bonding structure of glass/shatterproof film/glass.

The door glass 320 may have a two-layer bonding structure or may be formed of single-layer compressed glass. The rear glass 330 may have a two-layer bonding structure having a thickness of about 3.5 to 5.5 mm or may be formed of single-layer compressed glass. In the rear glass 330, a spaced distance between a transparent antenna and a hot wire and an AM/FM antenna is required. The quarter glass 340 may be formed of single-layer compressed glass having a thickness of about 3.5 to 4.0 mm, but is not limited thereto.

Referring to (a) of FIG. 5B, quarter glass 340*a* of a vehicle such as an SUV may be formed in a first shape having a first size. Referring to (b) of FIG. 5B, quarter glass 340*b* of a compact vehicle, which has a shape similar to that of an SUV and is small in size may be formed in a first shape having a second size. The second size of the quarter glass 340*b* of the compact vehicle may be smaller than the first size of the quarter glass 340*a* of the vehicle such as the SUV. Referring to (c) of FIG. 5B, quarter glass 340*c* of a vehicle such as a sedan may be formed in a second shape having a third size which is different from the first shape. The third size of the quarter glass 340*c* of the vehicle such as the sedan may be smaller than the first size of the quarter glass 340*a* of the vehicle such as the SUV.

The size of the quarter glass 340 may vary depending on a type of vehicle, and may be significantly smaller than the sizes of the front glass 310 and the rear glass 330. In order to place an antenna at the quarter glass 340, a small antenna pattern that can fit into the quarter glass 340 should be designed. When an antenna size is reduced, radiation efficiency may be lowered and a bandwidth may also be narrowed in a low band (LB). Accordingly, an antenna design that maintains radiation efficiency and a wide band in a small antenna is required. In this regard, an arrangement of transparent antennas may be determined according to a vehicle glass specification and a TCU position, and the antenna arrangement may decide overall antenna performance.

In some examples, a wideband transparent antenna structure that can be disposed on glass of a vehicle can be implemented as a single dielectric substrate on the same plane as a CPW feeder. In addition, the wideband transparent antenna structure that can be disposed on the glass of the vehicle may be implemented as a structure in which grounds are formed at both sides of a radiator so as to constitute a wideband structure.

Figure 6A:
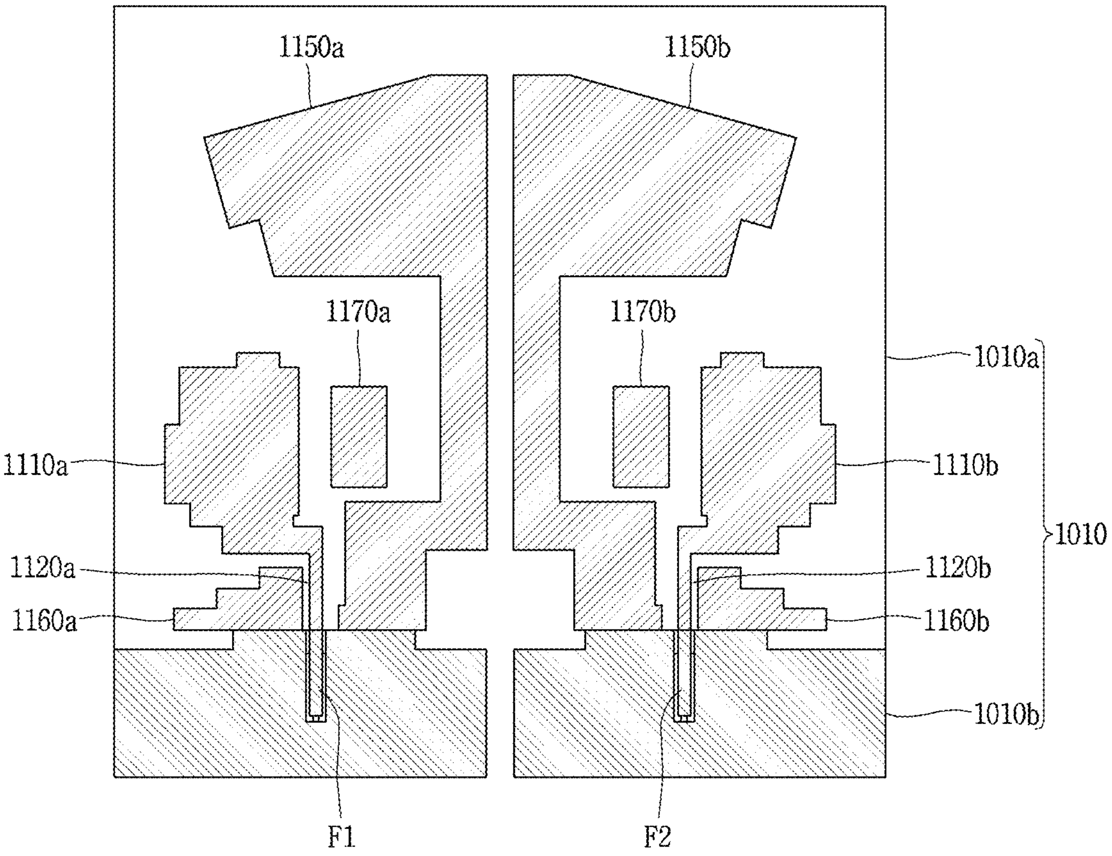
FIGS. 6A and 6B illustrate a structure, in which first and second grounds of first and second radiators are separated, and a surface current distribution in a transparent antenna structure.
Figure 6B:
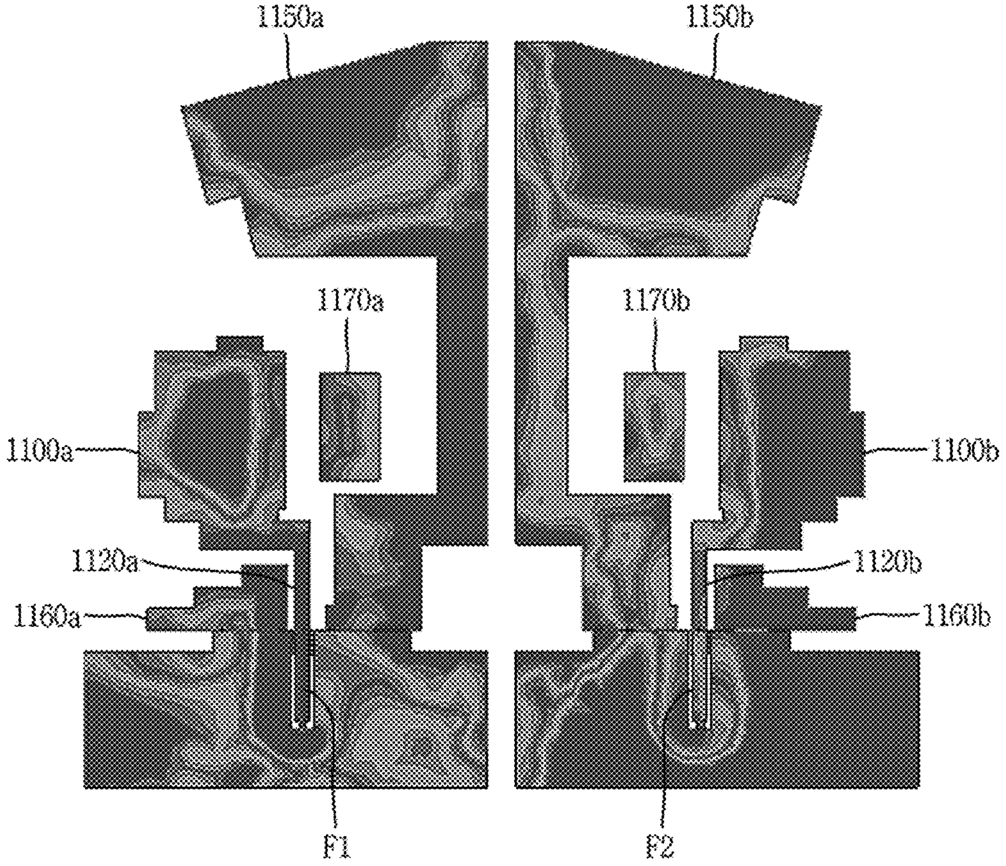
Figure 7A:
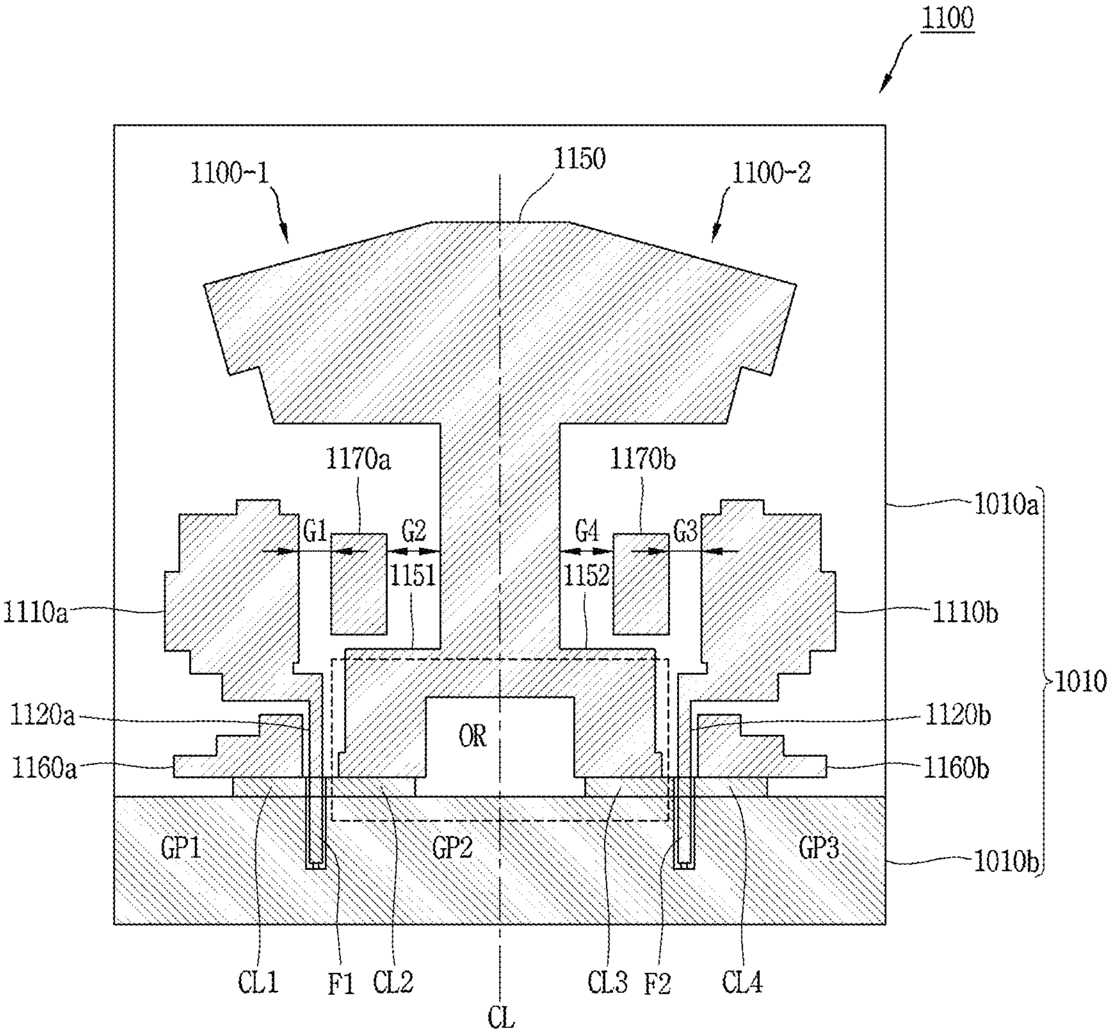
FIGS. 7A and 7B illustrate a structure, in which first and second grounds of first and second radiators are separated, and a surface current distribution in a transparent antenna structure.
Figure 7B:
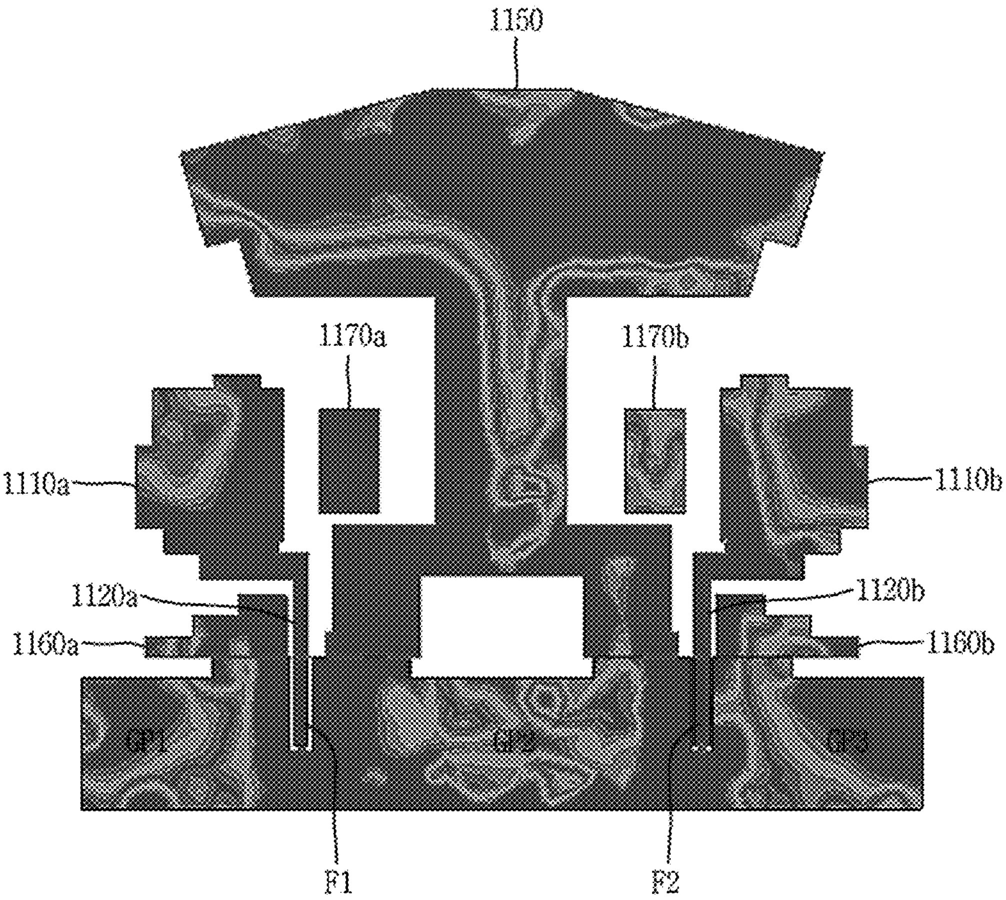
Figure 8A:
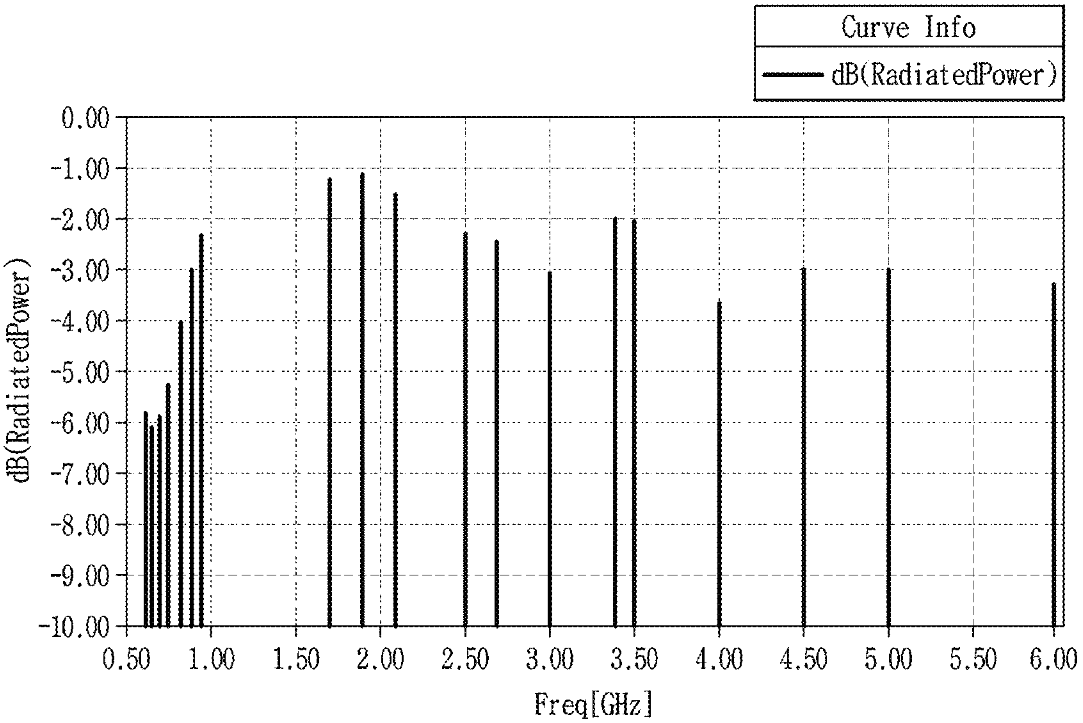
FIGS. 8A and 8B illustrate radiated power according to frequency bands in the transparent antenna structures of FIGS. 6A and 7B.
Figure 8B:
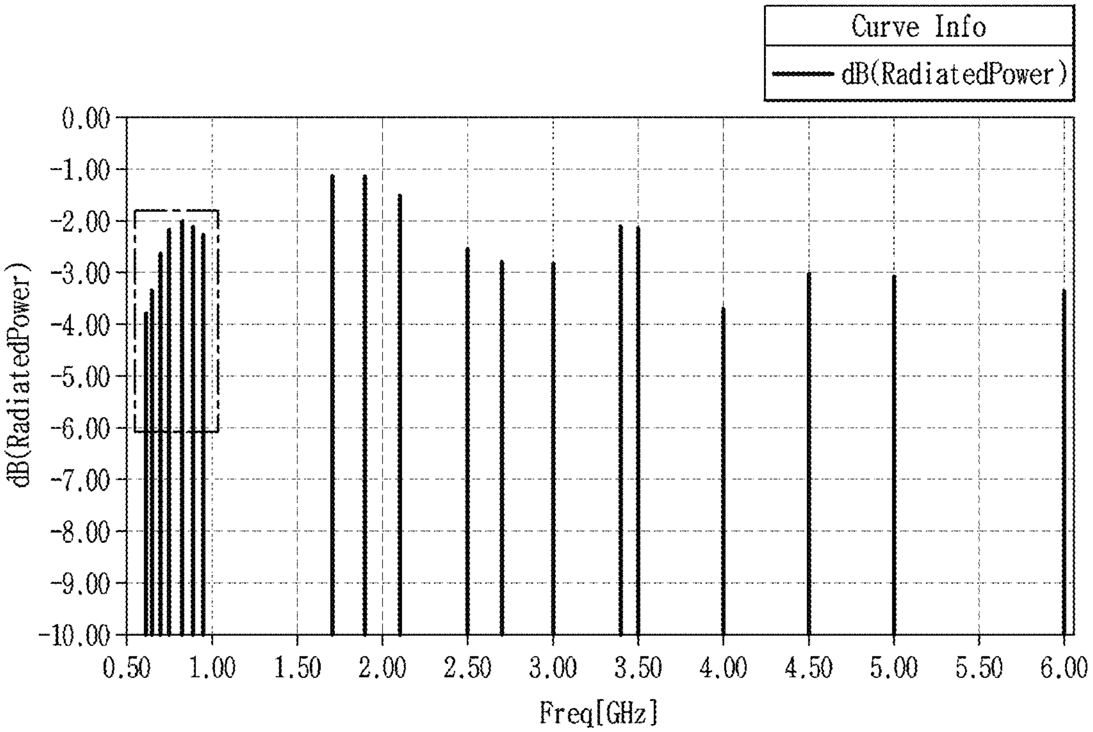

FIGS. 6A and 6B illustrate a structure, in which first and second grounds of first and second radiators are separated, and a surface current distribution in a transparent antenna structure. FIGS. 7A and 7B illustrate a structure, in which first and second grounds of first and second radiators are separated, and a surface current distribution in a transparent antenna structure. FIGS. 8A and 8B illustrate radiated power according to frequency bands in the transparent antenna structures of FIGS. 6A and 7B.

Referring to FIGS. 6A and 7A, CPW feeders F1 and F2 may be connected to a first conductive pattern 1110*a* and a fourth conductive pattern 1110*b* through a first feeding line 1120*a* and a second feeding line 1120*b*.

Referring to FIG. 6A, a first conductive plane 1150*a* may be disposed at one side of the first conductive pattern 1110*a* and a second conductive pattern 1160*a* may be disposed at another side of the first conductive pattern 1110*a*. On the other hand, a third conductive plane 1150*b* may be disposed at one side of the fourth conductive pattern 1110*b* and a fourth conductive plane 1160*b* may be disposed at another side of the fourth conductive pattern 1110*b*. This can implement an isolation ground structure in which the first conductive plane 1150*a* and the third conductive plane 1150*b* of the first conductive pattern 1110*a* and the fourth conductive pattern 1110*b* are isolated from each other.

FIG. 6B illustrates a surface current distribution at 617 MHz of the first band, which is the low band LB. Referring to FIG. 6B, in the first band that is the low band LB, the surface current distribution is mainly formed on the first conductive plane (i.e., first ground pattern) 1150*a* and is formed at a low level in the third conductive plane (i.e., third ground pattern) 1150*b*. This may shorten lengths of the current paths and lower the radiation efficiency of the antenna in the first band, which is the low band LB.

In some examples, referring to FIG. 7A, a third conductive pattern 1150 may be disposed at a region between one side of a first conductive pattern 1110*a* and one side of the fourth conductive pattern 1110*b* facing the one side of the first conductive pattern 1110*a*. Accordingly, the third conductive pattern 1150 may be formed as a shared ground structure in which ground patterns of the first conductive pattern 1110*a* and the fourth conductive pattern 1110*b* are integrally formed with each other. In this regard, since first and second antenna structures 1100-1 and 1100-2 share the third conductive pattern 1150, the third conductive pattern 1150 may be referred to as a shared ground plane (pattern).

In some examples, a second conductive pattern 1160*a* and a fifth conductive pattern 1160*b* may operate as grounds in some bands, so they may be referred to as a first ground pattern 1160*a* and a third ground pattern 1160*b*. Since the second ground pattern 1150 has a structure of sharing the first and fourth conductive patterns 1110*a* and 1110*b*, it may be referred to as a shared ground pattern. The second and fifth conductive patterns 1160*a* and 1160*b* may also be referred to as first and second extended ground patterns. However, the second conductive pattern 1160*a* and the fifth conductive pattern 1160*b* may operate as radiators, not as the grounds, together with the first and fourth conductive patterns 1110*a* and 1110*b*, in some other bands.

FIG. 7B illustrates a surface current distribution at 617 MHz of the first band, which is the low band LB. Referring to FIG. 7B, in the first band, which is the low band LB, the surface current is evenly distributed at both the first sub region 1151 and the second sub region 1152 of the third conductive pattern 1150. Accordingly, the current paths can be increased in length and the radiation efficiency of the antenna can also be increased in the first band, which is the low band LB.

In this regard, referring to FIG. 8A, a low level of radiated power is shown particularly at a low frequency such as 617 MHz in the first band, which is the low band LB. On the other hand, referring to FIG. 8B, a relatively high level of radiated power is shown particularly at the low frequency such as 617 MHz in the first band, which is the low band LB, compared to that in FIG. 8A. This phenomenon may result from that the surface current is evenly distributed at both the first sub region 1151 and the second sub region 1152 of the third conductive pattern 1150, in the first band as the low band LB, by the third conductive pattern 1150. Accordingly, the current paths can be increased in length and the radiation efficiency of the antenna can also be increased in the first band, which is the low band LB.

Figure 9:
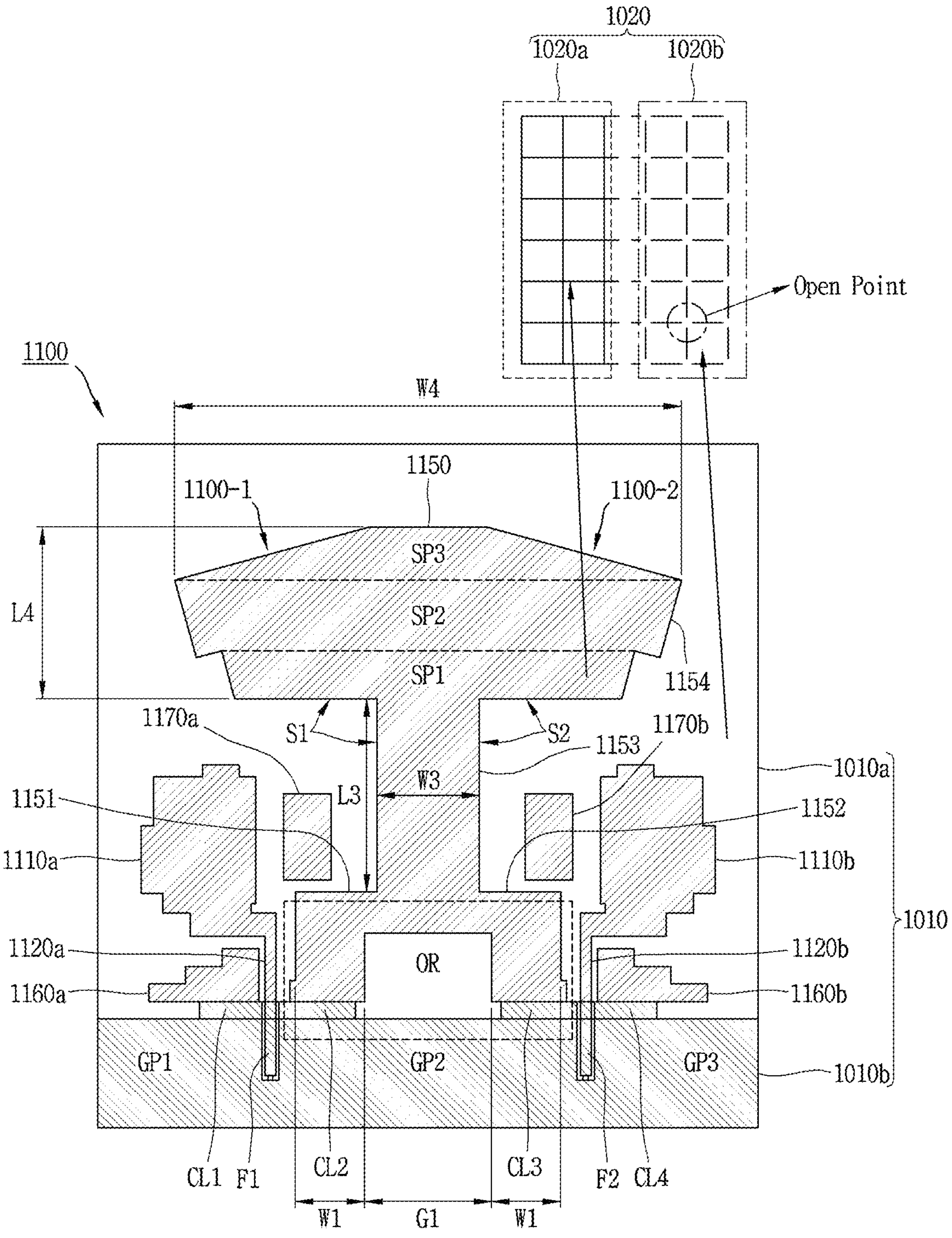
FIG. 9 illustrates an antenna assembly structure of a shared ground structure and a detailed structure of the shared ground structure according to an example.

Hereinafter, an antenna assembly structure of a shared ground structure and a detailed structure of the shared ground structure according to an example will be described. FIG. 9 illustrates an antenna assembly structure of a shared ground structure and a detailed structure of the shared ground structure according to an example.

Referring to FIGS. 7A and 9, the antenna assembly 1100 may be disposed on one side surface of a dielectric substrate 1010. The antenna assembly 1100 may include an antenna region 1010*a* and a ground region 1010*b*. The ground region 1010*b* may configure a Coplanar Waveguide (CPW) structure in which ground patterns GP1 to GP3 are disposed at both sides of a first feeding line (i.e., first feeder) F1 and a second feeding line (i.e., second feeder) F2. Accordingly, the ground region 1010*b* may be referred to as a feeding region 1010*b*.

The antenna assembly 1100 may be configured such that the antenna region 1010*a* includes conductive patterns on one side surface of the dielectric substrate 1010 so as to radiate a radio signal. The antenna region 1010*a* may comprise a first antenna structure 1100-1 and a second antenna structure 1100-2.

The ground region 1010*b* may be defined on the same plane as the antenna region 1010*a*. The ground region 1010*b* may include a first slot region at which the first feeding line F1 is disposed and a second slot region at which the second feeding line F2 is disposed. Ground patterns GP1 and GP2 may be disposed at both sides of the first slot region. Ground patterns GP2 and GP3 may be disposed at both sides of the second slot region. Accordingly, the first feeding line F1 disposed at the first slot region of the ground region 1010*b* and the second feeding line F2 disposed at the second slot region may configure the CPW structure.

The first feeding line F1 is configured to apply a radio signal to the conductive patterns of the first antenna structure 1100-1 may be disposed at the first slot region. The second feeding line F2 is configured to apply a radio signal to conductive patterns of the second antenna structure 1100-2 may be disposed at the second slot region. The first feeding line F1 and the second feeding line F2 of the ground region 1010*b* may be connected to the first feeding line 1120*a* and the second feeding line 1120*b* of the antenna region 1010*a*.

The first antenna structure 1100-1 may include the first conductive pattern 1110*a* electrically connected with the first feeding line F1 and including first conductive patterns to radiate a first signal, and the second conductive pattern 1160*a* and the third conductive pattern 1150 disposed at both sides of the first conductive pattern 1110*a*. The second antenna structure 1100-2 may include the fourth conductive pattern 1110*b* electrically connected with the second feeding line F2 and including second conductive patterns to radiate a second signal, and the third conductive pattern 1150 and the fifth conductive pattern 1160*b* disposed at both sides of the fourth conductive pattern 1110*b*.

The second conductive pattern 1160*a* may be electrically connected with the ground region 1010*b* by a first connection line CL1. Third conductive pattern 1150 may include a first portion 1151 and a second portion 1152. The first portion 1151 of the third conductive pattern 1150 may be electrically connected with the ground region 1010*b* by a second connection line CL2. The second portion 1152 of the third conductive pattern 1150 may be electrically connected with the ground region (1010*b*) by a third connection line CL3. The third conductive pattern 1150 may be electrically connected with the ground region 1010*b* by a second connection line CL2 and a third connection line CL3. The fifth conductive pattern 1160*b* may be electrically connected with the ground region 1010*b* by a fourth connection line CL4. Impedance matching of the first antenna structure 1100-1 can be achieved by the first connection line CL1 and the second connection line CL2. Impedance matching of the second antenna structure 1100-2 can be achieved by the third connection line CL3 and the fourth connection line CL4.

The antenna region 1010*a* may include a first conductive pattern 1110*a* and a fourth conductive pattern 1110*b* and may also include other conductive planes. In this regard, the antenna region 1010*a* may comprise first conductive pattern 1110*a*, a second conductive pattern 1160*a*, a third conductive pattern 1150, a fourth conductive pattern 1110*b* and a fifth conductive pattern 1160*b*. The first antenna structure 1100-1 may include the first conductive pattern 1110*a*, the second conductive pattern 1160*a* and the first portion 1151 of the third conductive pattern 1150. Meanwhile, the second antenna structure 1100-2 may include the fourth conductive pattern 1110*b*, the second portion 1152 of the third conductive pattern 1150 and the fifth conductive pattern 1160*b*.

The first conductive pattern 1110*a* may be disposed between the second conductive pattern 1160*a* and the third conductive pattern 1150. A size of the second conductive pattern 1160*a* may be smaller than a size of the third conductive pattern 1150. The third conductive pattern 1110*b* may be disposed between the third conductive pattern 1150 and the fifth conductive pattern 1160*b*. A size of the fifth conductive pattern 1160*b* may be smaller than the size of the third conductive pattern 1150. The third conductive pattern 1150 may be disposed between the first conductive pattern 1110*a* and the fourth conductive pattern 1110*b*. The third conductive pattern 1150 may include an open region OR disposed between the first portion 1151 of the third conductive pattern 1150 and the second portion 1152 of the third conductive pattern 1150.

Thus, the third conductive pattern 1150 may be shared as a part of radiator of the first antenna structure 1100-1 and the second antenna structure 1100-2. The first antenna structure 1100-1 and the second antenna structure 1100-2 may be configured in a symmetrical structure with respect to a center line CL of the third conductive pattern 1150. In this regard, the third conductive pattern 1150 may be configured in a symmetrical structure with respect to the center line CL of the third conductive pattern 1150.

The first conductive pattern 1110*a* may be connected to the feeding region 1010*b* through the first feeding line 1120*a*. The first conductive pattern 1110*a* may include first conductive patterns having a specific shape in one axial direction and another axial direction to radiate a first signal. The first conductive pattern 1110*a* may be formed as a rectangular patch or a polygonal patch in which a boundary region is recessed, but is not limited thereto. The one axial direction and another axial direction may be set to a y-axial direction and an x-axial direction, respectively. Accordingly, the first conductive pattern 1110*a* and the fourth conductive pattern 1110*b* each may be formed to have a predetermined length in the one axial direction and a predetermined width in another axial direction.

The fourth conductive pattern 1110*b* may be connected to the feeding region 1010*b* through the second feeding line 1120*b*. The fourth conductive pattern 1110*b* may include second conductive patterns having a specific shape in the one axial direction and another axial direction to radiate a second signal. The fourth conductive pattern 1110*b* may be formed as a rectangular patch or a polygonal patch in which a boundary region is recessed, but is not limited thereto.

When the antenna assembly 1100 is implemented as a transparent antenna, the conductive patterns may be configured as a metal mesh shape 1020*a*. That is, the antenna assembly 1100 may be implemented as the metal mesh shape 1020*a* that a plurality of grids are connected to one another. The metal mesh shape 1020*a* may be formed as a metal mesh grid with a rectangular shape but is not limited to its shape. On the other hand, the dummy mesh grid pattern 1020*b* disposed at the dielectric region may be implemented as an open dummy pattern in which a plurality of grids are disconnected at connection points (open points). In this regard, the antenna assembly 1100 may further comprise a plurality of dummy mesh grid pattern 1020*b* at outside portion of the first radiation structure 1100-1 and the second radiation structure 1100-2 on the one surface of the dielectric substrate 1010. The plurality of dummy mesh grid pattern 1020*b* may be not connected with the first and second feeding lines F1, F2 and the ground region 1010*b*. The plurality of dummy mesh grid pattern 1020*b* may be separated with each other.

Meanwhile, the first conductive pattern 1110*a* to the fifth conductive pattern 1160*b*, the first coupling pattern 1170*a* and the second coupling pattern 1170*b* may be formed as a metal mesh shape 1020*a*. The metal mesh shape 1020 may be configured to have a plurality of opening area on the dielectric substrate 1010. The plurality of opening area may form the open point in the region of the dummy mesh grid 1020*b*. Meanwhile, the first radiation structure 1110-1 and the second radiation structure 1110-2 may form a Coplanar Wavelength (CPW) structure.

Communication capacity in the vehicle can be increased by performing MIMO through the first antenna structure 1100-1 corresponding to the first conductive pattern 1110*a* and the second antenna structure 1100-2 corresponding to the fourth conductive pattern 1110*b*. In this regard, the first radiation structure 1100-1 may operate as a first antenna and the second radiation structure 1100-2 may operate as a second antenna. The first and second antenna structures 1100-1 and 1100-2 may operate in LB/MB/HB/UHB. Here, LB/MB/HB/UHB represent a low band, a mid-band, a high band, and an ultra-high band, respectively. In this regard, LB may be referred to as a first band, MB/HB may be referred to as a second band, and UHB may be referred to as a third band, but may not be limited thereto.

Each of the first radiation structure 1100-1 and the second radiation structure 1100-2 may operate in a 600 to 6000 MHz frequencies. Meanwhile, the first radiation structure 1100-1 and the second radiation structure 1100-2 may operate as a 2×2 MIMO (Multi-in Multi-output) system in the 600 to 6000 MHz frequencies. Meanwhile, the first radiation structure 1100-1 and the second radiation structure 1100-2 may be disposed in a rectangle size of limited width and height. In this regard, the first radiation structure 1100-1 and the second radiation structure 1100-2 may be disposed in a rectangle size of width 100 mm in one axis×height 83 mm in another axis.

The first antenna structure corresponding to the first conductive pattern 1110*a* and the second antenna structure corresponding to the fourth conductive pattern 1110*b* may operate in a wide band range of the first to third bands for 4G/5G communications. A Carrier Aggregation (CA) operation and/or a Dual Connectivity (DC) operation may be carried out in the vehicle using the first to third bands.

The antenna region 1010*a* may include the first conductive pattern 1110*a* and the fourth conductive pattern 1110*b* and may further include the third conductive pattern 1150. The third conductive pattern 1150 may be connected to the ground pattern of the feeding region 1010*b*. The third conductive pattern 1150 may be disposed between the first conductive pattern 1110*a* and the fourth conductive pattern 1110*b*. The third conductive pattern 1150 may operate as a ground of the first conductive pattern 1110*a* and the fourth conductive pattern 1110*b*. In this regard, the third conductive pattern 1150 may be connected to the ground pattern GP2 of the feeding region 1010*b*.

The antenna region 1010*a* may also be configured, similar to the feeding region 1010*b*, such that ground regions are disposed at both sides of a signal region. In this regard, the feeding region 1010*b* may be implemented as a CPW transmission line that ground regions are disposed at both sides of the signal region, thereby reducing a transmission loss. In some examples, the antenna region 1010*a* may be implemented in a structure in which the ground regions 1150 and 1160*a* are disposed at both sides of the first conductive pattern 1110*a*, so as to operate in a wide band range. Also, the antenna region 1010*a* may be implemented in a structure in which the ground regions 1150 and 1160*b* are disposed at both sides of the fourth conductive pattern 1110*b*, so as to operate in a wide band range.

In this regard, a main ground of the first conductive pattern 1110*a* and the fourth conductive pattern 1110*b* may define a common ground structure of the third conductive pattern 1150. This can reduce a size of the antenna assembly 1100 and thus the antenna assembly 1100 can be disposed in a limited space, such as the region of the quarter glass 340 of FIG. 5A.

The first and third conductive planes 1160*a* and 1160*b*, which are ground patterns different from the third conductive pattern 1150 as the common ground structure, may be disposed to be spaced apart from the first and fourth conductive patterns 1110*a* and 1110*b* by predetermined distances. The antenna assembly 1100 may include the second conductive pattern 1160*a* and the fifth conductive pattern 1160*b*.

The second conductive pattern 1160*a* may be connected to the ground pattern GP1 of the feeding region 1010*b*. The second conductive pattern 1160*a* may be disposed between one end portion of the first conductive pattern 1110*a* and the ground pattern GP1 in a spaced manner. The fifth conductive pattern 1160*b* may be connected to the ground pattern GP3 of the feeding region 1010*b*. The fifth conductive pattern 1160*b* may be disposed between one end portion of the fourth conductive pattern 1110*b* and the ground pattern GP3 in a spaced manner.

The third conductive pattern 1150 may include a plurality of ground regions including a plurality of conductive patterns. Accordingly, the third conductive pattern 1150 may form a long current path in the first band, which is the low band. In this regard, the third conductive pattern 1150 may include a first sub region 1151 and a second sub region 1152 partially separated from each other at their lower ends. The third conductive pattern 1150 may further include a third sub region 1153 in addition to the first sub region 1151 and the second sub region 1152. The third conductive pattern 1150 may include all of first to fourth sub regions 1151 to 1154.

In this regard, the first sub region 1151 may be connected with the ground region 1010*b* by the second connection line CL2. The second sub region 1152 may be connected with the ground region 1010*b* by the third connection line CL3. The third sub region 1153 may disposed between the first sub region 1151 and the second sub region 1152. A first end portion of the third sub region 1153 may be separated with the ground region 1010*b* by the open region OR. The third sub region 1153 may be connected with the first sub region 1151 and the second sub region 1152. The fourth sub region 1154 may be connected with a second end portion of the third sub region 1153. The first end of the third sub region 1153 may be disposed opposite the second end of the third sub region 1153. Meanwhile, the open region OR may be formed to be disposed between the first sub region 1151 and the second sub region 1152. In this regard, a width of open region OR may be disposed between the first sub region 1151 and the second sub region 1152. A height of the open region OR may be disposed between the first end portion of the third sub region 1153 and the ground region 1010*b*.

The first sub region 1151 may be disposed adjacent to one side of the first conductive pattern 1110*a* at a lower region in one axial direction. The second sub region 1152 may be disposed adjacent to one side of the fourth conductive pattern 1110*b* at the lower region in the one axial direction. An upper portion of the second sub region 1152 may be connected to an upper portion of the first sub region 1151. In this regard, the first and second ground regions 1151 and 1152 may be spaced apart from each other by a predetermined gap G1 at their lower portions, and a lower width of each of the first and second ground regions 1151 and 1152 may be defined as W1. The first and second ground regions 1151 and 1152 may be connected to each other at their upper portions. Accordingly, an upper width can be defined as W1+G1/2 at the upper portions of the first and second ground regions 1151 and 1152.

The third sub region 1153 may extend from a top of the first sub region 1151 and the second sub region 1152. The third sub region 1153 may have a third length L3 in the one axial direction and a third width W3 in another axial direction.

The fourth sub region 1154 may extend from a top of the third sub region 1153. The fourth sub region 1154 may have a fourth length L4 in the one axial direction and a fourth width W4 wider than the third width W3 in another axial direction. Accordingly, the third conductive pattern 1150 having the fourth sub region 1154 can form a long current path in the first band, which is the low band.

The third conductive pattern 1150 including the first to fourth ground regions 1151 to 1154 can allow sharing of the conductive pattern coupled to grounds between two antennas, thereby implementing a large-area ground. By virtue of the third conductive pattern 1150, antenna efficiency in the low band LB can be improved and the size of the antenna can be reduced.

The wideband antenna structure having the third conductive pattern 1150 can have a multi-step (layer) structure of conductive patterns and operate as a plurality of antenna elements. Thus, the wideband antenna structure may be referred to as a step(array) antenna. Features of the main configuration of the step (array) antenna will be summarized as follows, but may not be limited thereto.

1) Ground bridges 1151 and 1152 correspond to the first and second sub regions 1151 and 1152 that are partially spaced apart from each other by a gap region at the lower region of the third conductive pattern 1150. Since antennas operate by sharing the ground in the form of the third conductive pattern 1150, it is necessary to consider interference between the antennas. In this regard, a connecting portion of the third conductive pattern 1150, that is, a connecting portion between the first and second ground regions 1151 and 1152, and paths of the third and fourth ground regions 1153 and 1154 are designed to be long. Accordingly, isolation between the antennas can be improved while reducing a size of an entire antenna by the third conductive pattern 1150. In this regard, a path length of the ground bridges 1151 and 1152 at the LB frequency may be designed in the range of ⅙ to ¼ of a wavelength so that the isolation S21 is −10 dB or less.

2) The first and third conductive planes 1160*a* and 1160*b* may be formed in a multi-layer structure to improve LB/MB/HB/UHB impedance matching efficiency. For example, the lengths of the first and third conductive planes 1160*a* and 1160*b* may be set to ¼ of a wavelength of a frequency within the UHB band, but may not be limited thereto.

3) Parasitic patterns 1170*a* and 1170*b* may include first and second coupling patterns 1170*a* and 1170*b*. The parasitic patterns 1170*a* and 1170*b* may be disposed between the first and fourth conductive patterns 1110*a* and 1110*b* corresponding to the signal patterns and the ground patterns GP1 and GP3 of the feeding region 1010*b*. The first and second coupling patterns 1170*a* and 1170*b* may enable wideband design by forming MB/HB additional resonance by coupling with the first and fourth conductive patterns 1110*a* and 1110*b* corresponding to the signal patterns. In this regard, positions and sizes of the first and second coupling patterns 1170*a* and 1170*b* can vary so as not to lower radiation efficiency of an entire antenna.

4) FPCB corresponds to the feeding region 1010*b*. The ground patterns 1150, 1160*a*, and 1160*b* of the antenna region 1010*a* may be connected to the ground patterns GP1 to GP3 of the FPCB. In some examples, an entire ground area can be increased by increasing widths of the ground patterns GP1 and GP3 disposed at both sides of the feeding region 1010*b* corresponding to the FPCB, thereby enhancing radiation efficiency. Specifically, LB efficiency can be improved as the widths of the ground patterns GP1 and GP3 increase in both directions. In this regard, since efficiency is lowered in MB/HB, the widths of the ground patterns GP1 and GP3 and a gap therebetween may be adjusted in consideration of this.

In some examples, as described above, the fourth sub region 1154 may include a plurality of sub-patterns for forming a long current path for an operation in the low band and for an operation in a wide band range. In this regard, the first ground region 1154 may include a first sub-pattern SP1 and a second sub-pattern SP2. As another example, the fourth sub region 1154 may further include a third sub-pattern SP3 in addition to the first sub-pattern SP1 and the second sub-pattern SP2. Thus, the fourth sub region 1154 may comprise a first sub-pattern SP1, a second sub-pattern SP2 and a third sub-pattern SP3. In this regard, the first sub-pattern SP1 may be connected with the second end portion of the third sub region 1153. The second sub-pattern SP2 may be connected with the upper portion of the first sub-pattern SP1 of the third sub region 1153. The third sub-pattern SP3 may be connected with the upper portion of the second sub-pattern SP2 of the third sub region 1153. The width of the second end portion of the third sub region 1153 may be shorter than a width of the first sub-pattern SP1.

A lower end of the first sub-pattern SP1 may be spaced apart from an upper end of the first coupling pattern 1170*a* and an upper end of the first conductive pattern 1110*a*. The first sub-pattern SP1 may have a tapered structure such that a width in another axial direction is increased. The second sub-pattern SP2 may extend from the first sub-pattern SP1 and have different widths at a connecting portion. The second sub-pattern SP2 may have a tapered structure such that a width in another axial direction is increased. The widths of the first sub-pattern SP1 and the second sub-pattern SP2 may be increased at different ratios and may be different from each other at the connecting portions, such that the fourth sub region 1154 can perform a low-band operation and a wideband operation.

In this regard, the antenna assembly 1100 may include the first coupling pattern 1170*a* and the second coupling pattern 1170*b*. The first coupling pattern 1170*a* and the second coupling pattern 1170*b* may be configured to receive signals from the first radiator 11110*a* and the fourth conductive pattern 1110*b* without being connected to the first feeding line 1120*a* and the second feeding line 1120*b*. Accordingly, the first coupling pattern 1170*a* and the second coupling pattern 1170*b* may be referred to as a first parasitic pattern 1170*a* and a second parasitic pattern 1170*b*, respectively.

The first coupling pattern 1170*a* may be disposed between the first conductive pattern 1110*a* and the third sub region 1153 of the third conductive pattern 1150. The first coupling pattern 1170*a* may be disposed between the first conductive pattern 1110*a* and the third sub region 1153 of the third conductive pattern 1150. Also, the second coupling pattern 1170*b* may be disposed between the fourth conductive pattern 1110*b* and the third sub region 1153 of the shared ground 1150. The second coupling pattern 1170*b* may be disposed between the fourth conductive pattern 1110*b* and a second side of the third sub region 1153 of the third conductive pattern 1150.

Meanwhile, one or more gaps may be formed between the first or second coupling patterns 1170*a*, 1170 and adjacent conductive patterns to optimize wideband antenna operation. In this regard, first to fourth gaps G1-G4 may be formed between the first or second coupling patterns 1170*a*, 1170 and adjacent conductive patterns. The first gap G1 may be disposed between the first conductive pattern 1110*a* and the first coupling pattern 1170*a*. The second gap G2 may be disposed between the first coupling pattern 1170*a* and the first side of the third sub region 1153 of the third conductive pattern 1150. The width of the first gap G1 may be shorter than a width of the second gap G2. The third gap G3 may be disposed between the fourth conductive pattern 1110*b* and the second coupling pattern 1170*b*. The fourth gap G4 may be disposed between the second coupling pattern 1170*b* and the second side of the third sub region 1153 of the third conductive pattern 1150. The width of the third gap G3 may be shorter than a width of the fourth gap G4.

As described above, the first and second coupling patterns 1170*a* and 1170*b* may be disposed between the first and fourth conductive patterns 1110*a* and 1110*b* that are signal patterns and the third conductive pattern 1150, respectively. The first and second coupling patterns 1170*a* and 1170*b* may form additional resonance of MB/HB, which is the second band, by coupling with the first and fourth conductive patterns 1110*a* and 1110*b* as the signal patterns. Accordingly, the first and second coupling patterns 1170*a* and 1170*b* can enable the operation of the antenna assembly 1100 in the wideband range. The first and second coupling patterns 1170*a* and 1170*b* may be changed in position and size, so as not to decrease the radiation efficiency of the antenna assembly 1100.

In some examples, the third sub-pattern SP3 may extend from the second sub-pattern SP2. The third sub-pattern SP3 may have a tapered structure such that a width in another axial direction is increased. Unlike the first sub-pattern SP1 and the second sub-pattern SP2, the third sub-pattern SP3 may have a structure in which a width is decreased, so as to form a longer current path in the low band and enable wideband impedance matching. In summary, the first sub-pattern (SP1) may be connected with the second end portion of the third sub region 1153. The third sub-pattern SP3 may be configured to increase in width from a lower portion of the first sub-pattern SP1 to an upper portion of the first sub-pattern SP1. The second sub-pattern SP2 may be connected with the upper portion of the first sub-pattern SP1 of the third sub region 1153. The second sub-pattern SP2 may be configured to increase in width from a lower portion of the second sub-pattern SP2 to an upper portion of the second sub-pattern SP2. The third sub-pattern SP3 may be connected with the upper portion of the second sub-pattern SP2 of the third sub region 1153. The second sub-pattern SP2 may be configured to decrease in width from a lower portion of the third sub-pattern SP3 to an upper portion of the third sub-pattern SP3.

In this regard, the width of the lower portion of the first sub-pattern SP1 may be shorter than the width of the upper portion of the first sub-pattern SP1. The width of the upper portion of the first sub-pattern SP1 may be shorter than the width of the lower portion of the second sub-pattern (SP2). The width of the lower portion of the second sub-pattern SP2 may be shorter than the width of the upper portion of the second sub-pattern SP2. The width of the upper portion of the second sub-pattern SP2 may be equal with the width of the lower portion of the third sub-pattern SP3. The width of the upper portion of the third sub-pattern SP3 may be shorter than the width of the lower portion of the third sub-pattern SP3. The width of the lower portion of the first sub-pattern SP1 may be longer than the width of the upper portion of the third sub-pattern SP3.

Figure 10A:
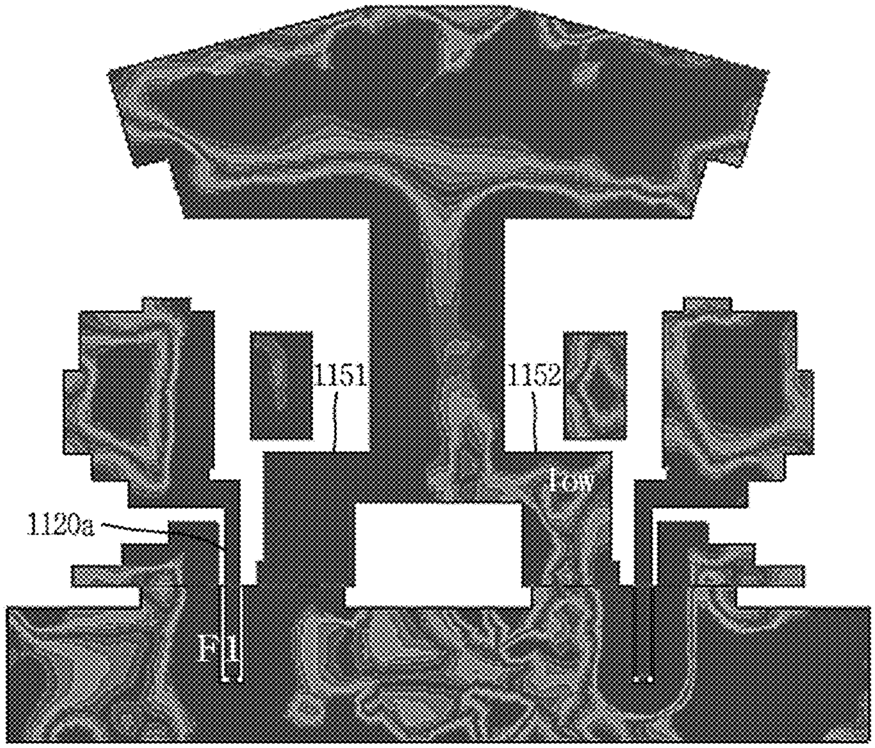
FIGS. 10A and 10B illustrate an example of a surface current distribution when a first signal and a second signal are applied to a first radiator and a second radiator of an antenna assembly.
Figure 10B:
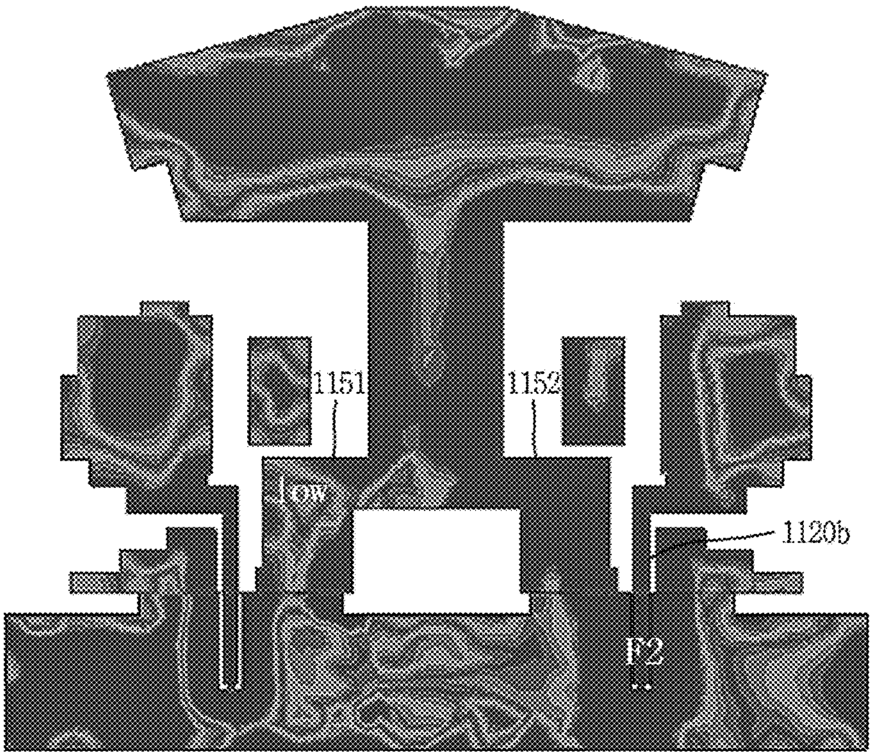
Figure 11A:
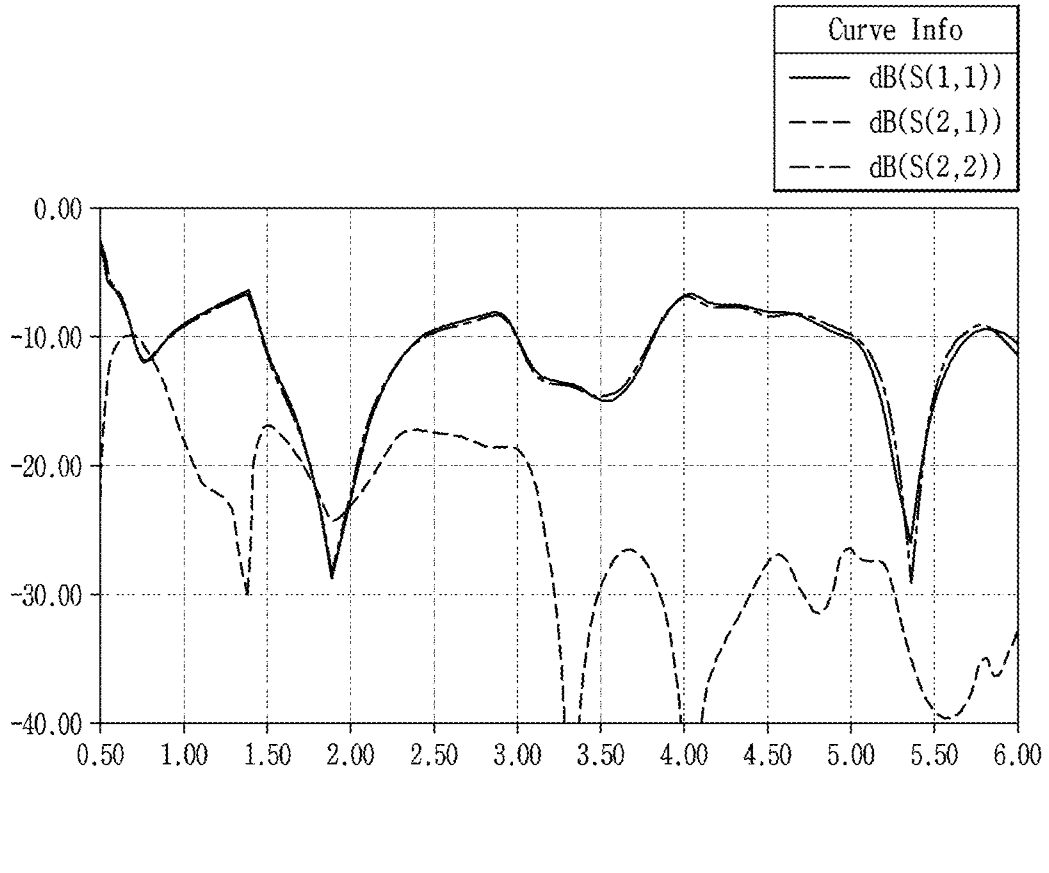
FIGS. 11A and 11B illustrate reflection coefficients and isolation of a first port and a second port of the antenna assembly of FIG. 9.
Figure 11B:
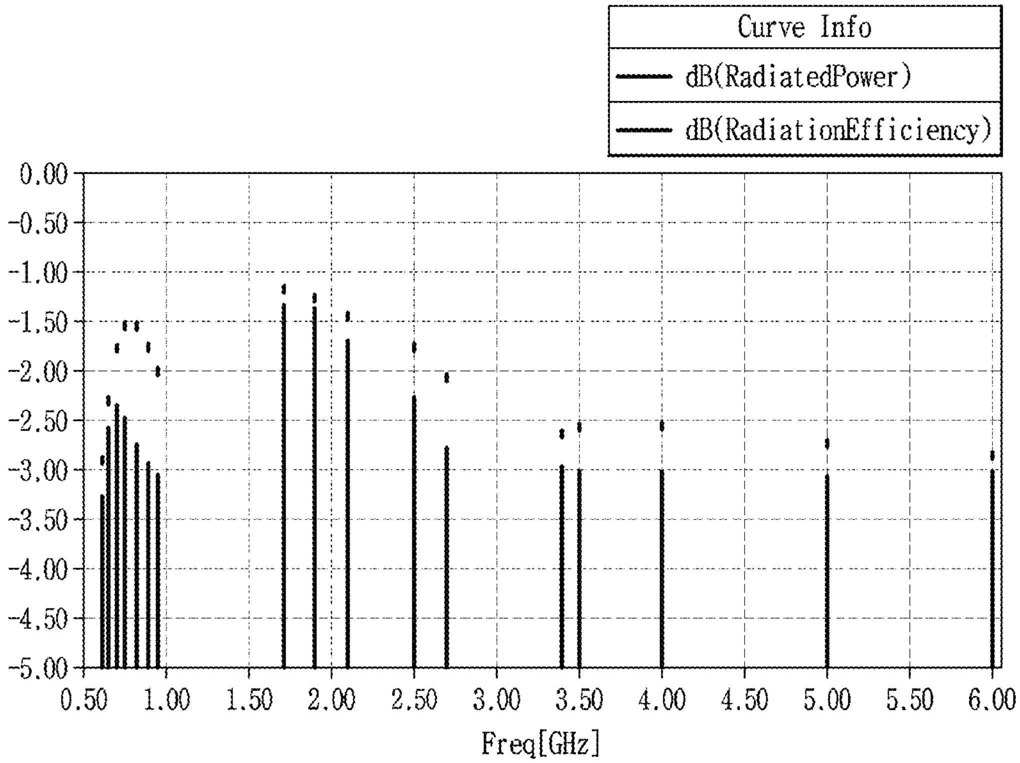

In the transparent antenna structure, the plurality of radiators may be disposed in the antenna assembly to enable the MIMO or diversity operation. In this regard, it may be necessary to reduce interference between the first and second radiators while minimizing the space for the antenna arrangement structure. FIGS. 10A and 10B illustrate an example of a surface current distribution when a first signal and a second signal are applied to the first radiator and the second radiator of the antenna assembly. FIGS. 11A and 11B illustrate reflection coefficients and isolation of a first port and a second port of the antenna assembly of FIG. 9. In addition, FIG. 11B illustrates radiated power and efficiency for each frequency band of the antenna assembly of FIG. 9.

Referring to FIGS. 9 and 10A, the surface current distribution is shown when a first signal is applied through the first feeding line 1120*a* at 617 MHz in the low band. On the other hand, referring to FIGS. 9 and 10B, the surface current distribution is shown when a second signal is applied through the second feeding line 1120*b* at 617 MHz in the low band.

Referring to FIGS. 9 and 10A, even when the first signal is applied through the first feeding line 1120*a*, a ratio of the signal transmitted to the second sub region 1152 of the third conductive pattern 1150 may be low. Also, referring to FIGS. 9 and 10B, even when the second signal is applied through the second feeding line 1120*b*, a ratio of the signal transmitted to the first sub region 1151 of the third conductive pattern 1150 may be low. Accordingly, interference between the first antenna structure including the first conductive pattern 1110*a* and the second antenna structure including the fourth conductive pattern 1110*b* can be reduced.

The first and second antenna structures may be defined to share the third and fourth ground regions 1153 and 1154 that correspond to the upper part of the third conductive pattern 1150. Accordingly, an entire antenna size including the first and second antenna structures can be reduced and the long current path can be formed in the first band as the low band. In some examples, the first and second antenna structures may be defined by partially separating the first sub region 1151 and the second sub region 1152 by the open region OR, which correspond to the lower part of the third conductive pattern 1150. By the partially-separated first and second antenna structures, the antenna sharing structure capable of reducing interference between the first and second antenna structures while decreasing the entire antenna size of the first and second antenna structures can be achieved.

Referring to FIGS. 9 and 11A, reflection coefficients of the first antenna structure and the second antenna structure may be S11 and S22. Referring to S11 and S22, the first and second antenna structures can operate as antennas by resonances generated in the low band LB as the first band, the middle band MB as the second band, and the high band HB as the third band. In some examples, referring to S21, which is the isolation between the first antenna structure and the second antenna structure, the isolation in the first band to the third band has values of −10 dB or less. Referring to S21, which is the isolation between the first antenna structure and the second antenna structure, the first antenna structure and the second antenna structure may be regarded as independent antenna structures having a low interference level therebetween.

Radiated power for each frequency band indicated by a dotted line in FIG. 11B corresponds to radiated power of FIG. 8B. Also, efficiency for each frequency band indicated by a solid line in FIG. 11B is a value obtained by considering the reflection coefficients of the antennas in addition to the radiated power for each frequency of FIG. 8B. The radiated power for each frequency of FIG. 8B is expressed up to −10 dB in a unit of 1.0 dB, and the antenna efficiency for each frequency band of FIG. 11B is expressed up to −5 dB in a unit of 0.5 dB. Referring to FIGS. 8B, 9, and 11B, the antenna efficiency has a value of −3.5 dBi or more in the full band including the first band to the third band.

Figure 12A:
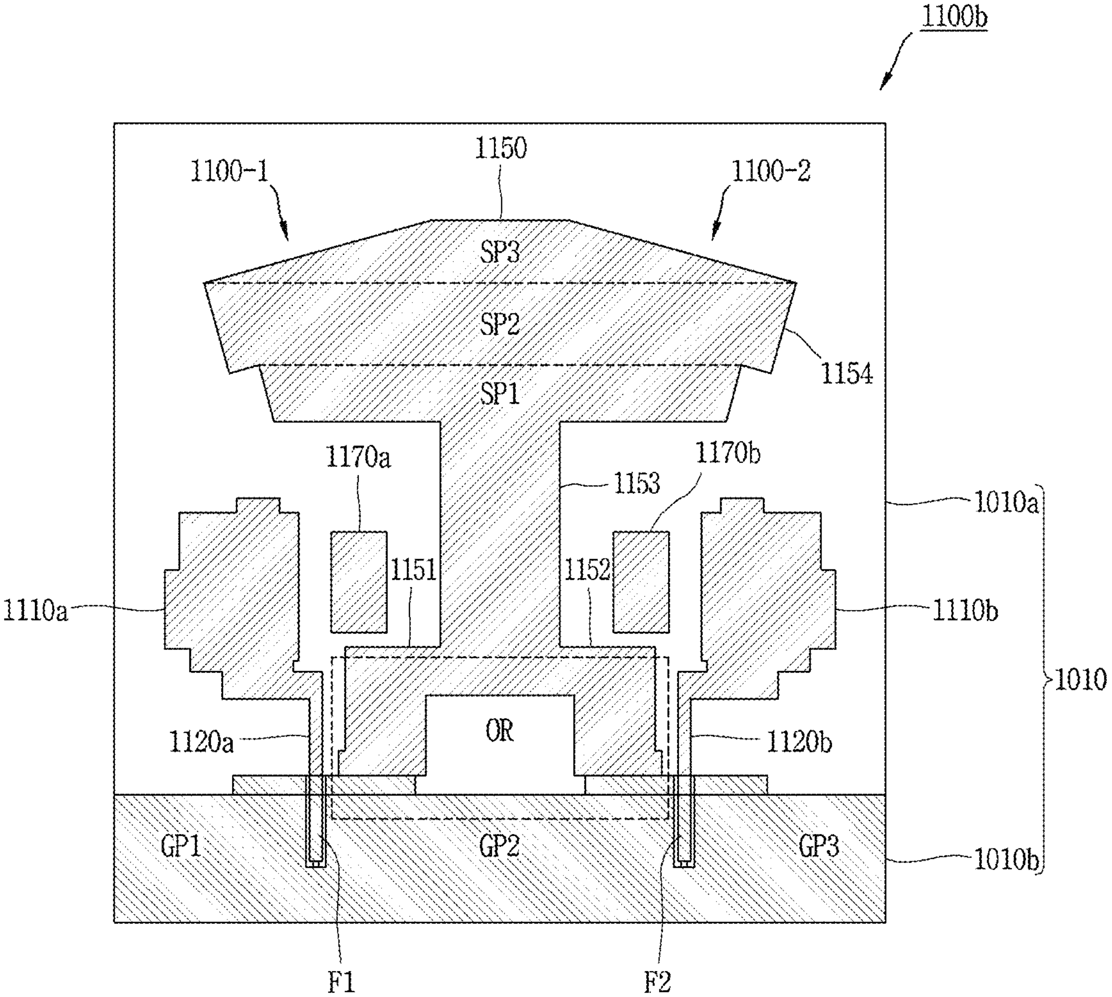
FIG. 12A illustrates another example of a structure of a wideband antenna having a shared ground pattern and FIG. 12B compares reflection coefficients of the antenna structure of FIG. 12A with reflection coefficients of the antenna structure of FIG. 9.
Figure 12B:
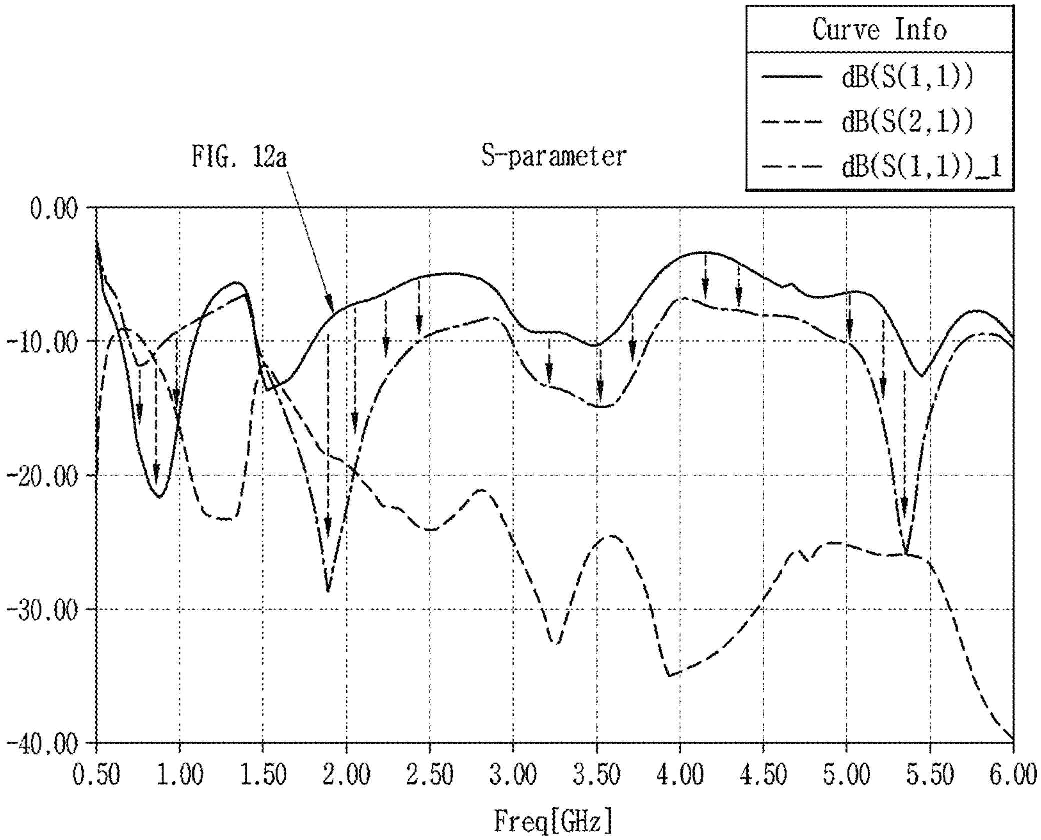

In the wideband antenna structure, the ground pattern within the antenna region can be configured to include only the third conductive pattern 1150 without the first and third conductive planes 1160*a* and 1160*b* that correspond to the separate ground patterns. FIG. 12A illustrates another example of a structure of a wideband antenna having a shared ground. FIG. 12B compares reflection coefficients of the antenna structure of FIG. 12A with reflection coefficients of the antenna structure of FIG. 9.

Referring to FIG. 12A, the antenna assembly 1100 may include the first and fourth conductive patterns 1110*a* and 1110*b* and the third conductive pattern 1150 without extended ground patterns. In addition, the antenna assembly 1100 may further include the first and second coupling patterns 1170*a* and 1170*b* corresponding to the parasitic patterns.

Referring to FIGS. 11A, 12A and 12B, the reflection coefficient characteristic of the antenna structure of FIG. 12A may be slightly degraded in the second band and the third band, compared to the antenna structure of FIG. 9. However, the reflection coefficient characteristic of the antenna structure of FIG. 12A is slightly improved in the first band, compared to the antenna structure of FIG. 9.

In this regard, in the vehicle glass configuration of FIG. 5A, the antenna structure of FIG. 12A may be disposed at a partial region to transmit and receive signals of the first band. In this regard, a first antenna 1100 having the antenna structure of FIG. 5A may be disposed at one region of the front glass 310 of the vehicle and a second antenna 1100*b* having the antenna structure of FIG. 12A may be disposed at another region. The first antenna 1100 may transmit and receive a signal in the second band and/or the third band and the second antenna 1100*b* may transmit and receive a signal in the first band. Accordingly, communication performance in the vehicle can be optimized for each band through the antenna structures optimized for each band.

Figure 13A:
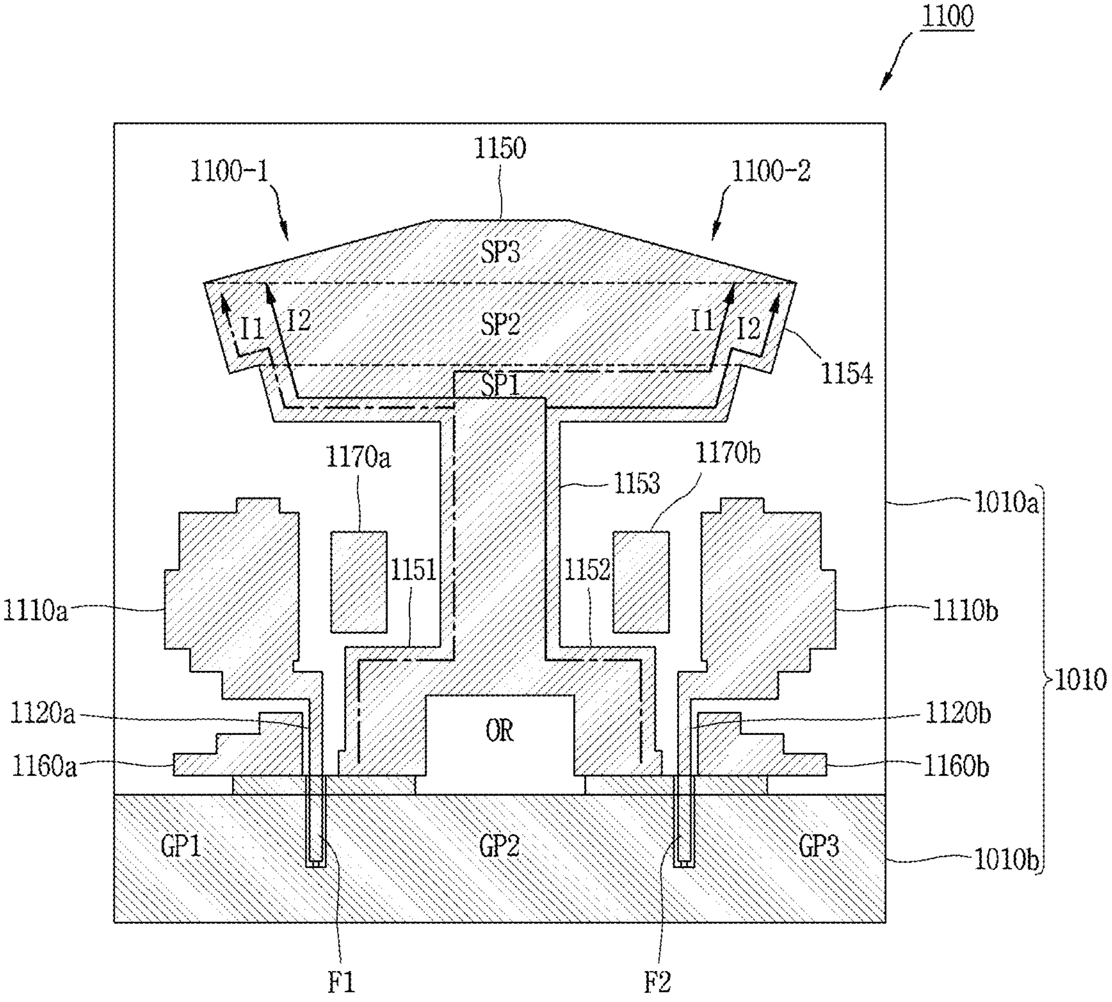
FIGS. 13A to 13C illustrate exemplary current paths of first to third bands of an antenna structure having a shared ground pattern.
Figure 13B:
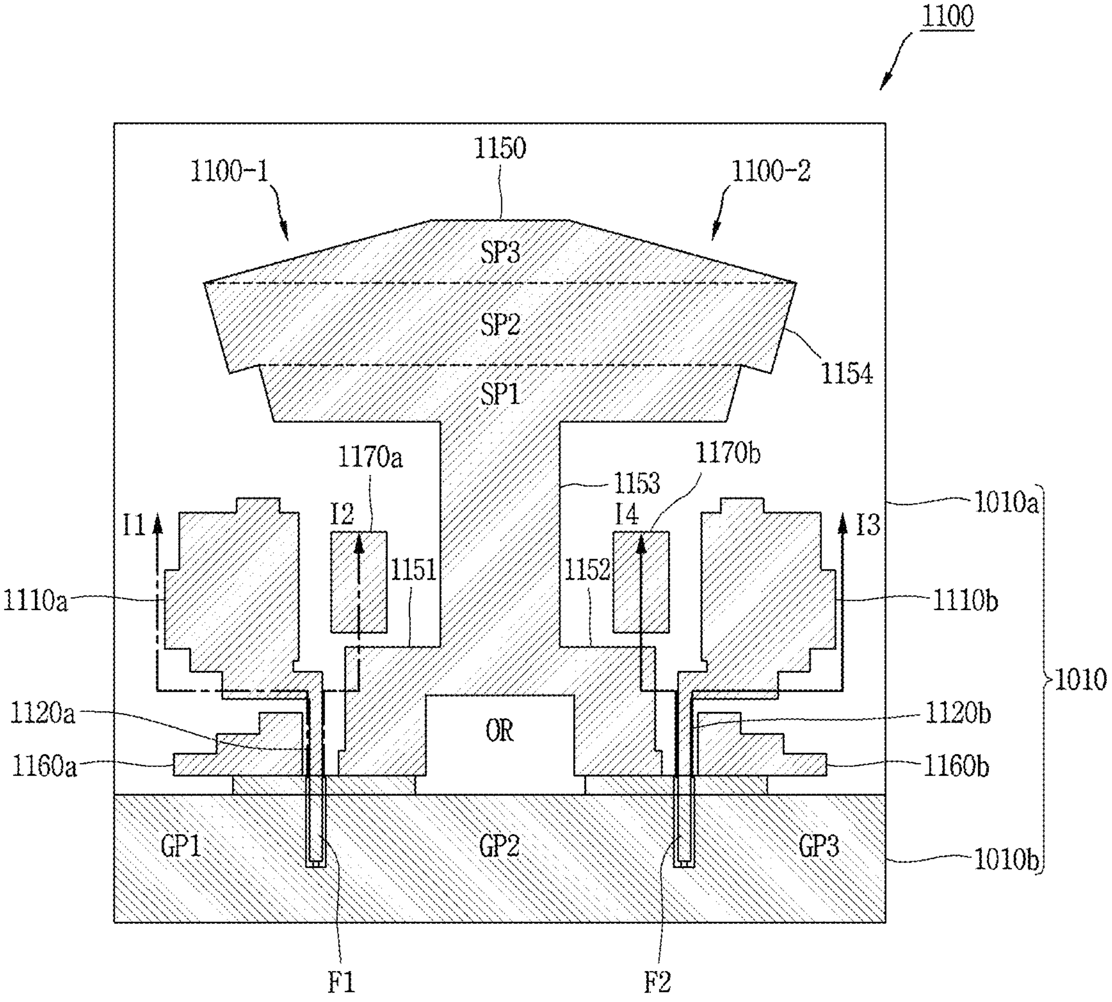
Figure 13C:
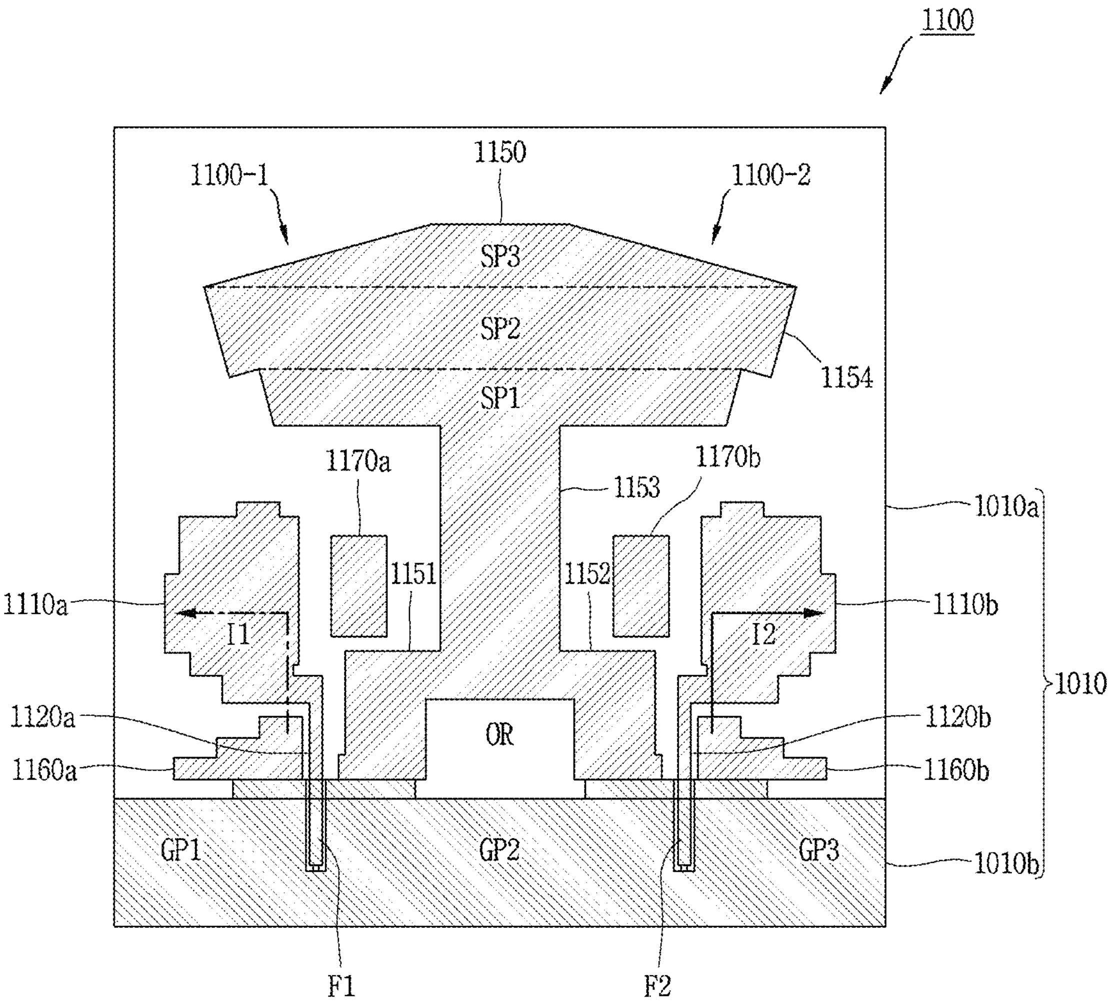
Figure 14A:
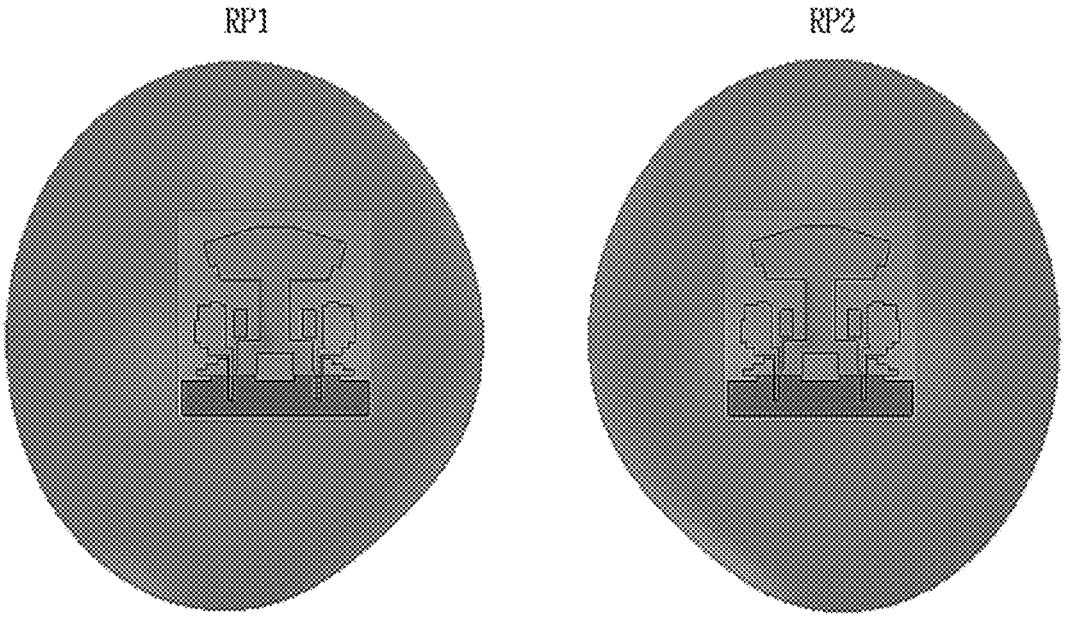
FIGS. 14A to 14C illustrate radiation patterns according to the current paths of the first to third bands of FIGS. 13A to 13C.
Figure 14B:
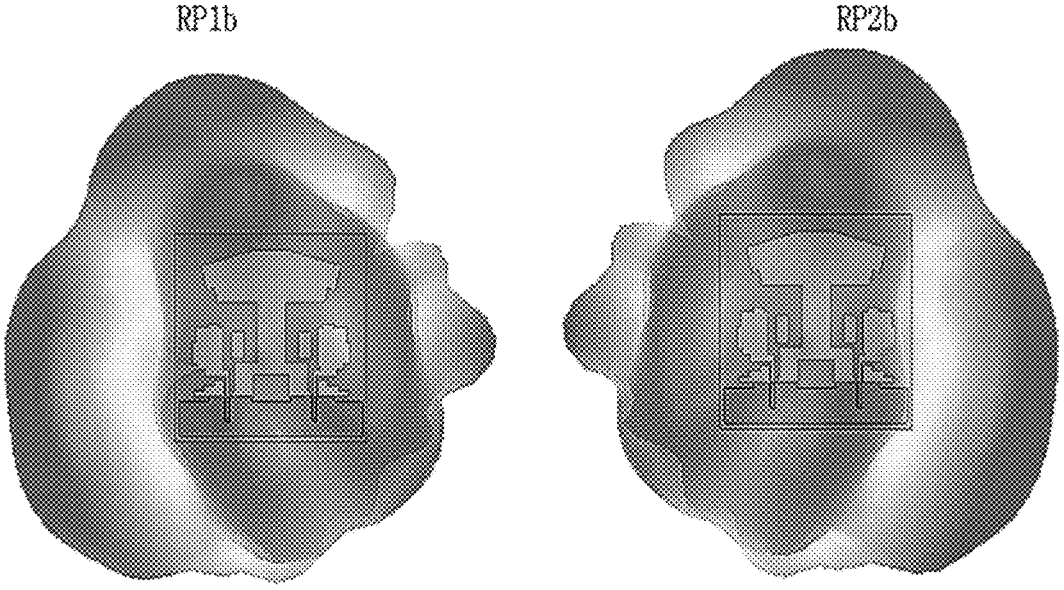
Figure 14C:
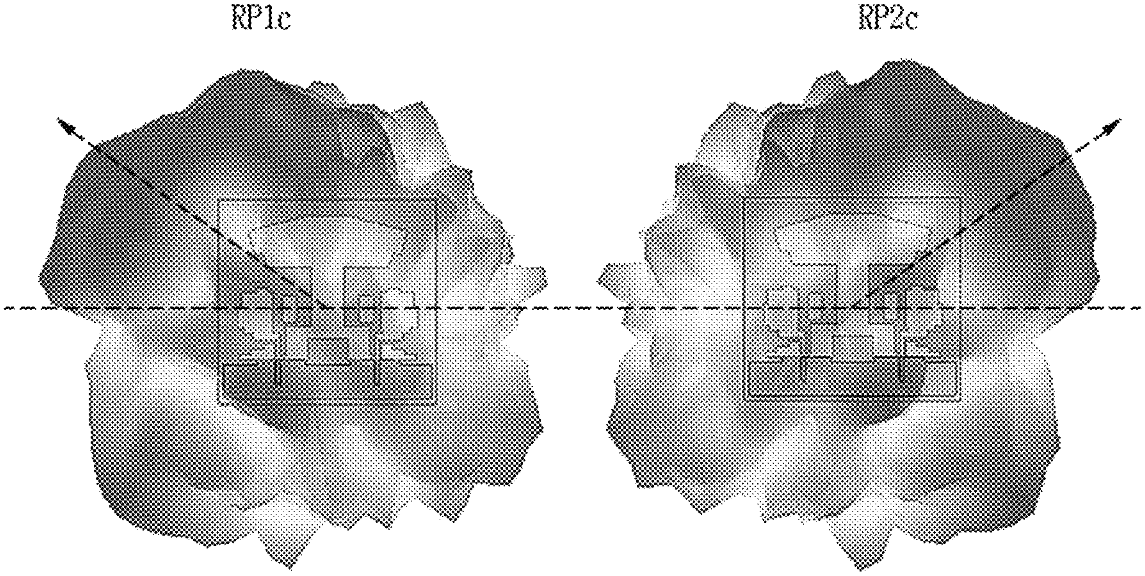

In some examples, the antenna structure having the shared ground pattern may operate in wide bands including the first band to the third band. FIGS. 13A to 13C illustrate exemplary current paths of first to third bands of an antenna structure having a shared ground pattern. FIGS. 14A to 14C illustrate radiation patterns according to the current paths of the first to third bands of FIGS. 13A to 13C.

Referring to FIGS. 9 and 13A to 13C, in the antenna structure having the shared ground pattern, conductive patterns may be disposed in a multi-step (or multi-layer) structure and operate as a plurality of antenna elements. Accordingly, the antenna structure of FIGS. 9 and 13A to 13C may be referred to as a step (array) antenna. The step (array) antenna may be designed such that a plurality of antenna elements, for example, two antenna elements, are symmetrically disposed. In this regard, the third conductive pattern 1150 may be designed to operate as an antenna in LB by the length of the current path formed on the ground regions of the third conductive pattern 1150.

Accordingly, the ground pattern corresponding to a radiation region of each antenna element can operate as a ground having a double size, thereby enhancing LB frequency radiation efficiency. In addition, wideband impedance matching and antenna efficiency of the antenna elements can be improved by the first and third conductive planes 1160*a* and 1160*b*.

Referring to FIGS. 9 and 13A, a resonant frequency in the LB and antenna efficiency can be adjusted by using an entire area of the third conductive pattern 1150 and optimizing a detailed shape of the third conductive pattern 1150. In this regard, the third conductive pattern 1150 can be designed to have a current path having a length of λ/4 in the first band, which is the low band LB.

Referring to FIGS. 9 and 13A, the first signal of the first band applied through the feeding line (or first feeder) F1 may be radiated through the first sub region 1151, the third sub region 1153, and the fourth sub region 1154 of the third conductive pattern 1150. In some examples, the second signal of the first band applied through the feeding line (or second feeder) F2 may be radiated through the second sub region 1152, the third sub region 1153, and the fourth sub region 1154 of the shared ground pattern. In this regard, the first signal of the first band applied through the feeding line F1 may form a first current path I1. In addition, the first signal of the first band applied through the feeding line F2 may form a second current path I2.

Referring to FIGS. 9 and 14A, when the first signal and the second signal are applied to the first and second antennas through the first and second feeding lines 1120*a* and 1120*b* in the first band (e.g., 617 MHz), first and second radiation patterns RP1 and RP2 may be formed. The first and second radiation patterns RP1 and RP2 may be isotropic radiation patterns radiated in all directions. The first and second radiation patterns RP1 and RP2 of the first band may have beam peaks formed in a horizontal direction so as to have a beam pattern shape suitable for a vehicle.

Referring to FIGS. 9 and 13B, the first and second antenna structures may operate as monopole antennas having a size of λ/4 of the resonant frequency within MB of the second band. The first signal of the second band higher than the first band applied through the feeding line F1 may be radiated through the first conductive pattern 1110*a* and the first coupling pattern 1170*a*. On the other hand, the second signal of the second band applied through the feeding line F2 may be radiated through the fourth conductive pattern 1110*b* and the second coupling pattern 1170*b*. In this regard, the first signal of the second band applied through the feeding line F1 may form first and second current paths I1 and I2. In addition, the second signal of the second band applied through the feeding line F2 may form third and fourth current paths I3 and I4.

Referring to FIGS. 9 and 14B, when the first signal and the second signal are applied to the first and second antennas through the first and second feeding lines 1120*a* and 1120*b* in the second band (e.g., 3500 MHz), first and second radiation patterns RP1*b* and RP2*b* may be formed. The first and second radiation patterns RP1*b* and RP2*b* may be isotropic radiation patterns radiated in all directions. The first and second radiation patterns RP1*b* and RP2*b* of the second band may slightly have directivity, compared to the first and second radiation patterns RP1 and RP2 of the first band. However, the first and second radiation patterns RP1*b* and RP2*b* of the second band may have beam peaks formed in a horizontal direction so as to have a beam pattern shape suitable for a vehicle.

Referring to FIGS. 9 and 13C, a higher order mode may be established through the first and fourth conductive patterns 1110*a* and 1110*b* that are signal patterns in UHB. Accordingly, wideband impedance matching can be made through coupling between the first and fourth conductive patterns 1110*a* and 1110*b* that are the signal patterns and the first and third conductive planes 1160*a* and 1160*b*.

Referring to FIGS. 9 and 14C, the first signal of the third band higher than the second band applied through the feeding line F1 may be radiated through the first conductive pattern 1110*a* and the second conductive pattern 1160*a*. Also, the second signal of the third band higher than the second band applied through the feeding line F2 may be radiated through the fourth conductive pattern 1110*b* and the fifth conductive pattern 1160*b*. In this regard, the first signal of the third band applied through the feeding line F1 may form the first current path I1. In addition, the second signal of the third band applied through the feeding line F2 may form the second current path I2.

Referring to FIGS. 9 and 14C, when the first signal and the second signal are applied to the first and second antennas through the first and second feeding lines 1120*a* and 1120*b* in the third band (e.g., 5000 MHz), first and second radiation patterns RP1*c* and RP2*c* may be formed. The first and second radiation patterns RP1*c* and RP2*c* may be isotropic radiation patterns radiated in all directions. The first and second radiation patterns RP1*c* and RP2*c* of the third band may slightly have directivity, compared to the first and second radiation patterns RP1*b* and RP2*b* of the second band. However, the first and second radiation patterns RP1*c* and RP2*c* of the third band may have beam peaks formed in an upward direction tilted from the horizontal direction by a predetermined angle, so as to have a beam pattern shape suitable for a vehicle.

The antenna structure having the shared ground pattern may include the first and second antenna structures 1100-1 and 1100-2 having the symmetrical structure. In this regard, the first conductive pattern 1110*a* may implement the first antenna structure 1100-1 that radiates radio signals of the first to third bands. The first antenna structure 1100-1 may include the first conductive pattern 1110*a*, and may further include the first feeding line 1120*a*, the third conductive pattern 1150, and the second conductive pattern 1160*a*. The first antenna structure 1100-1 may further include the first coupling pattern 1170*a*.

The first feeding line 1120*a* may apply a signal on the same plane as the first conductive patterns of the first conductive pattern 1110*a*. The third conductive pattern 1150 may be disposed at one side surface of the first coupling pattern 1170*a* at one side of the first feeding line 1120*a* and also disposed at an upper side of the first coupling pattern 1170*a* in the one axial direction. The third conductive pattern 1150 may radiate the signal of the first band, and the first conductive pattern 1110*a* may radiate the signal of the second band with the first coupling pattern 1170*a*. The first conductive pattern 1110*a* may radiate the signal of the third band with the first conductive pattern 1160*a*.

The second conductive pattern 1160*a* may be disposed at a lower side of the first conductive pattern 1110*a* in the one axial direction at another side of the first feeding line 1120*a*. The second conductive pattern 1160*a* may radiate the signal of the third band.

The fourth conductive pattern 1110*b* may implement the second antenna structure 1100-2 that radiates radio signals of the first to third bands. The second antenna structure 1100-2 may include the fourth conductive pattern 1110*b*, and may further include the second feeding line 1120*b*, the third conductive pattern 1150, and the fifth conductive pattern 1160*b*. The second antenna structure 1100-2 may further include the second coupling pattern 1170*b*.

The second feeding line 1120*b* may apply a signal on the same plane as the second conductive patterns of the fourth conductive pattern 1110*b*. The third conductive pattern 1150 may be disposed at another side surface of the second coupling pattern 1170*b* at one side of the second feeding line 1120*b* and also disposed at an upper side of the second coupling pattern 1170*b* in the one axial direction. The third conductive pattern 1150 may radiate the signal of the first band, and the fourth conductive pattern 1110*b* may radiate the signal of the second band with the second coupling pattern 1170*b*. The fourth conductive pattern 1110*b* may radiate the signal of the third band with the third conductive pattern 1160*b*.

The fifth conductive pattern 1160*b* may be disposed at a lower side of the fourth conductive pattern 1110*b* in the one axial direction at one side of the second feeding line 1120*b*. The fifth conductive pattern 1160*b* may radiate the signal of the third band.

In some examples, in the first and second antenna structures 1100-1 and 1100-2, the first conductive pattern 1110*a* and the fourth conductive pattern 1110*b* may have a symmetrical structure with respect to a center line of the dielectric substrate 1010. A boundary of another side of the first conductive pattern 1110*a* and a boundary of one side of the fourth conductive pattern 1110*b* may be recessed such that end portions are located at different positions.

In some examples, to reduce the entire antenna size, the third conductive pattern 1150 may also be recessed at its boundary or have regions with different widths, similar to the first and fourth conductive patterns 1110*a* and 1110*b*.

The third conductive pattern 1150 may include first side surfaces S1 spaced apart from the first feeding line 1120*a* and the first coupling pattern 1170*a*, and second side surfaces S2 opposite to the first side surfaces S1. Boundaries of the first side surfaces S1 may be disposed to face boundaries of one side surface of the first conductive pattern 1110*a*, one side surface of the first coupling pattern 1170*a*, and an upper surface of the first radiator 11110 at different gaps on the same plane. Accordingly, the boundaries of the first side surfaces S1 may be formed in a recessed shape or as regions with different widths.

Boundaries of the second side surfaces S2 may be disposed to face boundaries of another side surface of the fourth conductive pattern 1110*b*, another side surface of the second coupling pattern 1170*b*, and an upper surface of the second radiator 11110 at different gaps on the same plane. Accordingly, the boundaries of the second side surfaces S2 may be formed in a recessed shape or as regions with different widths.

In some examples, the first and third conductive planes 1160*a* and 1160*b* for a wideband operation including the third band may be recessed in their boundaries or have regions with different widths, similar to the first and fourth conductive patterns 1110*a* and 1110*b*. Also, similar to the third conductive pattern 1150, the first and third conductive planes 1160*a* and 1160*b* may be recessed in their boundaries or have regions with different widths.

The second conductive pattern 1160*a* may be spaced apart from a boundary of the first feeding line 1120*a*. The second conductive pattern 1160*a* may have a rectangular shape that is recessed from the boundary of the first feeding line 1120*a* in a lateral direction so as to be reduced in width. Accordingly, the second conductive pattern 1160*a* may be formed to increase a distance from the recessed first conductive pattern 1110*a* in the one axial direction.

The fifth conductive pattern 1160*b* may be spaced apart from a boundary of the second feeding line 1120*b*. The fifth conductive pattern 1160*b* may have a rectangular shape that is recessed from the boundary of the second feeding line 1120*b* in a lateral direction so as to be reduced in width. Accordingly, the fifth conductive pattern 1160*b* may be formed to increase a distance from the recessed fourth conductive pattern 1110*b* in the one axial direction.

In some examples, the first and second antenna structures 1100-1 and 1100-2 having the third conductive pattern 1150 for reducing the entire antenna size may operate as first and second antennas ANT1 and ANT2, respectively. Specifically, the first antenna structure 1100-1 and the second antenna structure 1100-2 may operate as the first antenna ANT1 and the second antenna ANT2, respectively, in the first to third bands.

Referring to FIGS. 9, 12A, and 12B, the antenna assembly may operate as the first antenna ANT1 having a first polarization by a first radio signal applied from the first feeding line 1120*a*. In this regard, current paths of the first signal of the first band to the third band may be formed in the one axial direction, and the first antenna ANT1 may operate with the first polarization.

The antenna assembly 1100 may operate as the second antenna ANT2 having the first polarization by a second radio signal applied from the second feeding line 1120*b*. In this regard, current paths of the second signal of the first band to the third band may be formed in the one axial direction, and the second antenna ANT2 may operate with the first polarization. Referring to FIGS. 9 to 10B, the first and second antennas ANT1 and ANT2 may operate with the same polarization and interference between the first and second antennas ANT1 and ATN2 can be reduced by the separated first and second ground regions 1151 and 1152 of the third conductive pattern 1150.

The foregoing description has been given of the wideband antenna assembly implemented as the transparent antenna according to one aspect. Hereinafter, an antenna system for a vehicle having an antenna assembly and a vehicle having the same according to another aspect will be described. An antenna assembly attached to the vehicle glass may be implemented as a transparent antenna.

Figure 15A:
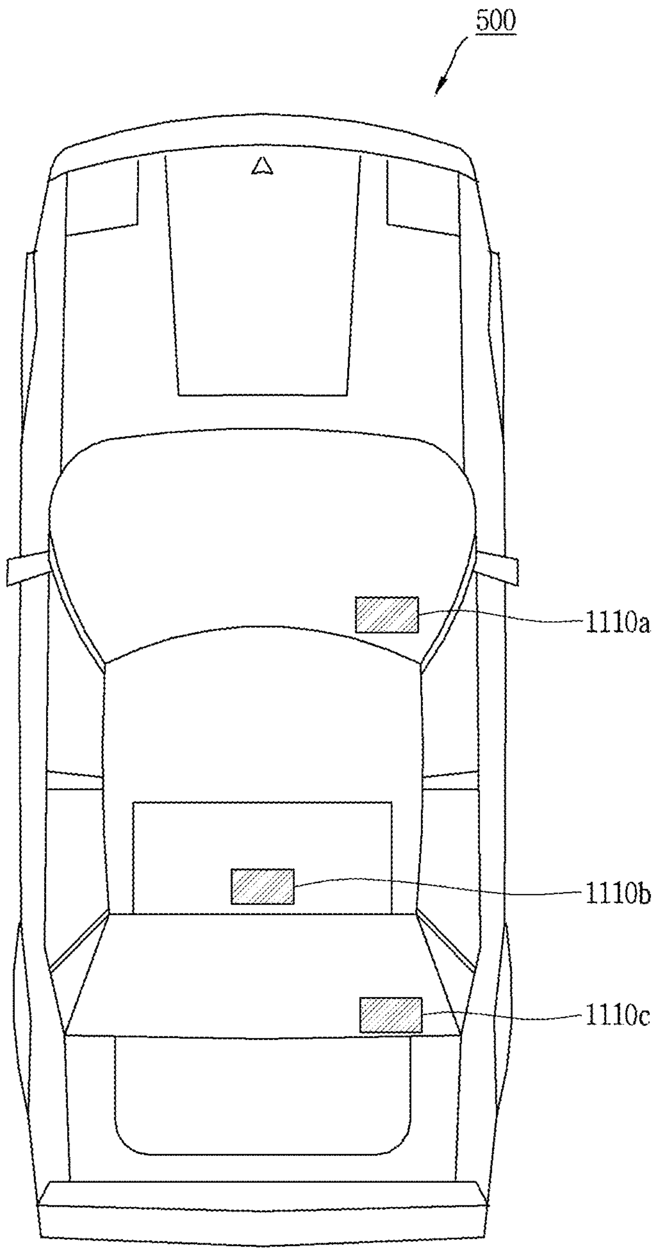
FIG. 15A illustrates an example of a configuration in which antenna modules are disposed at different positions on glass of a vehicle.
Figure 15B:
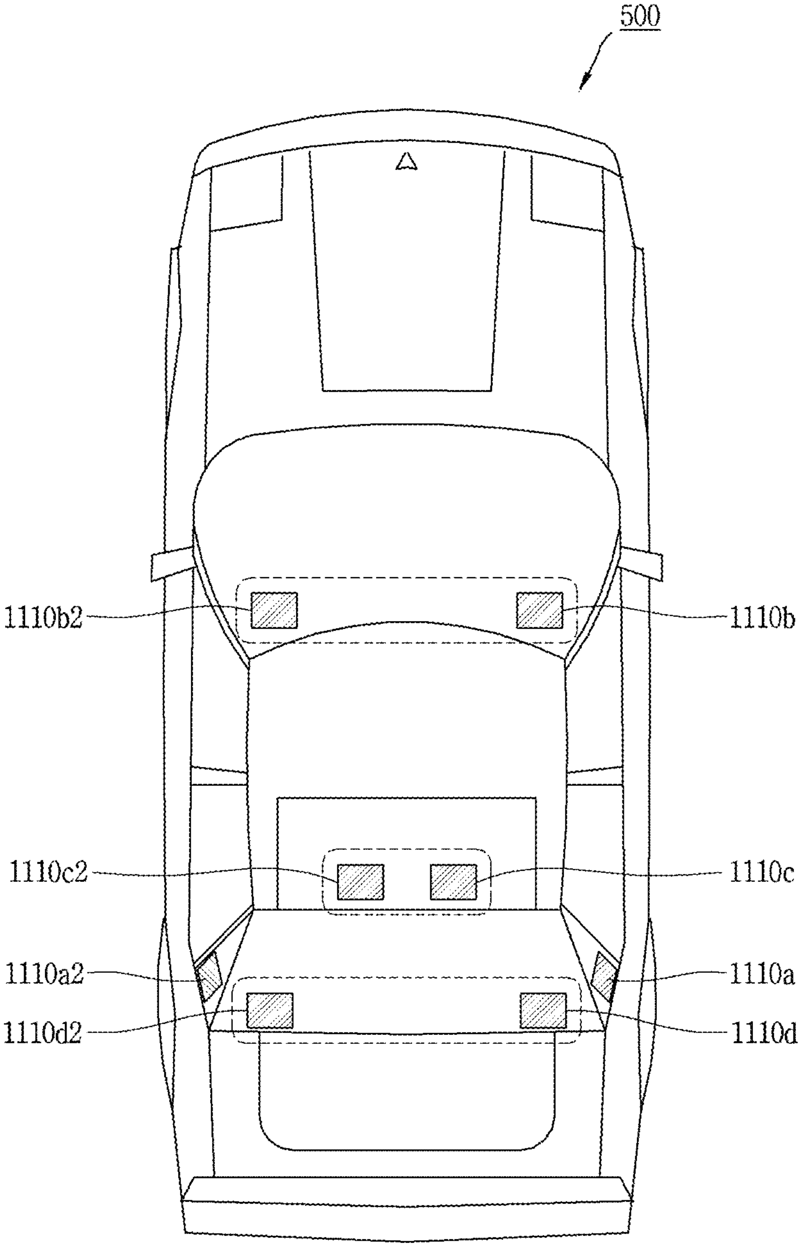
FIG. 15B illustrates an example of a configuration in which antenna modules are disposed at different positions on glass of a vehicle so as to perform a MIMO or diversity operation.
Figure 16A:
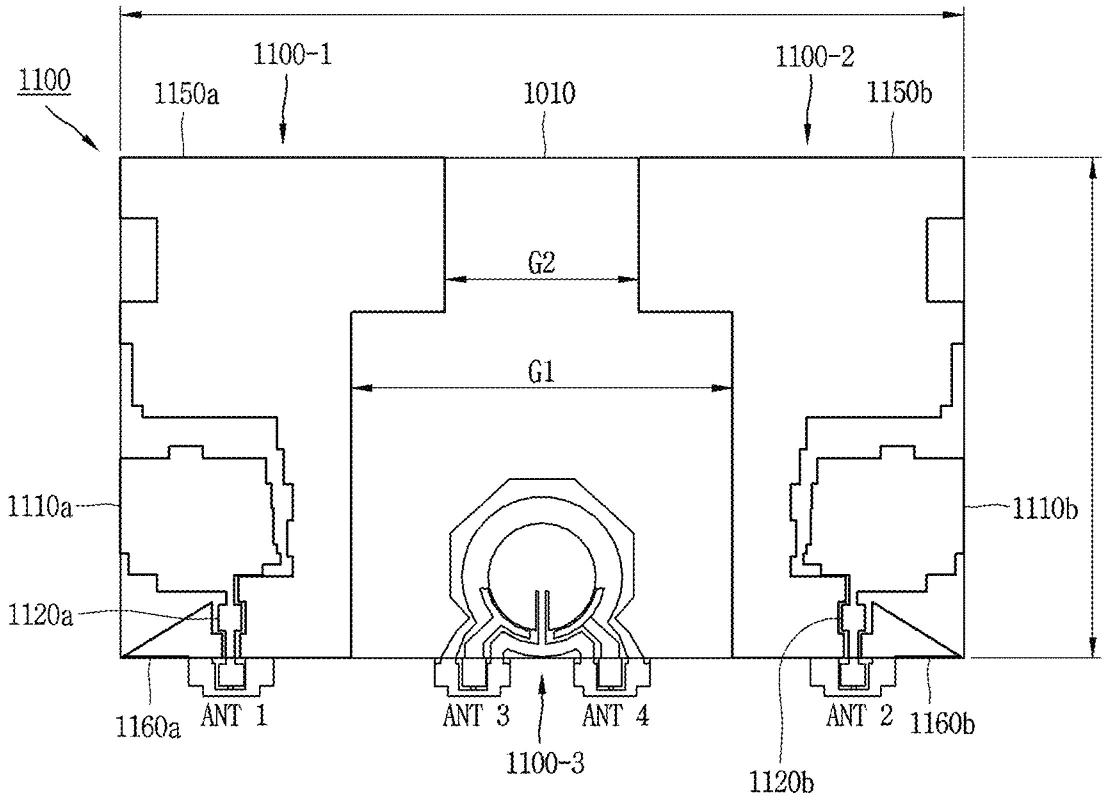
FIGS. 16A and 16B illustrate an example of a structure of an antenna module that can be disposed in a vehicle antenna arrangement structure in FIGS. 15A and 15B.
Figure 16B:
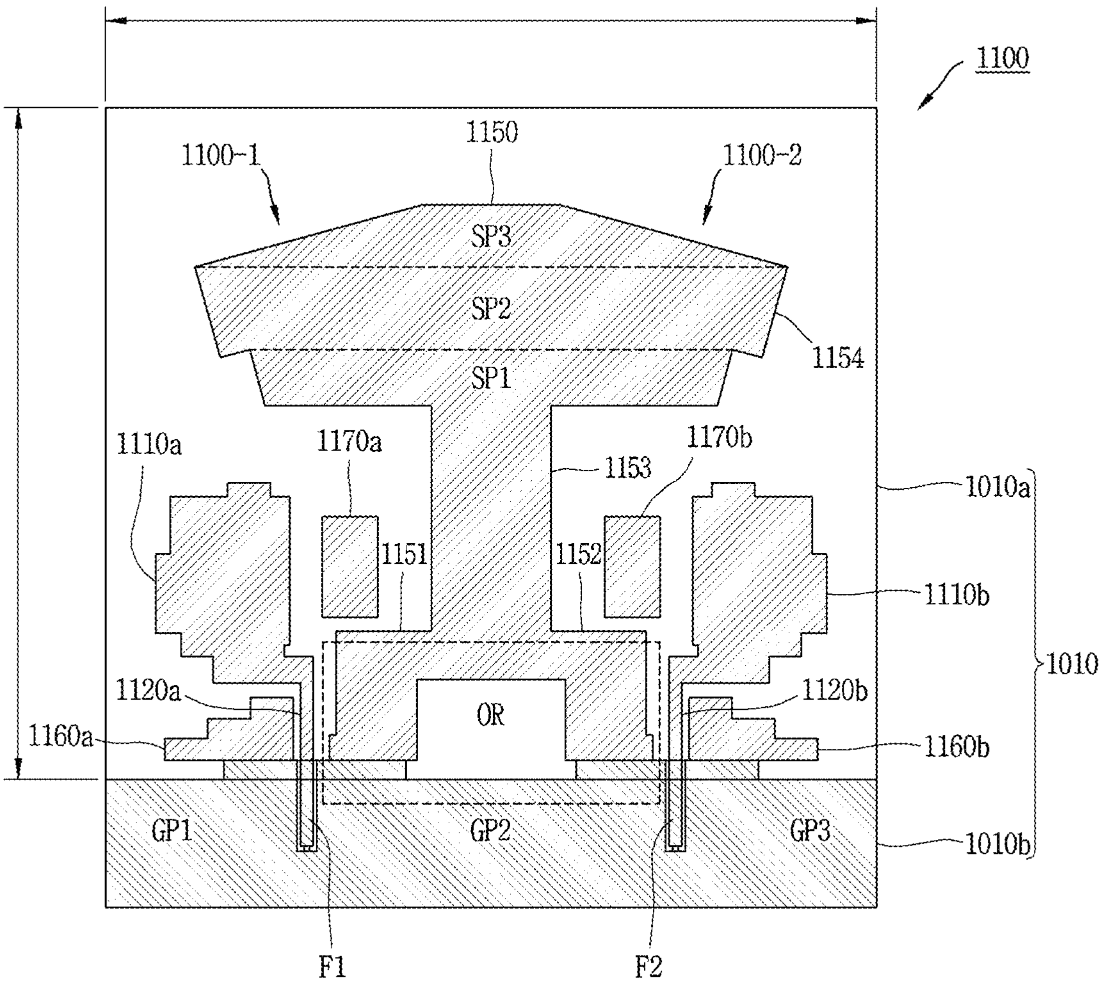

FIG. 15A illustrates an example of a configuration in which antenna modules are disposed at different positions on glass of a vehicle. FIG. 15*b* illustrates an example of a configuration in which antenna modules are disposed at different positions on glass of a vehicle so as to perform a MIMO or diversity operation. FIGS. 16A and 16B illustrate an example of a structure of an antenna module that can be disposed in the vehicle antenna arrangement structure in FIGS. 15A and 15B.

Referring to FIGS. 5A and 15A, antenna modules 1110*a* to 1110*c* may be respectively disposed on the front glass 310, the upper glass 350, and the rear glass 330 of the vehicle. However, the arrangement structure of these antenna modules 1100*a* to 1100*c* may not be limited to FIG. 14A and may variously change depending on applications.

In some examples, the antenna modules 1110*a* to 1110*c* that can be disposed on the glass of the vehicle of FIG. 15A may have a separated ground structure as illustrated in FIG. 16A. Referring to FIG. 16A, the first and second antenna structures 1100-1 and 1100-2 may operate in LB/MB/HB/UHB. In some examples, the third antenna structure 1100-3 may operate in MB/HB/UHB excluding LB. Here, LB/MB/HB/UHB represent a low band, a mid-band, a high band, and an ultra-high band, respectively. In this regard, LB may be referred to as a first band, MB/HB may be referred to as a second band, and UHB may be referred to as a third band, but may not be limited thereto.

The antenna assembly having the separated ground may include a dielectric substrate 1010, antenna elements 1100-1 to 1100-3, and gap regions G1 and G2. The antenna elements 1100-1 to 1100-3 may be implemented as conductive patterns on the dielectric substrate 1010 to radiate radio signals.

The antenna elements may include a first antenna structure 1100-1, a second antenna structure 1100-2, and a third antenna structure 1100-3 to operate as first to fourth antennas ANT1 to ANT4. Accordingly, the antenna structure of FIG. 9B may be a 4×4 MIMO antenna structure. The third antenna structure 1100-3 may be disposed in a space between the first antenna structure 1100-1 and the second antenna structure 1100-2 without an additional arrangement space. Accordingly, since the 4×4 MIMO antenna is disposed within a limited space, it may be referred to as an all-in-One MIMO antenna.

With regard to an extended/separated ground structure, the first and second antenna structures 1100-1 and 1110-2 may be disposed to face each other in order to improve isolation between the antennas. The isolation between the antennas may consider all of the isolation between the first and second antennas, the isolation between the first and third antennas, the isolation between the second and fourth antennas, and the isolation between the third and fourth antennas. Accordingly, an extended/separated ground structure and a mirror structure of the first and second ground regions 1150*a* and 1150*b* may be designed such that the isolation among those antennas can be a threshold value or less. In some examples, in MB/HB/UHB operation modes, the extended step ground structure of the first and second ground regions 1150*a* and 1150*b* may especially operate as an isolator.

As an example, the antenna assembly 1100 of FIG. 16A may operate in a bandwidth of 824 to 4000 MHz. Antenna average efficiency of the antenna assembly 1100 may be about −3 dBi or more, but is not limited thereto. The antenna assembly 1100 of FIG. 16A may perform MIMO. Meanwhile, the antenna assembly 1100 of FIG. 16B may operate in a bandwidth of 617 to 4000 MHz. Antenna average efficiency of the antenna assembly 1100 may be about −3 dBi or more, but is not limited thereto. The antenna assembly 1100 of FIG. 16B may also perform MIMO.

The first and second antennas ANT1 and ANT2 corresponding to the third antenna structure 1100-3 may be configured to perform up to 2×2 MIMO in MB/HB/5G. In some examples, the first to fourth antennas ANT1 to ANT4 corresponding to the first to third antenna structures 1100-1 to 1100-3 may be configured to perform up to 4×4 MIMO in LB/MB/HB/5G.

The arrangement structure of the antenna assembly 1100 can advantageously minimize the assembly process of a 4×4 MIMO antenna module and reduce a space for mounting a feeding connector. In some examples, the arrangement structure of the antenna assembly 1100 may be slightly large in size to be disposed at the quarter glass region of the vehicle. For example, the size of the antenna assembly 1100 of FIG. 16A may be width 146×height 102 mm. Also, in the arrangement structure of the antenna assembly 1100, diversity performance may be a little bit degraded due to antenna integration. Meanwhile, the size of the antenna assembly 1100 of FIG. 16B may be disposed in a rectangle size of limited width and height. The first radiation structure 1100-1 and the second radiation structure 1100-2 may be disposed in a rectangle size of width 100 mm in one axis×height 83 mm in another axis. In this regard, the dielectric substrate 1010 may be formed of a glass having dielectric constant about 6.5 and thickness about 3.5 mm.

Referring to FIGS. 5A and 15B, antenna modules 1110*a* to 1110*d* may be respectively disposed on the quarter glass 340, the front glass 310, the top glass 350, and the rear glass 330 of the vehicle. However, the arrangement structure of these antenna modules 1110*a* to 1110*d* may not be limited to FIG. 14A and may variously change depending on applications.

The antenna modules 1110*a* to 1110*d* may be disposed at different positions in each glass region to be spaced apart from one another. Accordingly, the antenna modules disposed in the spaced manner at the different positions in each glass region may perform the MIMO or diversity operation. For example, the first and second antenna modules 1110*a* and 1110*a*2 may be disposed at different regions of the quarter glass 340. The third and fourth antenna modules 1110*b* and 1110*b*2 may be disposed at different regions of the front glass 310. The fifth and sixth antenna modules 1110*c* and 1110*c*2 may be disposed at different regions of the top glass 350. The seventh and eighth antenna modules 1110*d* and 1110*d*2 may be disposed at different regions of the rear glass 330.

In some examples, the antenna modules 1110*a* to 1110*c* that can be disposed on the glass of the vehicle of FIG. 15B may have a shared ground structure as illustrated in FIG. 16B. Referring to FIG. 16B, the first and second antenna structures 1100-1 and 1100-2 may operate in LB/MB/HB/UHB. As aforementioned, LB/MB/HB/UHB represent the low band, the mid band, the high band, and the ultra-high band, respectively. In this regard, LB may be referred to as a first band, MB/HB may be referred to as a second band, and UHB may be referred to as a third band, but may not be limited thereto.

The antenna assembly 1100 may include the dielectric substrate 1010, and antenna elements 1100-1 and 1100-2. The antenna elements 1100-1 and 1100-2 may be implemented as conductive patterns on the dielectric substrate 1010 to radiate radio signals.

The antenna elements may include the first antenna structure 1100-1 and the second antenna structure 1100-2 to operate as the first to fourth antennas ANT1 to ANT4. Accordingly, the antenna structure of FIG. 9B is a 2×2 MIMO antenna structure, and may be a step antenna structure having the shape in which the boundary regions are recessed for optimal design within an operating band.

In some examples, the third conductive pattern 1150 may be a ground region that is configured to radiate a signal of the first band and shared by the first and second antenna structures 1100-1 and 1100-2. Accordingly, an entire antenna size can be reduced and antenna efficiency can be improved by forming a current path even in the first band which is the low band. The size of the antenna modules 1110*a* to 1110*d* of FIGS. 14B and 15B may be 100×83 mm, which are smaller than those of the antenna modules 1110*a* to 1110*c* of FIGS. 15A and 15B. Accordingly, the antenna arrangement can be allowed even in a limited space such as the region of the quarter glass 340 of the vehicle.

In some examples, operating bandwidths of the antenna modules 1110*a* to 1110*d* of FIGS. 15B and 16B may be about 617 to 6000 MHz. Antenna average efficiency of the antenna modules 1110*a* to 1110*d* may be about −3 dBi or more, but may not be limited thereto. With the MIMO antenna configuration, a 2×2 MIMO operation can be performed in the LB/MB/HB/5G band through the first and second antennas ANT1 and ANT2.

As described above, the antenna modules 1110*a* to 1110*d* of the shared ground structure of FIGS. 15B and 16B can be arranged even in the limited space such as the region of the quarter glass 340 of a vehicle. In addition, the antenna modules 1110*a* to 1110*d* of the shared ground structure may have superior diversity performance by virtue of the antenna distribution. In addition, since the plurality of antenna modules 1110*a* to 1110*d* are spaced apart from one another at different regions of the vehicle glass, the possibility of maintaining communication can be high even in a vehicle accident. In some examples, although an assembly process of the antenna modules 1110*a* to 1110*d* slightly increases, complexity of the assembly process can be reduced through process automation. In addition, although an RF cable length may increase depending on a position of a TCU, bands below 6 GHz, not mmWave bands, can be used. Therefore, an RF cable loss itself may not be a big problem and can be compensated for by a power amplifier or the like.

Figure 17:
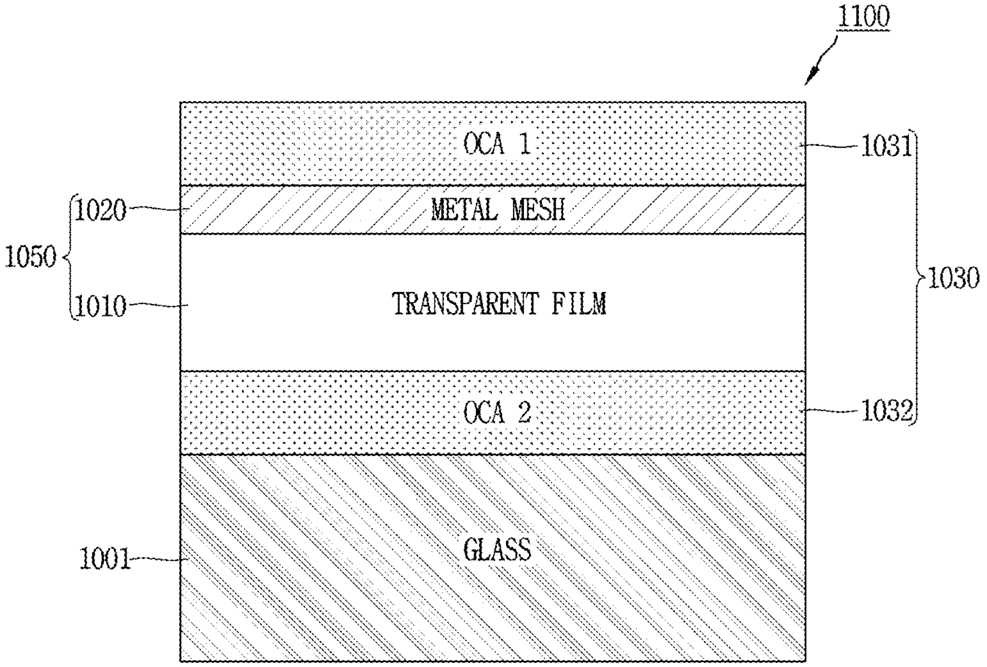
FIG. 17 illustrates a layered structure of an antenna assembly in which a transparent antenna implemented in the form of a metal mesh is disposed on glass and a mesh grid structure.
Figure 17:
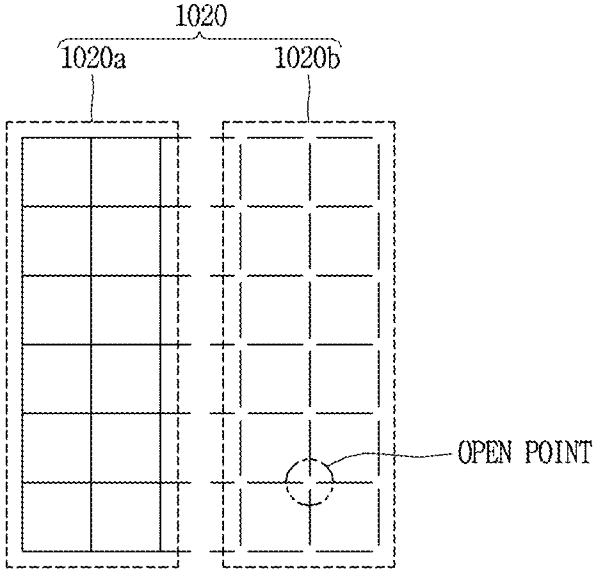

In some examples, the wideband dual polarized antenna structure may be implemented as a transparent antenna in the form of a metal mesh on glass or a display. FIG. 17 illustrates a layered structure of an antenna assembly in which a transparent antenna implemented in the form of a metal mesh is disposed on glass and a mesh grid structure.

Referring to (a) of FIG. 17, the layered structure of an antenna assembly on which the transparent antenna is disposed may include glass 1001, a dielectric substrate 1010, a metal mesh layer 1020, and an optical clear adhesive (OCA) layer 1030. The dielectric substrate 1010 may be implemented as a transparent film. The OCA layer 1030 may include a first OCA layer 1031 and a second OCA layer 1032.

The glass 1001 may be made of a glass material, and the second OCA layer 1032 serving as a glass attachment sheet may be attached to the glass 1001. As one example, the glass 1001 may have a thickness of about 3.5 to 5.0 mm, but is not limited thereto. The glass 1001 may constitute the front window 301 of the vehicle illustrated in FIGS. 1A and 1B.

The dielectric substrate 1010 made of the transparent film material may constitute a dielectric region at which conductive patterns of the upper metal mesh layer 1020 are disposed. The dielectric substrate 1010 may have a thickness of about 100 to 150 mm, but is not limited thereto.

The metal mesh layer 1020 may be formed by the plurality of metal mesh grids as illustrated in FIG. 5. Conductive patterns may be configured such that the plurality of metal mesh grids operate as feeding lines or radiators. The metal mesh layer 1020 may constitute a transparent antenna region. As one example, the metal mesh layer 1020 may have a thickness of about 2 mm, but is not limited thereto.

Referring to FIG. 9 and (a) of FIG. 17, the metal mesh layer 1020 may include a metal mesh grid 1020*a* and a dummy mesh grid 1020*b*. In some examples, the first OCA layer 1031 serving as a transparent film layer for protecting the conductive patterns from an external environment may be disposed on upper regions of the metal mesh grid 1020*a* and the dummy mesh grid 1020*b*.

The first OCA layer 1031 may be a protective sheet of the metal mesh layer 1020 and may be disposed on the upper region of the metal mesh layer 1020. As one example, the first OCA layer 1031 may have a thickness of about 20 to 40 mm, but is not limited thereto. The second OCA layer 1032 may be the glass attachment sheet and may be disposed on the upper region of the glass 1001. The second OCA layer 1032 may be disposed between the glass 1001 and the dielectric substrate 1010 made of the transparent film material. As one example, the second OCA layer 1032 may have a thickness of about 20 to 50 mm, but is not limited thereto.

The foregoing description has been given of the wideband antenna assembly implemented as the transparent antenna according to one aspect. Hereinafter, an antenna system for a vehicle having an antenna assembly according to another aspect will be described. An antenna assembly attached to the vehicle glass may be implemented as a transparent antenna.

Figure 18A:
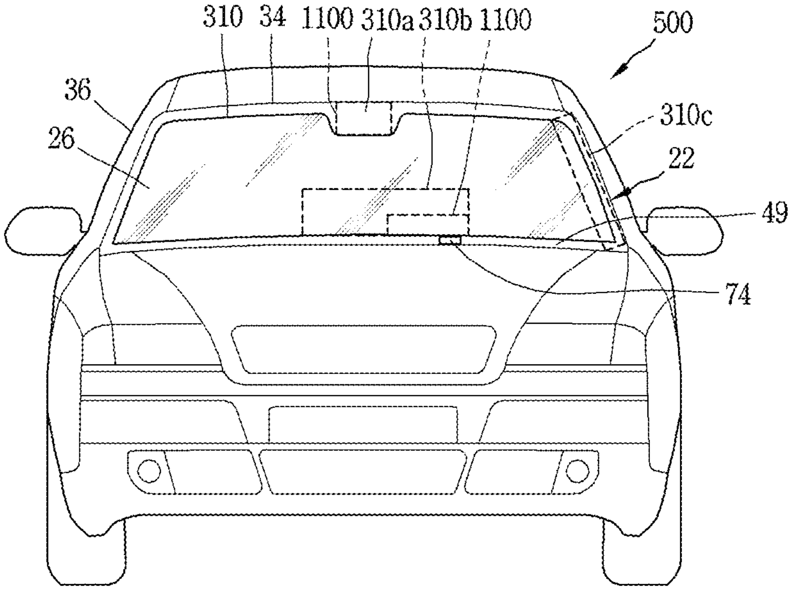
FIG. 18A is a front view of a vehicle in which a transparent antenna can be implemented on glass and FIG. 18B illustrates a detailed configuration of a transparent glass assembly, in which a transparent antenna can be implemented.
Figure 18B:
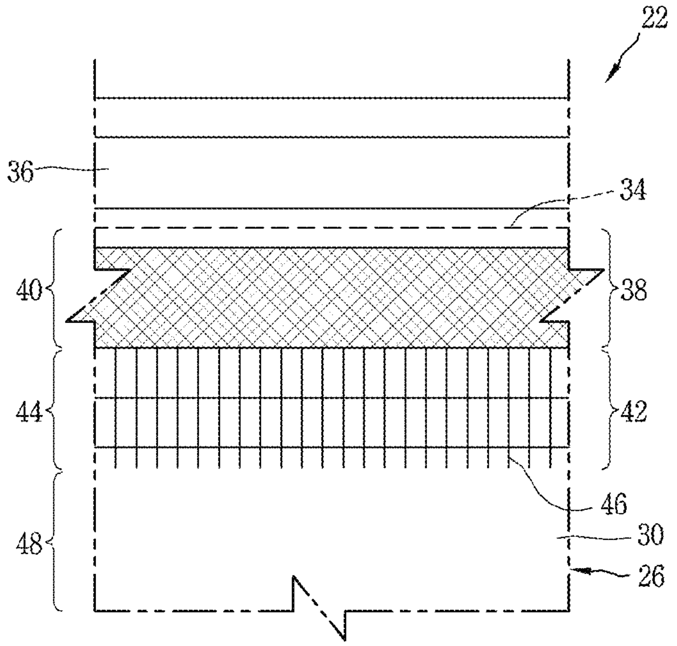

FIG. 18A is a front view of a vehicle in which a transparent antenna can be implemented on glass. FIG. 18B illustrates a detailed configuration of a transparent glass assembly, in which a transparent antenna can be implemented.

Referring to FIG. 18A which is the front view of the vehicle 500, a configuration in which the transparent antenna for the vehicle can be disposed is illustrated. A pane assembly 22 may include an antenna disposed on an upper region 310*a*. Additionally, the pane assembly 22 may include a translucent pane glass 26 formed of a dielectric substrate. The antenna of the upper region 310*a* may support any one or more of a variety of communication systems.

The antenna disposed on the upper region 310*a* of the front window 310 of the vehicle may operate in a mid-band MB, a high band HB, and a 5G Sub 6 band of 4G/5G communication systems. The front window 310 of the vehicle may be formed of the translucent pane glass 26. The translucent pane glass 26 may include a first part 38 at which the antenna and a portion of a feeder are formed, and a second part 42 at which another portion of the feeder and a dummy structure are formed. The translucent pane glass 26 may further include external regions 30 and 36 at which conductive patterns are not formed. For example, the outer region 30 of the translucent pane glass 26 may be a transparent region 48 formed to be transparent to secure light transmission and a field of view.

Although it is exemplarily illustrated that the conductive patterns can be formed at a partial region of the front window 310, another example may illustrate that the conductive patterns extend to the side glass 320 of FIG. 1B, the rear glass 330 of FIG. 3C, and an arbitrary glass structure.

An occupant or driver in the vehicle 20 can see roads and surrounding environments through the translucent pane glass 26 generally without obstruction by the antenna disposed at the upper region 310*a*.

Referring to FIGS. 18A and 18B, the antenna disposed at the upper region 310*a* may include a first part 38 corresponding to an entire first region 40 of the translucent pane glass 26, and a second part 42 corresponding to an entire second region 44 of the translucent pane glass 26 located adjacent to the first region 40. The first part 38 may have a greater density (i.e., a larger grid structure) than the second part 42. Because the density of the first part 38 is greater than the density of the second part 42, the first part 38 may be perceived to be more transparent than the second part 42. Also, antenna efficiency of the first part 38 may be higher than antenna efficiency of the second part 42.

Accordingly, it may also be configured such that an antenna radiator is disposed at the first part 38 and a dummy radiator (dummy portion) is disposed at the second part 42. When the antenna assembly 1100 is implemented at the first part 38 that is the upper region 310*a* of the front glass 310 of the vehicle, the dummy radiator or a portion of the feeding line may be disposed at (attached to) the second part 42.

In this regard, the antenna region may be implemented at the upper region 310*a* of the front glass 310 of the vehicle. The conductive patterns in the form of the metal mesh grid constituting the antenna may be disposed at the first part 38. In some examples, a dummy mesh grid may be disposed at the first part 38 for visibility. In addition, in view of maintaining transparency between the first part 38 and the second part 42, conductive patterns in the form of the dummy mesh grid may also be disposed at the second part 42. An interval between mesh grids 46 disposed at the second part 42 may be wider than an interval between mesh grids disposed at the first part 38.

Conductive mesh grids disposed at the first part 38 of the antenna disposed at the upper region 310*a* may extend up to a region including a peripheral part 34 and the second part 42 of the translucent pane glass 26. The antenna of the upper region 310*a* may extend in one direction along the peripheral part 34.

The antenna assembly 1100 such as the transparent antenna may be disposed at the upper region 310*a* of the front glass 310 of the vehicle, but is not limited thereto. When the antenna assembly 1100 is disposed at the upper region 310*a* of the front glass 310, the antenna assembly 1100 may extend up to an upper region 38 of the translucent pane glass 26. The upper region 38 of the translucent pane glass 26 may have lower transparency than other portions. A part of the feeder and other interface lines may be disposed at the upper region 38 of the translucent pane glass 26. When the antenna assembly 1100 is disposed at the upper region 310*a* of the front glass 310 of the vehicle, the antenna assembly 1100 may cooperate with the second antenna system 1000*b* of FIGS. 3A to 3C.

The antenna assembly 1100 may be disposed at the upper region 310*a*, the lower region 310*b*, or the side region 310*c* of the front glass 310 of the vehicle. The antenna assembly 1100 may be disposed in the form of at least one antenna module at a different point on the front glass 310 of the vehicle, as illustrated in FIG. 15A or 15B. When the antenna assembly 1100 is disposed at the lower region 310*b* of the front glass 310 of the vehicle, the antenna assembly 1100 may extend up to a lower region 49 of the translucent pane glass 26. The lower region 49 of the translucent pane glass 26 may have lower transparency than other portions. A part of the feeder and other interface lines may be disposed at the lower region 49 of the translucent pane glass 26. A connector assembly 74 may be disposed at the lower region 49 of the translucent pane glass 26.

When the antenna assembly 1100 is disposed at the lower region 310*b* or the side region 310*c* of the front glass 310 of the vehicle, the antenna assembly 1100 may cooperate with the internal antenna system 1000 of the vehicle illustrated in FIGS. 3A to 3C. However, the cooperation configuration between the antenna system 1000 and the second antenna system 1000*b* is not limited thereto and may vary depending on applications. In some examples, the antenna assembly 1100 may alternatively be disposed at the side glass 320 of the vehicle of FIG. 1B.

Figure 19:
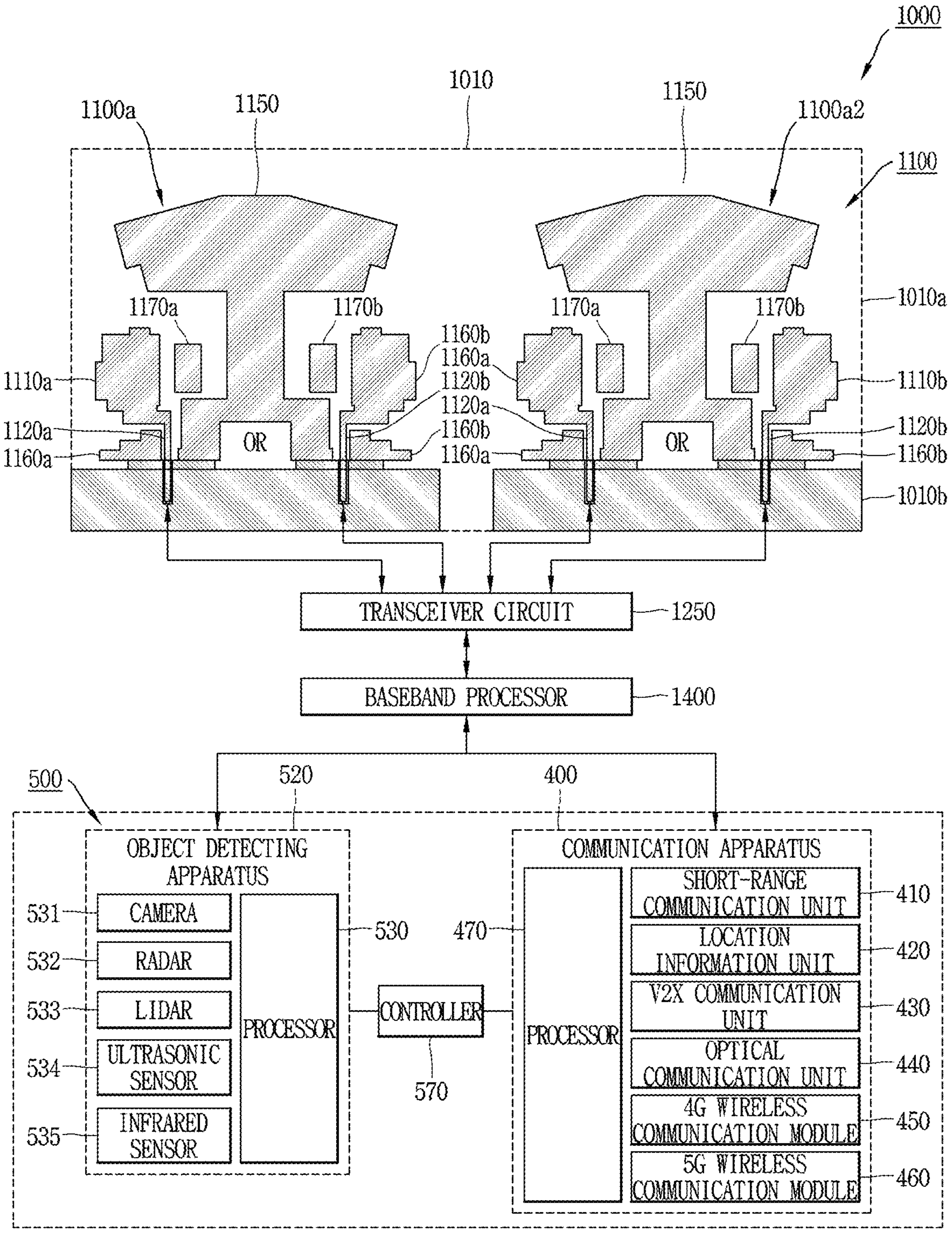
FIG. 19 illustrates an example of a configuration in which a plurality of antenna modules disposed at different positions of a vehicle are coupled with other parts of the vehicle.

Hereinafter, a vehicle having an antenna module according to one example will be described in detail. FIG. 19 illustrates an example of a configuration in which a plurality of antenna modules disposed at different positions of a vehicle are coupled with other parts of the vehicle.

Referring to FIGS. 1 to 19, the vehicle 500 may include a conductive vehicle body operating as an electrical ground. The vehicle 500 may include a plurality of glass 310 to 350. The vehicle 500 may include the dielectric substrate 1010, the antenna region 1010*a* and the ground region 1010*b*.

The antenna assembly 1100 may be disposed on one side surface of the dielectric substrate 1010. The antenna assembly 1100 may include the antenna region 1010*a* and the ground region 1010*b*. The ground region 1010*b* may configure a CPW structure in which the ground patterns GP1 to GP3 are disposed at both sides of the first feeding line F1 and the second feeding line F2. Accordingly, the ground region 1010*b* may be referred to as the feeding region 1010*b*.

The antenna assembly 1100 may be configured such that the antenna region 1010*a* includes conductive patterns on one side surface of the dielectric substrate 1010 so as to radiate radio signals. The antenna region 1010*a* may include the first antenna structure 1100-1 and the second antenna structure 1100-2.

The ground region 1010*b* may be defined on the same plane as the antenna region. The ground region 1010*b* may include a first slot region at which the first feeding line F1 is disposed and a second slot region at which the second feeding line F2 is disposed. The ground patterns GP1 and GP2 may be disposed at both sides of the first slot region. The ground patterns GP2 and GP3 may be disposed at both sides of the second slot region. Accordingly, the first feeding line F1 disposed at the first slot region of the ground region 1010*b* and the second feeding line F2 disposed at the second slot region may configure the CPW structure.

The first feeding line F1 configured to apply a radio signal to the conductive patterns of the first antenna structure 1100-1 may be disposed at the first slot region. The second feeding line F2 configured to apply a radio signal to conductive patterns of the second antenna structure 1100-2 may be disposed at the second slot region. The first feeding line F1 and the second feeding line F2 of the ground region 1010*b* may be connected to the first feeding line 1120*a* and the second feeding line 1120*b* of the antenna region 1010*a*.

The first antenna structure 1100-1 may include the first conductive pattern 1110*a* connected through the first feeding line F1 and including first conductive patterns to radiate a first signal, and the second conductive pattern 1160*a* and the third conductive pattern 1150 disposed at both sides of the first conductive pattern 1110*a*. The second antenna structure 1100-2 may include the fourth conductive pattern 1110*b* connected through the second feeding line F2 and including second conductive patterns to radiate a second signal, and the third conductive pattern 1150 and the fifth conductive pattern 1160*b* disposed at both sides of the fourth conductive pattern 1110*b*.

The second conductive pattern 1160*a* may be connected to the ground region 1010*b* by a first connection line CL1. The third conductive pattern 1150 may be connected to the ground region 1010*b* by a second connection line CL2 and a third connection line CL3. The fifth conductive pattern 1160*b* may be connected to the ground region 1010*b* through a fourth connection line CL4. Impedance matching of the first antenna structure 1100-1 can be achieved by the first connection line CL1 and the second connection line CL2. Impedance matching of the second antenna structure 1100-2 can be achieved by the third connection line CL3 and the fourth connection line CL4.

The antenna region 1010*a* may include the first conductive pattern 1110*a*, the fourth conductive pattern 1110*b*, and the third conductive pattern 1150. The first conductive pattern 1110*a* may be connected to the feeding region 1010*b* through the first feeding line 1120*a*. The first conductive pattern 1110*a* may include first conductive patterns having a specific shape in one axial direction and another axial direction to radiate a first signal. The fourth conductive pattern 1110*b* may be connected to the feeding region 1010*b* through the second feeding line 1120*b*. The fourth conductive pattern 1110*b* may include second conductive patterns having a specific shape in the one axial direction and another axial direction to radiate a second signal.

The third conductive pattern 1150 may be connected to the ground pattern GP2 disposed at the feeding region 1010*b*. The third conductive pattern 1150 may be disposed between the first conductive pattern 1110*a* and the fourth conductive pattern 1110*b* to operate as the ground of the first conductive pattern 1110*a* and the fourth conductive pattern 1110*b*.

The antenna region 1010*a* may include the second conductive pattern 1160*a* and the fifth conductive pattern 1160*b*. The second conductive pattern 1160*a* may be connected to the ground pattern GP1 disposed at the feeding region 1010*b*. The second conductive pattern 1160*a* may be disposed between one end portion of the first conductive pattern 1110*a* and the ground pattern. The fifth conductive pattern 1160*b* may be connected to the ground pattern GP3 disposed at the feeding region 1010*b*. The fifth conductive pattern 1160*b* may be disposed between one end portion of the fourth conductive pattern 1110*b* and the ground pattern GP3.

As aforementioned, the vehicle 500 may include the front glass 310, the door glass 320, the rear glass 330, and the quarter glass 340. In some examples, the vehicle 500 may further include the top glass 350 that is a window disposed on the roof frame 2000*c* illustrated in FIG. 3C. The front glass 310 may constitute the window of the vehicle. The door glass 320 may be disposed at the front region of the vehicle. The rear glass 330 may be disposed at the rear region of the vehicle. The quarter glass 340 may be disposed at a partial region of the door region of the vehicle. The top glass 350 may be disposed at the upper region of the vehicle with being spaced apart from the rear glass 330.

In some examples, the antenna modules 1110*a* to 1110*d* of FIGS. 15A and/or 15B may be disposed at different regions of the vehicle. The antenna modules 1110*a* to 1110*d* may include a first antenna module 1110*c* and a second antenna module 1110*c*2. The first antenna module 1110*c* and the second antenna module 1110*c*2 may be disposed in the left quarter glass and the right quarter glass, which are a portion of a left door region and a portion of a right door region of the vehicle.

Each antenna module disposed at the different region of the vehicle may include the first antenna structure 1100-1 and the second antenna structure 1100-2. The first antenna structure 1100-1 and the second antenna structure 1100-2 may be connected to the first feeding line 1120*a*, F1 and the second feeding line 1120*b*, F2 to operate as the first antenna ANT1 and the second antenna ANT2, respectively.

The vehicle may further include a transceiver circuit 1250 and a processor 1400. In this regard, a portion of the transceiver circuit 1250 may be disposed in units of antenna modules or in combination thereof. The transceiver circuit 1250 may be operably coupled to the first conductive pattern 1110*a* and the second radiator 1110*a* through the first feeding line F1 and the second feeding line F1. The transceiver circuit 1250 may control a radio signal of at least one of the first to third bands to be radiated through the antenna modules 1110*a* to 1110*d*.

The processor 1400 may be operably coupled to the transceiver circuit 1250 and may be configured as a modem operating in a baseband. The processor 1400 may receive or transmit a signal through at least one of the first antenna module 1110*a* and the second antenna module 1110*a*2. The processor 1400 may perform a diversity operation using the first antenna module 1110*a* and the second antenna module 1110*a*2 to transmit a signal into the vehicle through the quarter glass 340.

The antenna modules may be disposed at different points at the upper region of the front glass 310. The antenna modules may include a third antenna module 1110*b* and a fourth antenna module 1110*b*2 configured to simultaneously receive signals applied from the front of the vehicle to perform MIMO.

The antenna modules may include a fifth antenna module 1110*c* and a sixth antenna module 1110*c*2 that are disposed at different points of the top glass 350 to simultaneously receive signals applied from the top of the vehicle to perform MIMO.

The antenna modules may include a seventh antenna module 1110*d* and an eighth antenna module 1110*d*2 that are disposed at different points of the lower region of the rear glass 330 to simultaneously receive signals applied from the rear of the vehicle to perform MIMO.

The processor 1400 may select an antenna module to perform communication with an entity based on a driving path of the vehicle and a communication path with the entity communicating with the vehicle. When the vehicle changes the driving path, the processor 1400 may perform a diversity operation through the first antenna module 1110*a* and the second antenna module 1110*a*2 disposed at the left and right regions of the quarter glass 340.

The processor 1400 may perform MIMO through the third antenna module 1110*b* and the fourth antenna module 1110*b*2. The processor 1400 may perform MIMO in the first band through the first antenna ANT1 and the second antenna ANT2 in the third antenna module 1110*b* and the fourth antenna module 1110*b*2. The processor 1400 may perform MIMO in at least one of the second band and the third band through the first antenna ANT1 and the second antenna ANT2 in the third antenna module 1110*b* and the fourth antenna module 1110*b*2.

Accordingly, when signal transmission/reception performance of the vehicle in any one band is deteriorated, signal transmission/reception in the vehicle can be performed in other bands. For example, the vehicle may preferentially perform communication connection in the first band, which is the low band, for wide communication coverage and connection reliability, and then perform communication connection in the second and third bands.

The processor 1400 may control the transceiver circuit 12500 to perform the CA or DC through at least one of the first antenna ANT1 and the second antenna ANT2 within the third antenna module 1110*b* and the fourth antenna module 1110*b*2. In this regard, communication capacity can be expanded through the aggregation of the second band and the third band, which are wider than the first band. In addition, communication reliability can be improved through the dual connectivity with neighboring vehicles or entities by using the plurality of antenna elements disposed at the different regions of the vehicle.

So far, the antenna system having the wideband antenna made of the transparent material and the vehicle having the same have been described. Hereinafter, technical effects of the antenna system having the wideband antenna made of the transparent material and the vehicle having the same will be described.

In some implementations, an antenna made of a transparent material that operates in a wideband range capable of providing LTE and 5G communication services can be provided by allowing grounds asymmetrically disposed at both sides of a radiator region to operate in different bands.

In some implementations, a transparent antenna made of a transparent material, which has a radiator region including conductive patterns of a stepped structure with different widths so as to form multiple resonance points and can operate in a wideband range, can be provided.

In some implementations, an entire size of a transparent antenna and a feeding loss can be minimized by minimizing a length of feeding lines.

In some implementations, an antenna structure made of a transparent material that can be minimized in antenna size while operating in a wideband range by employing a CPW feeding structure and a radiator structure, in which ground regions are formed in an asymmetric structure, can be provided.

In some implementations, an antenna structure of a transparent material, which can obtain improved antenna efficiency and transparency while operating in a wideband range by implementing conductive patterns in a metal mesh structure and defining a dummy pattern even at a dielectric region, can be provided.

In some implementations, a structure, in which an antenna structure made of a transparent material with improved antenna efficiency while operating in a wideband range can be disposed at various positions, such as an upper, lower, or side region of a front window of a vehicle, can be provided.

In some implementations, communication performance can be improved by arranging a plurality of transparent antennas in glass of a vehicle or a display of an electronic device, and antenna performance at a low band (LB) can be enhanced through a shared ground structure of antenna elements.

In some implementations, antenna performance can be optimized for each band and communication capacity can be increased by arranging a plurality of transparent antennas in a symmetrical structure within a limited space of glass of a vehicle and optimizing a shared ground structure and an independent ground structure.

In some implementations, antenna interference between antenna elements can be reduced when the antenna elements operate simultaneously, by way of arranging a plurality of transparent antennas in a symmetrical structure within a limited space of glass of a vehicle and allowing different radiators to share a ground.

In some implementations, an antenna module can be minimized in size to be disposed within a limited region of a window of a vehicle through a shared ground structure of antenna elements.

In some implementations, an antenna module can be minimized in size and interference between antenna elements can be prevented by a shared ground structure of the antenna elements and partial separation of a ground region adjacent to feeding lines.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned present disclosure, design and operations of an antenna system having transparent antennas and a vehicle controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An antenna assembly comprising:

an antenna region including conductive patterns on one side surface of a dielectric substrate to radiate radio signals, the antenna region comprising a first antenna structure and a second antenna structure;

a ground region defined on a same plane as the antenna region, the ground region comprising a first slot region and a second slot region;

a first feeding line disposed at the first slot region; and a second feeding line disposed at the second slot region, wherein the antenna region comprises a first conductive pattern, a second conductive pattern, a third conductive pattern, a fourth conductive pattern and a fifth conductive pattern, wherein the first antenna structure including:

the first conductive pattern electrically connected with the first feeding line;

the second conductive pattern electrically connected with the ground region by a first connection line;

a first portion of the third conductive pattern electrically connected with the ground region by a second connection line;

wherein the first conductive pattern is disposed between the second conductive pattern and the third conductive pattern; and wherein a size of the second conductive pattern is smaller than a size of the third conductive pattern, wherein the second antenna structure including:

the fourth conductive pattern electrically connected with the second feeding line;

a second portion of the third conductive pattern electrically connected with the ground region by a third connection line;

the fifth conductive pattern electrically connected with the ground region by a fourth connection line;

wherein the third conductive pattern is disposed between the third conductive pattern and the fifth conductive pattern; and wherein a size of the fifth conductive pattern is smaller than the size of the third conductive pattern, wherein the third conductive pattern is disposed between the first conductive pattern and the fourth conductive pattern, and wherein the third conductive pattern includes an open region disposed between the first portion of the third conductive pattern and the second portion of the third conductive pattern.

2. The antenna assembly of claim 1, wherein the third conductive pattern is shared as a part of radiator of the first antenna structure and the second antenna structure.

3. The antenna assembly of claim 1, wherein the first radiation structure and the second radiation structure are configured in a symmetrical structure with respect to a center line of the third conductive pattern.

4. The antenna assembly of claim 1, wherein the third conductive pattern are configured in a symmetrical structure with respect to the center line of the third conductive pattern.

5. The antenna assembly of claim 1, wherein the third conductive pattern comprises:

a first sub region connected with the ground region by the second connection line;

a second sub region connected with the ground region by the third connection line;

a third sub region disposed between the first sub region and the second sub region, the third sub region is connected with the first sub region and the second sub region and a first end portion of the third sub region is separated with the ground region by the open region; and a fourth sub region is connected with a second end portion of the third sub region, wherein the first end of the third sub region is disposed opposite the second end of the third sub region, wherein a width of the open region is disposed between the first sub region and the second sub region, and wherein a height of the open region is disposed between the first end portion of the third sub region and the ground region.

6. The antenna assembly of claim 5, wherein the fourth sub region comprises a first sub-pattern, a second sub-pattern and a third sub-pattern;

wherein the first sub-pattern is connected with the second end portion of the third sub region, wherein the second sub-pattern is connected with the upper portion of the first sub-pattern of the third sub region, wherein the third sub-pattern is connected with the upper portion of the second sub-pattern of the third sub region, and wherein the width of the second end portion of the third sub region is shorter than a width of the first sub-pattern.

7. The antenna assembly of claim 5, wherein the fourth sub region comprises a first sub-pattern, a second sub-pattern and a third sub-pattern, wherein the first sub-pattern is connected with the second end portion of the third sub region, and configured to increase in width from a lower portion of the first sub-pattern to an upper portion of the first sub-pattern, wherein the second sub-pattern is connected with the upper portion of the first sub-pattern of the third sub region, and configured to increase in width from a lower portion of the second sub-pattern to an upper portion of the second sub-pattern, and wherein the third sub-pattern is connected with the upper portion of the second sub-pattern of the third sub region, and configured to decrease in width from a lower portion of the third sub-pattern to an upper portion of the third sub-pattern.

8. The antenna assembly of claim 5, wherein the width of the lower portion of the first sub-pattern is shorter than the width of the upper portion of the first sub-pattern, wherein the width of the upper portion of the first sub-pattern is shorter than the width of the lower portion of the second sub-pattern, wherein the width of the lower portion of the second sub-pattern is shorter than the width of the upper portion of the second sub-pattern, wherein the width of the upper portion of the second sub-pattern is equal with the width of the lower portion of the third sub-pattern, wherein the width of the upper portion of the third sub-pattern is shorter than the width of the lower portion of the third sub-pattern, and wherein the width of the lower portion of the first sub-pattern is longer than the width of the upper portion of the third sub-pattern.

9. The antenna assembly of claim 5, further comprising:

a first coupling pattern and a second coupling pattern;

wherein the first coupling pattern is disposed between the first conductive pattern and a first side of the third sub region of the third conductive pattern, and wherein the second coupling pattern is disposed between the fourth conductive pattern and a second side of the third sub region of the third conductive pattern.

10. The antenna assembly of claim 9, wherein a first gap is disposed between the first conductive pattern and the first coupling pattern, wherein a second gap is disposed between the first coupling pattern and the first side of the third sub region of the third conductive pattern, wherein a width of the first gap is shorter than a width of the second gap, wherein a third gap is disposed between the fourth conductive pattern and the second coupling pattern, wherein a fourth gap is disposed between the second coupling pattern and the second side of the third sub region of the third conductive pattern, and wherein a width of the third gap is shorter than a width of the fourth gap.

11. The antenna assembly of claim 1, wherein the first conductive pattern to the fifth conductive pattern, the first coupling pattern and the second coupling pattern are formed as a metal mesh shape having a plurality of opening area on the dielectric substrate, wherein the first radiation structure and the second radiation structure are a Coplanar Wavelength (CPW) structure.

12. The antenna assembly of claim 1, wherein the antenna assembly further comprises a plurality of dummy mesh grid pattern at outside portion of the first radiation structure and the second radiation structure on the one surface of the dielectric substrate, wherein the plurality of dummy mesh grid pattern are not connected with feeding lines and the ground region, and wherein the plurality of dummy mesh grid pattern are separated with each other.

13. The antenna assembly of claim 1, wherein the first radiation structure operates as a first antenna, wherein the second radiation structure operates as a second antenna, wherein each of the first radiation structure and the second radiation structure operates in a 600 to 6000 MHz frequencies.

14. The antenna assembly of claim 1, wherein the first radiation structure and the second radiation structure operate as a 2×2 MIMO (Multi-in Multi-output) system in the 600 to 6000 MHz frequencies.

15. The antenna assembly of claim 1, wherein the first radiation structure and the second radiation structure are disposed in a rectangle size of width 100 mm×height 83 mm.

16. A vehicle having antenna modules, the vehicle comprising:

a dielectric substrate disposed at glass constituting a window of the vehicle or attached to the glass, and having conductive patterns disposed in a mesh grid form;

an antenna region including conductive patterns on one side surface of a dielectric substrate to radiate radio signals, the antenna region comprising a first antenna structure and a second antenna structure;

a ground region defined on a same plane as the antenna region, the ground region comprising a first slot region and a second slot region;

a first feeding line disposed at the first slot region; and a second feeding line disposed at the second slot region, wherein the antenna region comprises a first conductive pattern, a second conductive pattern, a third conductive pattern, a fourth conductive pattern and a fifth conductive pattern, wherein the first antenna structure including:

the first conductive pattern electrically connected with the first feeding line;

the second conductive pattern electrically connected with the ground region by a first connection line;

a first portion of the third conductive pattern electrically connected with the ground region by a second connection line;

wherein the first conductive pattern is disposed between the second conductive pattern and the third conductive pattern; and wherein a size of the second conductive pattern is smaller than a size of the third conductive pattern, wherein the second antenna structure including:

the fourth conductive pattern electrically connected with the second feeding line;

a second portion of the third conductive pattern electrically connected with the ground region by a third connection line;

the fifth conductive pattern electrically connected with the ground region by a fourth connection line;

wherein the third conductive pattern is disposed between the third conductive pattern and the fifth conductive pattern; and wherein a size of the fifth conductive pattern is smaller than the size of the third conductive pattern, wherein the third conductive pattern is disposed between the first conductive pattern and the fourth conductive pattern, and wherein the third conductive pattern includes an open region disposed between the first portion of the third conductive pattern and the second portion of the third conductive pattern.

17. The vehicle of claim 16, wherein the third conductive pattern is shared as a part of radiator of the first antenna structure and the second antenna structure.

18. The vehicle of claim 16, wherein the first radiation structure and the second radiation structure are configured in a symmetrical structure with respect to a center line of the third conductive pattern.

19. The vehicle of claim 16, wherein the third conductive pattern comprises:

a first sub region connected with the ground region by the second connection line;

a second sub region connected with the ground region by the third connection line;

a third sub region disposed between the first sub region and the second sub region, the third sub region is connected with the first sub region and the second sub region and a first end portion of the third sub region is separated with the ground region by the open region; and a fourth sub region is connected with a second end portion of the third sub region, wherein the first end of the third sub region is disposed opposite the second end of the third sub region, wherein a width of the open region is disposed between the first sub region and the second sub region, and wherein a height of the open region is disposed between the first end portion of the third sub region and the ground region.

20. The vehicle of claim 19, wherein the fourth sub region comprises a first sub-pattern, a second sub-pattern and a third sub-pattern;

wherein the first sub-pattern is connected with the second end portion of the third sub region, wherein the second sub-pattern is connected with the upper portion of the first sub-pattern of the third sub region, wherein the third sub-pattern is connected with the upper portion of the second sub-pattern of the third sub region, and wherein the width of the second end portion of the third sub region is shorter than a width of the first sub-pattern.

* * * * *